US007953764B2

(12) United States Patent
Baffier et al.

(10) Patent No.: US 7,953,764 B2
(45) Date of Patent: *May 31, 2011

(54) TECHNIQUES FOR AUTOMATICALLY PROVISIONING A DATABASE OVER A WIDE AREA NETWORK

(75) Inventors: Jean-Louis Baffier, Chanteloup-en-Brie (FR); Marc Dangeard, Sausalito, CA (US); Thierry Gruet, Montesson (FR); Olaf Ziegler, Munich (DE); Dean Tan, Redwood City, CA (US); Christina Sechrest, Belmont, CA (US); Pascal Sero, Foster City, CA (US); Kevin Walsh, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,270

(22) Filed: May 20, 2010

(65) Prior Publication Data

US 2010/0235513 A1    Sep. 16, 2010

Related U.S. Application Data

(63) Continuation of application No. 09/872,235, filed on May 31, 2001, now Pat. No. 7,739,308.

(60) Provisional application No. 60/231,482, filed on Sep. 8, 2000.

(51) Int. Cl.
*G06F 7/00* (2006.01)
*G06F 15/176* (2006.01)

(52) U.S. Cl. .................. 707/802; 707/812; 707/999.01; 709/203

(58) Field of Classification Search .................. 707/802, 707/812
See application file for complete search history.

(56) References Cited

U.S. PATENT DOCUMENTS

| 6,298,234 | B1 * | 10/2001 | Brunner | 455/432.1 |
|---|---|---|---|---|
| 6,374,256 | B1 * | 4/2002 | Ng et al. | 707/741 |
| 6,460,141 | B1 * | 10/2002 | Olden | 726/4 |
| 6,532,488 | B1 * | 3/2003 | Ciarlante et al. | 709/205 |
| 6,640,278 | B1 * | 10/2003 | Nolan et al. | 711/6 |
| 6,769,022 | B1 * | 7/2004 | DeKoning et al. | 709/223 |
| 7,222,176 | B1 * | 5/2007 | Laurent et al. | 709/226 |
| 7,739,308 | B2 * | 6/2010 | Baffier et al. | 707/802 |

* cited by examiner

*Primary Examiner* — Miranda Le
(74) *Attorney, Agent, or Firm* — Hickman Palermo Truong & Becker LLP; Marcel K. Bingham; Karl T. Rees

(57) ABSTRACT

Techniques for provisioning databases for users on a wide area network such as the Internet include a first party managing one or more database systems. Second parties subscribe to database services supported by the database systems managed by the first party. The first party provides, over a network, to database applications controlled by the second parties, access to the database services to which the second parties are subscribed. The database systems may use database appliances hosting both database process(es), and non-database process(es) tailored to the needs of the database process(es). A user is therefore able to obtain database resources from an Internet Database Service Provider (IDSP) without the user incurring the full costs of database administrator(s), dedicated database equipment facilit(ies), or even dedicated database device(s), depending on usage. Meanwhile, the IDSP incurs minimum staffing loads because of various self-service tools Costing model and automatic billing features are also described.

30 Claims, 24 Drawing Sheets

FIG. 2A
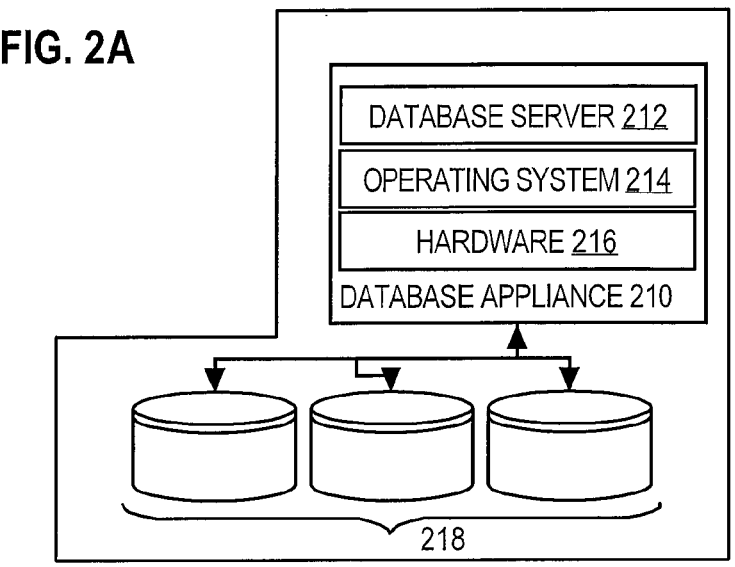
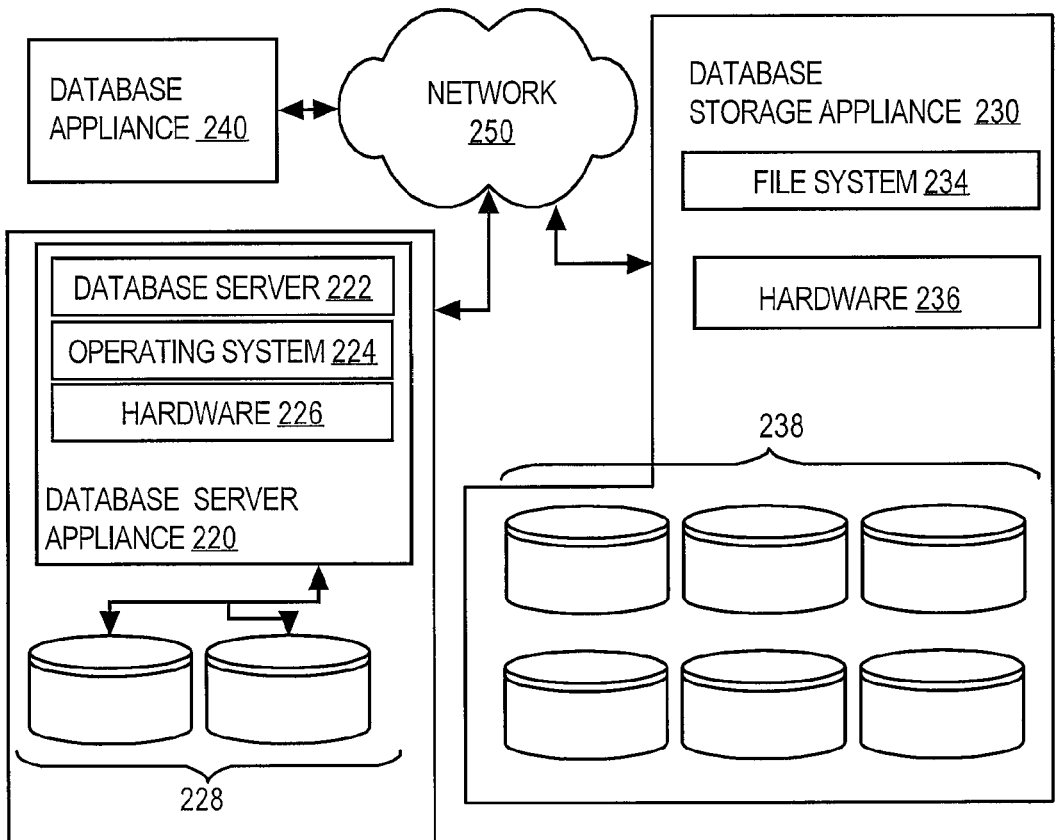
FIG. 2B

TECHNIQUES FOR AUTOMATICALLY PROVISIONING A DATABASE OVER A WIDE AREA NETWORK

CLAIM OF PRIORITY

This application claims benefit under 35 U.S.C. §120 as a Continuation of U.S. application Ser. No. 09/872,235, filed May 31, 2001 now U.S. Pat. No. 7,739,308, which in turn claims priority to U.S. provisional application Ser. No. 60/231,482, filed Sep. 8, 2000 entitled "Automatic Web Sites With Databases" by Dean Tan, Jean-Louis Baffier, Marc Dangeard, Thierry Gruet, Olaf Ziegler, Peter Renner, John-Brown Evans, Christina DeMello, Niloy Banerjee, John John E. So, Michael Rocha, Yuanjiang Ou, Sivakumar Thivakaram, Darryl Presley, Venkat Malla, Pascal Sero, and Kevin Walsh. The entire contents of both applications are hereby incorporated by reference, for all purposes, as if set forth in their entirety. The applicant(s) hereby rescind any disclaimer of claim scope in the parent application(s) or the prosecution history thereof and advise the USPTO that the claims in this application may be broader than any claim in the parent application.

CROSS REFERENCE TO RELATED APPLICATIONS

This application is related to U.S. patent application Ser. No. 09/240,229, filed Jan. 29, 1999 entitled "Pre-Defined Hardware And Software Bundle Ready For Database Applications," the entire contents of which are hereby incorporated by reference, for all purposes, as if set forth in its entirety.

This application is related to U.S. patent application Ser. No. 09/873,061, entitled "Techniques For Automatically Developing A Web Site," filed May 31, 2001, invented by Dean Tan, Pascal Sero, and Kevin Walsh.

This application is related to U.S. Pat. No. 7,536,686, entitled "Techniques For Automatically Installing And Configuring Database Applications," filed May 31, 2001, invented by Dean Tan, Marc Dangeard, Pascal Sero, and Kevin Walsh.

This application is related to U.S. Pat. No. 6,795,830, entitled "Techniques For Providing Off-Host Storage For A Database Application," filed May 31, 2001, invented by Niloy Banerjee, John John E. So, and Michael Rocha.

This application is related to U.S. patent application Ser. No. 09/872,932, entitled "Techniques For Automatically Discovering A Database Device On A Network," filed May 31, 2001, invented by Yuanjiang Ou, Sivakumar Thivakaram, Darryl Presley and Venkat Malla.

This application is related to U.S. Pat. No. 6,993,657, entitled "Techniques For Managing Database Systems with a Community Server," filed May 31, 2001, invented by Peter Renner, John-Brown Evans, Christina Demello, Pascal Sero, and Kevin Walsh.

FIELD OF THE INVENTION

The present invention relates to accessing databases over a wide area network such as the Internet, and, in particular, to providing self-service database services to subscribers over the Internet.

BACKGROUND OF THE INVENTION

Many enterprises expect to use the Internet to reach far-flung agents and customers. The Internet is a public network of computer networks, each with one or more nodes. The Internet uses open, standard protocols for addressing nodes and passing information from one node to another. A user accesses the Internet by logging onto one of the computers on the network, often owned and operated by an Internet Service Provider (ISP). Typically a user establishes a severable link between the user's own computer and the ISP computer. A client application program (a client) running on the user's computer interacts with a server application program (a server) running on one of the nodes on the Internet.

The World Wide Web (the Web) is a collection of resources available over the Internet that are provided by various servers and that can be accessed by a particular client called a Web browser using a hyper-text transfer protocol (HTTP). Using a Web browser, a user can select a resource on the Web, identified by its Universal Resource Locator (URL) name, and have that resource presented to the user. The resource usually includes textual information and often includes graphical, video and audio elements.

For electronic commerce using the Web, the resource provided by the server must include a mechanism for accepting user information. For example, many Web resources include forms for accepting product orders. The browser and resource must also provide for secure information transfer between client and server. For example, secure transfers are needed to receive user credit card information or to send user account information. Effective transactions may also require the resource to provide access to a database. For example, a database enables the server to track inventory of products available for purchase, or to find the account information requested by the client.

One or more programmers are required to produce a resource that interacts with a user's browser to (1) present information, (2) receive input, (3) make secure transactions, and (4) access a database. The presentation of textual, graphical and audio information requires a programmer skilled in the use of a markup language such as the Hyper-Text Markup Language (HTML) or the more flexible Extensible Markup Language (XML). To receive user input in response to the presented information requires a programmer able to create scripts of procedures accessed via Common Gateway Interface (CGI), or applications written in a language like JAVA that can be launched from a user's Web browser. To include information in the resource that is retrieved from a database, either initially or in response to the user input, requires a database programmer as well.

Thus an enterprise that expects to generate a presence on the Internet is faced with the need to assemble a team of expert programmers to implement the design for the enterprise's web site.

Even formulating the design for the series of Web pages that the user will encounter at the enterprise's site requires experience in the type of transactions the web site will perform. For example, a retailer must provide for a shopping cart or analogous component to store information about the items and quantities being purchased. A retailer must also provide for charging to a user's credit card, often by communicating with a third party, or must provide some analogous payment mechanism. These interactions must be designed in a sequence that does not unnecessarily burden or confuse the purchaser. A public service organization must help the user find the information or service sought as efficiently as possible. A sales department must be able to identify its salespersons and provide information tailored to the privileges of the employee accessing the web site.

While a large enterprise has the finances to assemble a team having the requisite expertise, most enterprises are too small to assemble and support such a team. These small to medium sized enterprises need a way to generate an effective presence on the Internet complete with database components without incurring the costs of a team of programmers and experts.

In the context of database components, the complexity of the general purpose database system combined with the complexity of the general purpose operating system with which the database system interacts on a general purpose computer is typically sufficient to require employment of a full-time database administrator (DBA). It is the responsibility of the DBA to grapple with the complexity of the database system, the operating system, and the interactions between them, so that the other database users can take advantage of the database system without being exposed to underlying complexity. Unfortunately, employing a full-time DBA makes ownership of a useful database system an expensive option that may be outside the means of the small to medium sized enterprise.

Maintaining an in house computer system to host the database and web site is also an expensive undertaking even when the enterprise can afford a DBA or small team of information services (IS) professionals. Most computer equipment requires special air-conditioning and power supplies that are expensive to construct in a facility. The equipment itself is expensive and prone to become obsolete as new hardware devices are developed. Even if the equipment is leased, the facility costs remain, and the transfer to upgraded equipment may put a database out of service and consume considerable amounts of skilled IS labor.

Based on the foregoing, it is clearly desirable to provide techniques to reduce the cost of maintaining the hardware and software of the database system and the Internet presence. It is further desirable to decrease the complexity of computer systems, and to provide management techniques that allow companies to reduce the size and cost of their in-house IS departments.

SUMMARY OF THE INVENTION

Techniques are provided to reduce the costs associated with establishing and maintaining one or more databases by having database services provided by another party, which makes the database services available over a network, such as the Internet.

Cost reductions are achieved by minimizing the costly computer programming and information services expertise required by the small to medium sized enterprise by moving those services to a services provider, which can share certain costs among several enterprises. The disclosed techniques also include embodiments that recursively apply this cost-reduction model. For example, some embodiments allow an enterprise to go to an Internet Database Service Provider (IDSP) to obtain database services over the Internet. Simultaneously, these embodiments allow several IDSPs to maintain the specialized database applications for serving their customers from a common database application developer through a Community Server.

With techniques of the present invention, a user is able to obtain needed database resources from an Internet Database Service Provider (IDSP) with a minimum of user effort and without the user incurring the full costs of one or more database administrators, or the costs of a dedicated database equipment facility, or even the costs of a dedicated database device, depending on usage. At the same time, the IDSP can readily provide for several database users with minimum staffing needs because of self-service tools in a self-service process. Furthermore, the IDSP start-up and maintenance efforts are reduced through several tools already in a platform-owner database provisioning process. In some embodiments, these tools include a costing model and automatic billing.

According to one aspect of the present invention, techniques for provisioning databases for users on a wide area network include a first party managing one or more database systems. Multiple second parties subscribe to database services supported by the database systems managed by the first party. The first party provides, over a network, to database applications controlled by the second parties, access to the database services to which the second parties are subscribed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram of a database appliance for a database server upon which an embodiment of the disclosed techniques may be implemented.

FIG. 2B is a block diagram of database appliance using an off-host database storage appliance according to one embodiment of the disclosed techniques.

DETAILED DESCRIPTION OF THE PREFERRED EMBODIMENT

Techniques for Internet database services are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Functional Overview

A system is provided that incorporates numerous features that reduce the total cost of generating and maintaining an Internet presence with database components. The system preferably includes one or more "database appliances". A database appliance is a machine that includes database software, such as database server software, and non-database software, where the non-database software is specially tailored to the needs of the database software. Such non-database software may include, for example, operating system software from which have been removed services that are typically used in general purpose computers but are not required to support the needs of the database server. According to one embodiment, even the hardware of the machine deviates from a general-purpose computer in order to more efficiently support specific characteristics and requirements of the database server. Database appliances are described in the related application U.S. patent application Ser. No. 09/240,229, filed Jan. 29, 1999 entitled "Pre-Defined Hardware And Software Bundle Ready For Database Applications," incorporated by reference earlier in this application.

The features include integrated tools for forming a database for a first party on the equipment of a second party, and for designing and automatically implementing a web site with components from the database. Maintenance costs are reduced by sharing equipment and IS personnel costs among several customers of the second party.

The maintenance costs of the database system are further reduced by having a community server deliver applications to database appliances and manage the database appliances of numerous companies, including numerous second parties. The community server provides access to the database appliances over the Internet and backup for restoration of database appliances that have gone down, while simultaneously avoiding the need for those companies to each employ their own expert database administrator.

2.0 Hardware Overview

Figure 1:
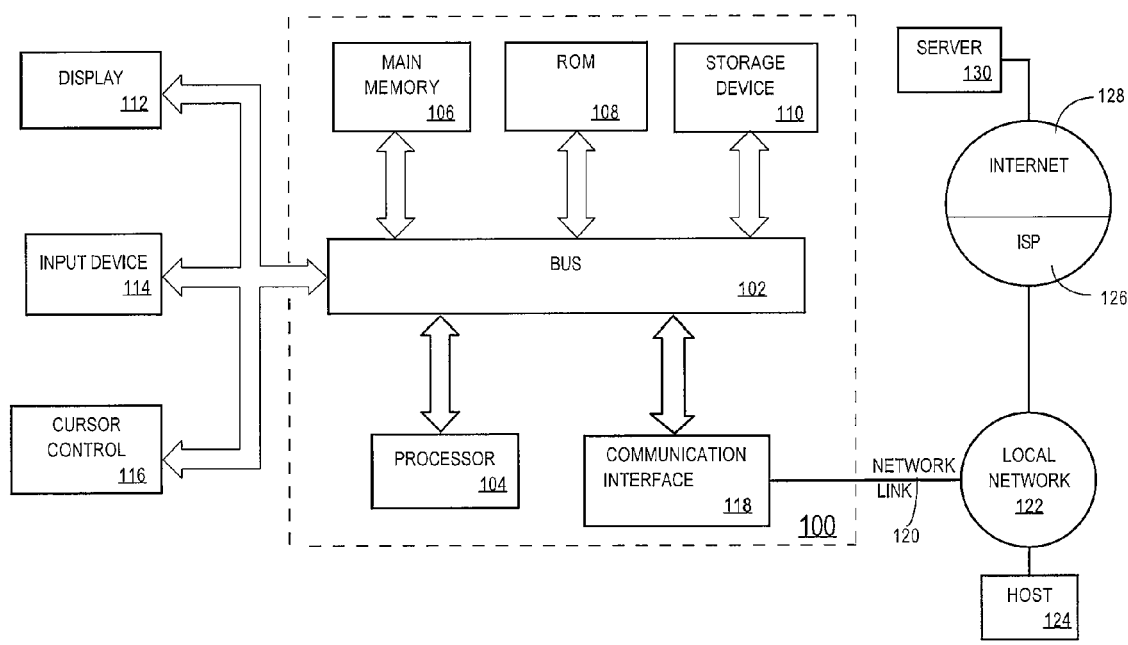
FIG. 1 is a block diagram of a computer system upon which an embodiment of the disclosed techniques may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for automatically provisioning a database accessible from a Web browser. According to one embodiment of the invention, a Web page with database components is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application is a database application as described herein.

The received code may be executed by processor 104 as it is received, and/or stored in storage device 110, or other non-volatile storage for later execution. In this manner, computer system 100 may obtain application code in the form of a carrier wave.

3.0 Example System

According to one embodiment, techniques are provided that allow a party to serve the role of an "Internet Database Service Provider" or IDSP. Like an ISP, the IDSP is a second party service provider which maintains the equipment necessary for a subscriber to use the Internet. Unlike the conventional ISP, the IDSP provides the subscriber with database services that are accessible over a network to which the subscriber has access. In certain embodiments, the database services may be part of a larger package that provides the subscriber with an Internet presence that includes automatically generated database components. The IDSP itself may be supported by a third party, such as a database software developer, operating a database community server on the Internet.

Figure 2C:
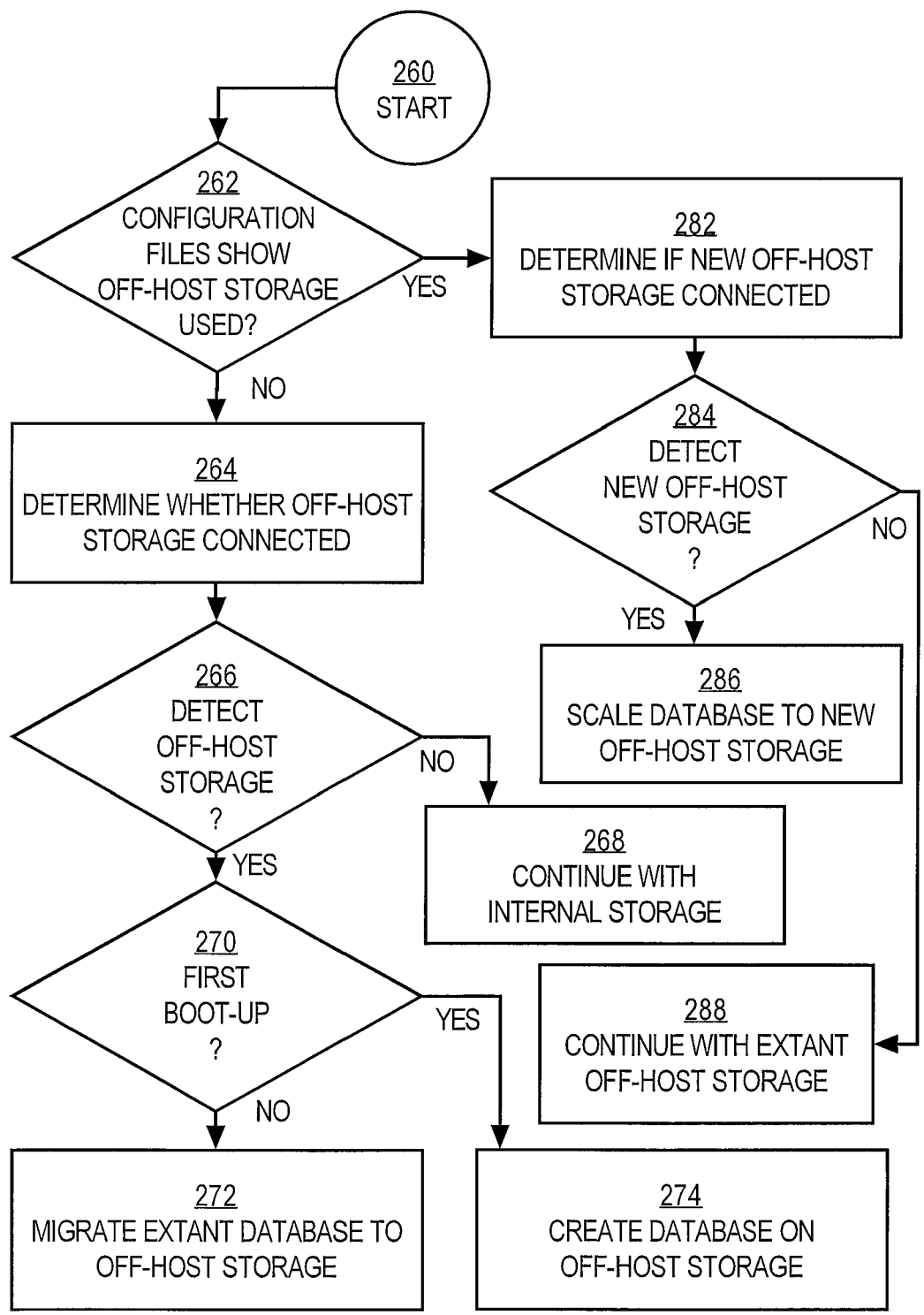
FIG. 2C is a flowchart depicting some management tasks performed by a database server using off-host storage according to one embodiment of the disclosed techniques.
Figure 3A:
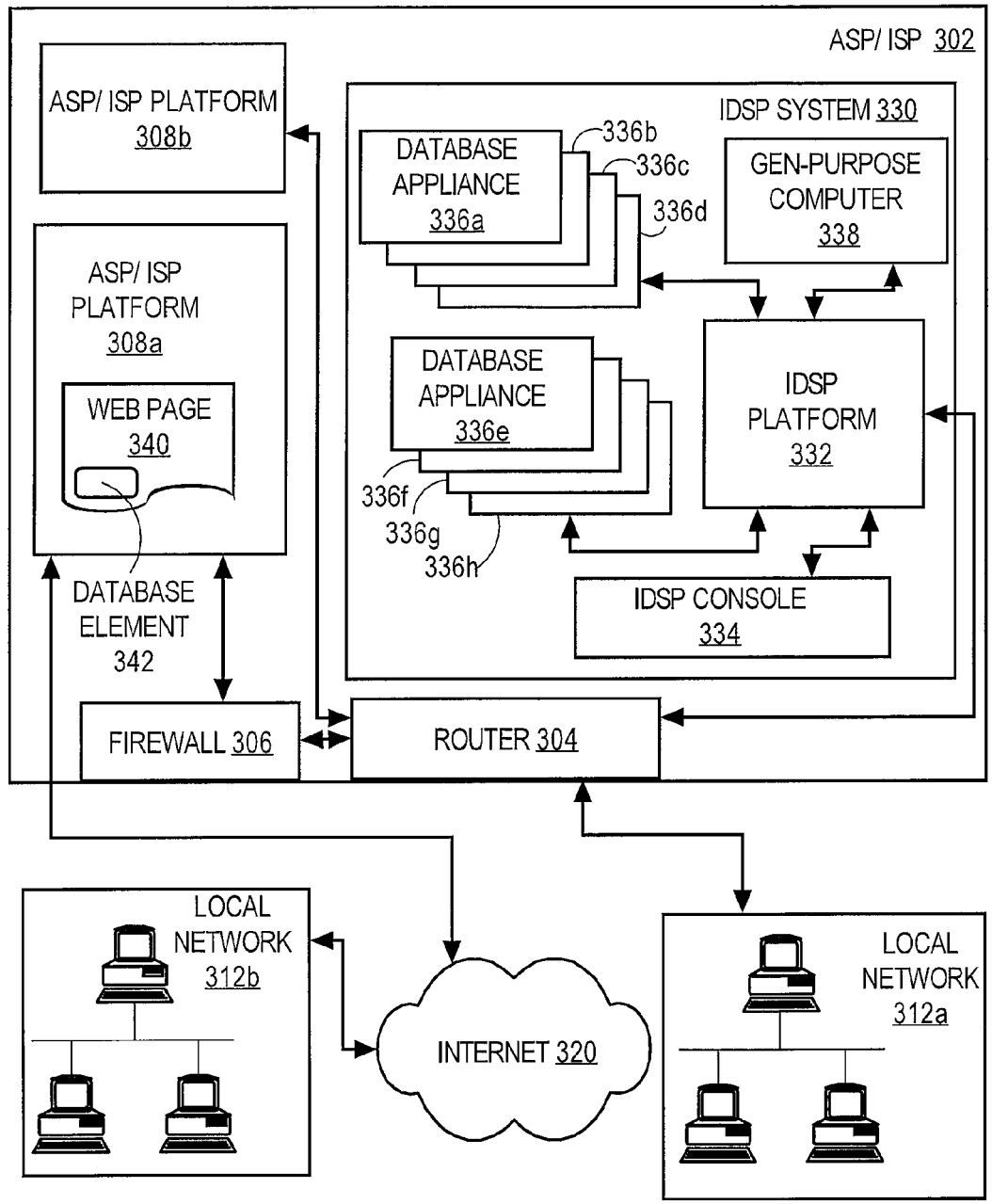
FIG. 3A is a block diagram of an Internet database service provider according to one embodiment of the disclosed techniques.

The IDSP includes an IDSP platform (item 332 in FIG. 3A) and a plurality of database appliances (item 336 in FIG. 3A). FIG. 2A depicts a database appliance as described in U.S. patent application Ser. No. 09/240,229, referenced above. In that application a database appliance includes a database server process 212, an operating system 214 tailored to support the database server process 212, and hardware 216. The server software, operating system software, database configuration parameters, and the database files themselves are stored on nonvolatile mass storage devices 218.

As used herein, the term database appliance includes any database device with a special purpose operating system tailored to the database process running on the device, including the database server appliance 220 and the database storage appliance 230 described next. The main distinction among database appliances is the function provided by the database process running on the appliance. Other examples of database appliances include an internet appliance which supports a connection with the Internet, a database Web server appliance (for example, an ORACLE 8i appliance) which provides access to a database system through a user's Web browser, and a database web site building appliance which provides a wizard for building a series of Web pages with database components and is described in greater detail later below.

3.1 Off-Host Storage

FIG. 2B shows a database network including two new database appliances. Database storage appliance 230 does not include a database server process, but instead has a file system process 234 operating on hardware 236 and mass storage devices 238. This allows the database storage appliance 230 to comprise high-performance external storage systems available from a number of vendors.

In general, database storage appliance 230 is a computing device including a mass storage device, and a processor configured to run a file system server process and a special purpose operating system whose features and configuration are dictated by the mass storage device, the file system server and supporting components.

A database storage appliance 230 is one component of a system of database appliances including a database server appliance 220. Database server appliance 220 includes a database server 222 and a special-purpose operating system 224 but only sufficient non-volatile storage 228 to use for the server software and operating system and configuration parameters. The database server appliance 220 does not store the data files themselves. The single database storage appliance 230 stores the data files for one or more database server appliances 220. The network may also include one or more other database appliances 240 configured like database appliance 210 in FIG. 2A, as described in the related application. In this case, the database storage appliance 230 stores the data files for the other database appliances 240 as well. In other embodiments multiple storage appliances provide storage for a database managed by a single server.

The database server on a database host performs database management tasks for a database. The management tasks now include determining whether the system is configured for off-host storage. If it is determined that the system is configured for off host storage, then the data files are stored on the off-host storage device. If a database already exists on the database host when it is determined that the system is configured for off-host storage, then the extant database is migrated to the off-host storage device. This process is described in more detail with respect to FIG. 2C.

Management tasks performed by the database server appliance in this embodiment start at step 260 when the database server commences operation (e.g., boots up). In step 262, it is determined whether configuration files maintained for the database server, either at the server or at a separate database directory services device, such as a database directory services appliance, indicate that database files reside on off-host storage devices. A set of off-host storage device types is maintained by the configuration files. For example an off-host storage device that connects to the database host through a host bus adapter (HBA) is model X of Company A, and an off-host storage device that connects to the database host through a network, called network attached storage (NAS,) is model Y of Company B. If any HBA or NAS devices, such as model X and model Y, are found in the database directory, then off-host storage is already being used, and the system is configured for off-host storage.

If off-host storage is already used, as determined in step 262, then control passes to step 282 to determine if any off-host storage devices have joined the system that are not already in the database directories. In one embodiment, HBA based storage uses a fiber optic channel connected to the host via a SCSI connection. Such a device responds to an inquiry command. Thus an inquiry command is issued to determine what HBA based storage devices are connected. In this embodiment, NAS devices use Ethernet connections and respond to a ping command. The devices that respond to the inquiry and ping commands are compared to the devices already listed in the configuration files to determine whether any of the devices are new to the system. Step 284 represents a branch point based on whether any new off-host storage devices are detected.

If no new off-host storage devices are detected, control passes to step 288 to continue using the off-host storage devices already listed in the configuration files. If a new off-host storage device is detected, then control passes to step 286 to scale up the database using the additional off-host storage devices. The database can be scaled up by increasing the total size of the database, such as by adding additional files, or increasing the allotment to each file.

If, in step 262, it is determined that no off-host storage devices are already being used, then control passes to step 264 to determine whether any off-host storage devices are connected. The HBA devices are found using the inquiry command and the NAS devices are found using a ping. Step 266 represents the branch point based on detecting any off-host storage devices. If no off-host storage device is found, then control passes to step 268 to continue using internal storage on the host, such as the database server appliance. If even one off-host storage device is found, then control passes to step 270. In another embodiment, the space available on the newly found off-host storage devices is also checked during step 266. If the off-host storage devices do not have sufficient space to store the database files, then the system is considered not properly configured for off-host storage, and flow passes to step 268 to continue using internal storage.

In step 270 it is determined whether the database server is running for the first time for this database, e.g., whether this is the first boot-up of this database server. If so, then the database is being created and control passes to step 274 to create the database and store the database files initially on the one or more connected off-host storage devices. If not, then a database already exists on internal storage. In this case, control passes to step 272 to migrate the extant database to off-host storage from internal storage.

In step 272 the file systems on the off-host storage devices are mounted and the database files are copied to them—keeping the distribution of files across several disks on each device identical to the distribution across disks on the internal storage, if possible. If not possible, after copying is complete, the data files are modified, such as by moving some contents to new data files, to bring them into agreement with the distribution across disks. After the copying, directory services files are modified to indicate the off-host storage devices involved. If any of these migration functions fail, such as due to a lack of space, or due to communication failure, any changes are reversed (un-done) and the database server continues to use the internal storage.

In other embodiments, the steps can be performed in a different sequence. For example, the test for off-host storage devices connected to the host (steps 264 and 282) can be combined and performed first, before checking the configuration files in step 262. If no off-host storage devices are found, control passes to step 268 to use internal storage. If off-host storage devices are found, then it is determined whether any appear in the configuration files for the database in step 262. If none, control passes to step 270. If some are found, then control passes to step 284 to determine if any are new.

With off-host storage, database server processes are insulated from the storage system. This increases the reliability of the database on the network and allows sharing of the high-performance storage system on the database storage appliance 230 among multiple database server appliances 220 and other database appliances 240. This can save costs in establishing a database on a network because the database server appliance 220 may be less-expensive than a database appliance 240 that requires extra non-volatile storage to hold the data files themselves.

3.2 The IDSP System Components

FIG. 3A shows the environment and components of an Internet Database Service Provider (IDSP). In the embodiment depicted, a service provider 302 is connected directly to local network 312*a*, and to the Internet 320. Through the Internet 320, one or more other local networks 312*b* may be connected to the service provider 302. As used herein, a local network 312 includes one or more workstations or user platforms.

Service provider 302 may be characterized as an IDSP if it allows third parties to use and access, over a network such as the Internet, one or more databases that it controls and manages. An IDSP system 330 that may be used by service provider 302 to provide the database services shall be described in greater detail hereafter.

Service provider 302 may additionally be characterized as an Internet service provider (ISP) if it provides third parties with access to the Internet 320. For example, local network 312a may be owned by a third party that accesses the Internet 320 through service provider 302. When serving as an ISP, the third party that owns local network 312a connects to the service provider 302 network of components through a router 304. This connection may either be direct, as shown, or through one or more modems and a firewall (not shown). A firewall is a device that enforces a login procedure to ensure that a caller is authorized to access a network.

The service provider 302 may also be characterized as an application service provider (ASP) if it allows third parties to use and access, over a network such as the Internet, one or more software applications. Such applications may include, for example, inventory, accounting or billing applications. When the service provider serves as an ASP, the third party that owns local network 312b connects to the service provider 302 through the Internet 320.

The service provider 302 may support a public web site, which requires a platform 308a outside the firewall 306 and accessible via the Internet 320. The service provider 302 may also support one or more applications on private platform 308b, inside the firewall 306, not directly accessible via the Internet 320. To access the private platform 308b via the Internet, a user must engage a login procedure to pass through the firewall 306. A login procedure may be performed through a public Web page, e.g., Web page 340, that will allow the user to pass through the firewall 306. In other embodiments, the firewall 306 may be absent and either the entire system is open to the public or individual processes running on the various platforms 308 and 332 may enforce their own login procedures.

To support database procedures at the service provider 302, an Internet database service provider (IDSP) system 330 is incorporated at the service provider site 302. The IDSP system 330 includes an IDSP platform 332, an IDSP console 334, and one or more database devices. Database devices are any devices used to manage access to a database. The databases devices used by service provider 302 may include, for example, one or more database appliances 336 and/or one or more general-purpose computers 338 executing a database server program.

The IDSP platform 332 performs as a database device manager. It performs many database device management functions automatically. When action by the service provider 302 is required, an agent of the service provider 302, such as a database administrator employed by the service provider, may operate the IDSP system 330 through the IDSP console 334. The IDSP console runs a process, such as the ORACLE Enterprise Manager (OEM), for allowing a human database administrator to interact with the IDSP platform and its processes. Alternatively, the process running on the console can be as simple as a Web browser with most of the screens presented to the administrator being generated on the IDSP platform.

The IDSP system 330 provides database functionality for the service provider 302, and allows the service provider 302 to offer database functionality to customers such as the parties that own local networks 312. The IDSP system 330 is designed to automatically provide greater database functionality than is currently available at service providers on the Internet.

In the illustrated embodiment, the IDSP system 330 has one group of database appliances, e.g., 336a through 336d, configured as a staging area for testing new database applications and upgrades. The IDSP system 330 has a second group of database appliances, e.g., 336e through 336h, configured as a production area for providing database operations to the service provider 302 and its customers. Staging and production areas will be described in more detail below.

In cases where the service provider 302 is offering database functionality to its customers, a registration process, described later, will identify the database resources the customer is willing to pay the service provider to procure. As used herein, database resources include consumable database resources such as storage space, central processing unit (CPU) usage, connection bandwidth, number of users licensed for a database application, and number of transactions.

Database resources also include database applications, such as database development applications, sales database applications, invoice database applications, inventory database application, personnel database applications, document database applications, and many other software applications with database elements available from a variety of vendors.

To provide the consumable resources requested by the customers, the service provider 302 procures and installs database equipment, thus avoiding the need for the service provider's customers to buy and install the equipment. To provide the applications, the service provider procures and installs software, or contracts for downloading software as needed from one or more software vendors, thus avoiding the need for the service provider's customers to procure and install the software.

Depending on the consumable database resources for which customers have registered, the IDSP system 330 will configure a database device as either a dedicated device or a plurality of virtual devices. If the customer requires all the consumable resources provided by a database device, that device will be configured as a dedicated device for that customer. If, however, a customer requires only a portion of the consumable resources available on a database device, then that device can be shared among several customers. In this case, the IDSP system 330 will configure a virtual database device for that customer that comprises only a portion of the consumable resources available on the database device.

The connection between the local network 312 and the service provider 302, can be configured as an open Internet connection or as a virtual private network (VPN). A VPN uses Internet packets in which the payload is encrypted according to a procedure known only to the service provider and the particular local network requiring the private connection. The IDSP system 330 is configured to communicate with customers over either open Internet or VPN connections, at the option of the service provider 302.

According to one of the related applications cited above, database appliances are easily used in a network on which one or more general purpose computers can host certain shared processes, specifically a directory server process, a backup server process, and an integrated management console process. Alternatively, appliances can be obtained that perform each of these functions. In the embodiment depicted in FIG. 3A, the IDSP console 334 performs the presentation and input functions of the integrated management console for the database appliances 336 connected to the IDSP platform 332. At the console the database administrator for the platform owner can perform several functions including starting and shutting down a database, setting up automated tasks such as backups and reports, recognizing automatically when new appliances are added or removed, performing manual backups, running reports, applying patches, and monitoring the system.

In this embodiment, the backup server process, the directory server process and portions of the management services other than the user interface run on the IDSP platform.

3.3 A System of IDSPs

Figure 3B:
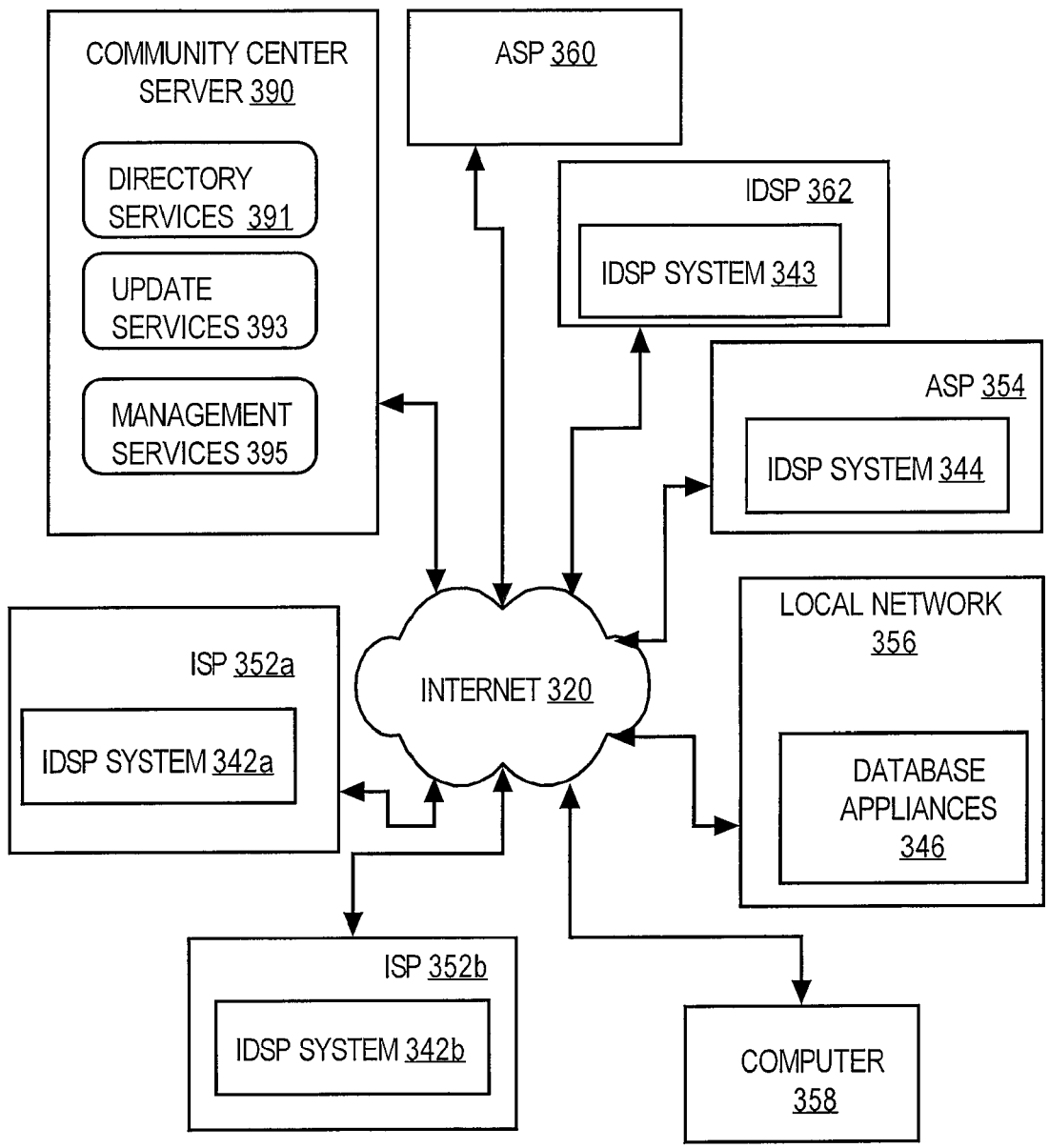
FIG. 3B is a block diagram of a community center server connected to the Internet according to one embodiment of the disclosed techniques.

The same database device management software installed on the IDSP platform 332, and the software on the database devices connected to it, can be used by many service providers. As with any software, the database device management software for the IDSP system will undergo incremental upgrades and replacements, denoted by different version numbers. FIG. 3B depicts a system for using the Internet to provide database software updates and other database services to one or more service providers.

According to the embodiment depicted in FIG. 3B, two ISPs 352a and 352b and an ASP 354 incorporate IDSP systems 342a, 342b, and 344, respectively. In addition, FIG. 3B illustrates an IDSP 362 that provides database services (without also providing ASP or ISP services) and an ASP 360 that subscribes to IDSP 362 for the database services required to support the application services provided by ASP 360. All of the service providers are connected to the Internet 320.

3.4 Community Server

A community center server 390, also called a community server, is also connected to the Internet 320 in order to distribute to the service providers database software and database software updates over the Internet 320. An update services process 393 runs on the community server 390 to send the updated software to a service provider. The update operation can be automatically triggered by an event (such as the posting of the new update), performed on a pre-defined schedule, and/or triggered by a request from the service providers.

In addition, the community server 390 provides the directory services required for managing a network of database appliances in a directory services process 391. In another embodiment, the community server 390 provides the backup services required for a network of database appliances in a backup services process (not shown). In addition, the community server 390 provides some management services 395 for the database networks on one or more of the service providers.

For example, using the management services process 395 on the community server 390, a database administrator for ASP 354, who happens to be away from the service provider's facility, can connect to the community server 390 from a computer 358 through the Internet 320 and perform some management functions. The database administrator, using computer 358, connects to the management services 395 on the community server 390 to check on the status of database appliances in IDSP 344, or configures them as virtual appliances, or to perform any number of database management tasks. Such powerful database administrative functions are preferably performed by requiring a login process between the user on computer 358 and the management services process 395, such as by establishing a VPN connection. A VPN connection can be established between the computer 358 and the community server 390 even if a VPN connection is not available with ASP 354. In this case, one or more of the management functions involves the database administrator sending to the community server data indicating authorized users and privileged requests related to the database being administered, including adding an authorized user and deleting an authorized user for the database, and changing database resources a user may access.

Other management functions include licensing software from the community server and changing license terms for using software licensed through the community server.

In another example, a customer of ASP 354 who has a database running in IDSP system 344 may obtain status information, such as a percentage of storage space being utilized by the customer's database, from the management services 395 on the community server 390 over the Internet. By using the community server 390, the customer can obtain this information from computer 358 even if the ASP 354 or its IDSP system 344 is off-line for any reason. The ASP 354 or IDSP system 344 may be off-line due to maintenance, equipment failure, or other failure.

Also shown in FIG. 3B is a local network 356 having its own database appliances 346. The community server 390 can provide the database appliances management required by the database appliances 346, such as directory services 391 and backup services (not shown). In addition, the community server 390 can update the software used by the local network 356 on the database appliances 346. Thus, the community server 390 can support one or more local networks managing their own database appliances even without a third-party services provider.

4.0 IDSP Processes Overview

Figure 4:
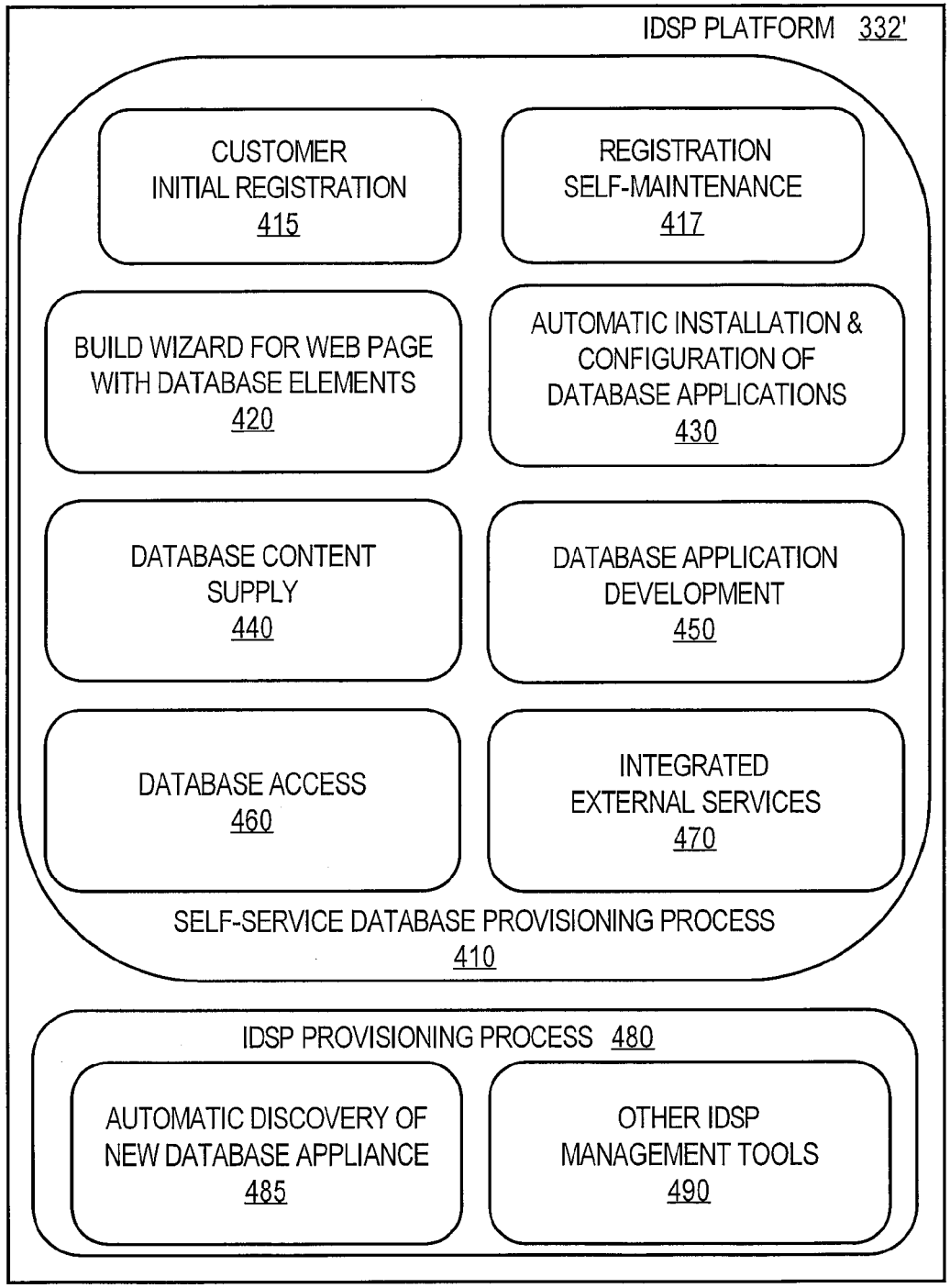
FIG. 4 is a block diagram of the processes available on a platform of an Internet database service provider showing database tools for the owner of the platform and self-service database tools for customers of the owner, according to one embodiment of the disclosed techniques.

FIG. 4 is a block diagram of the processes available on a platform of an Internet database service provider showing database tools for the owner of the platform and self-service database tools for customers of the owner, according to one embodiment of the disclosed techniques.

The IDSP platform 332 includes an IDSP provisioning process 480 that makes available several tools for the platform owner (the IDSP). The IDSP platform 332 also includes a self-service database provisioning process 410 that makes available several tools for the customers of the IDSP. Examples of tools that may be made available by these processes to the IDSP and to the customers of the IDSP shall be described in greater detail hereafter.

The customer of an IDSP may be any entity that requires database services but does not want to expend the time and resources to manage their own database system. For example, ASP 360 may provide over the Internet 320 a service, such as accounting, that requires the storage of data in a database. Rather than maintain its own database for its accounting application, ASP 360 can acquire database services over the Internet 320 from IDSP 362. In addition to ASPs, the customers of an IDSP may include companies that are running database applications for their own use (as opposed to ASPs that run applications for the use of other parties). A party using, for its own internal applications, the database services provided by IDSP 362 is represented by computer 358 in FIG. 3B.

According to one embodiment, not all the steps of each process are performed on the IDSP platform 332. Many steps of these processes, for example, are performed on one or more database appliances and other database devices connected to the platform. However, all these processes are at least launched from the processes running on the IDSP platform.

4.1 Self-Service Database Tools

The self-service database provisioning process 410 provides services to customers. As mentioned above, those customers may be any entities that require a database but that do not want the hassle and expense of maintaining the database themselves. Thus, a single IDSP may provide database services to multiple ASPs, ISPs, and to companies that require databases for their own internal applications (e.g. the inventory program of a warehouse company).

According to one embodiment, the customers use a client, such as a Web browser on a workstation in a local network, to obtain selectable database services from the service provider over a network. According to one embodiment, the services provided by process 410 are made available to customers by allowing the customers to access Web pages that have controls which, when selected, cause process 410 to perform or initiate a corresponding service.

According to one embodiment, the self-service process allows a customer to select a variety of services, including customer initial registration 415 and registration self-maintenance 417. Also included is access to a build wizard 420 for generating a web site of one or more web pages. The self-service process 410 allows a customer to obtain database applications using an automatic installation configuration process 430. A customer can also obtain content for a database created for the customer from a source of content using the database content supply process 440 of the self-service tools 410. The customer can develop a new database application using the database application development tool 450 of the self-service provisioning process 410.

The database access process 460 allows the customer to perform ordinary database functions for databases on the devices controlled by the IDSP platform 332 through the self-service provisioning process 410. The database to which the customer obtains access may be a database belonging to the customer or may be a database to which the customer has subscribed and which belongs to or is maintained by another party.

The integrated external services process 470 of the self-service database tools 410 provides a means for the customer to obtain services from processes outside the IDSP system 330, such as a credit card payment service. Each of these processes of the self-service database provisioning process 410 is described in more detail later below.

4.2 IDSP Management Tools

The IDSP provisioning process 480 provides database management tools for use by the IDSP. According to one embodiment, the process 480 includes a process 485 for the automatic discovery and registration of a new database appliance connected to the network of database devices in the IDSP system 330. The process 490 represents other IDSP management tools. Each of these processes is described in more detail in a later section. As with the tools selectable through the self-service process 410, some of the steps in these selectable processes may be performed on devices other than the IDSP platform. However, in one embodiment the IDSP platform 332 runs the platform-owner process 480 which at least launches the selected process.

5.0 Self-Service Registration 5.1 Self-Service Initial Registration

Figure 5A:
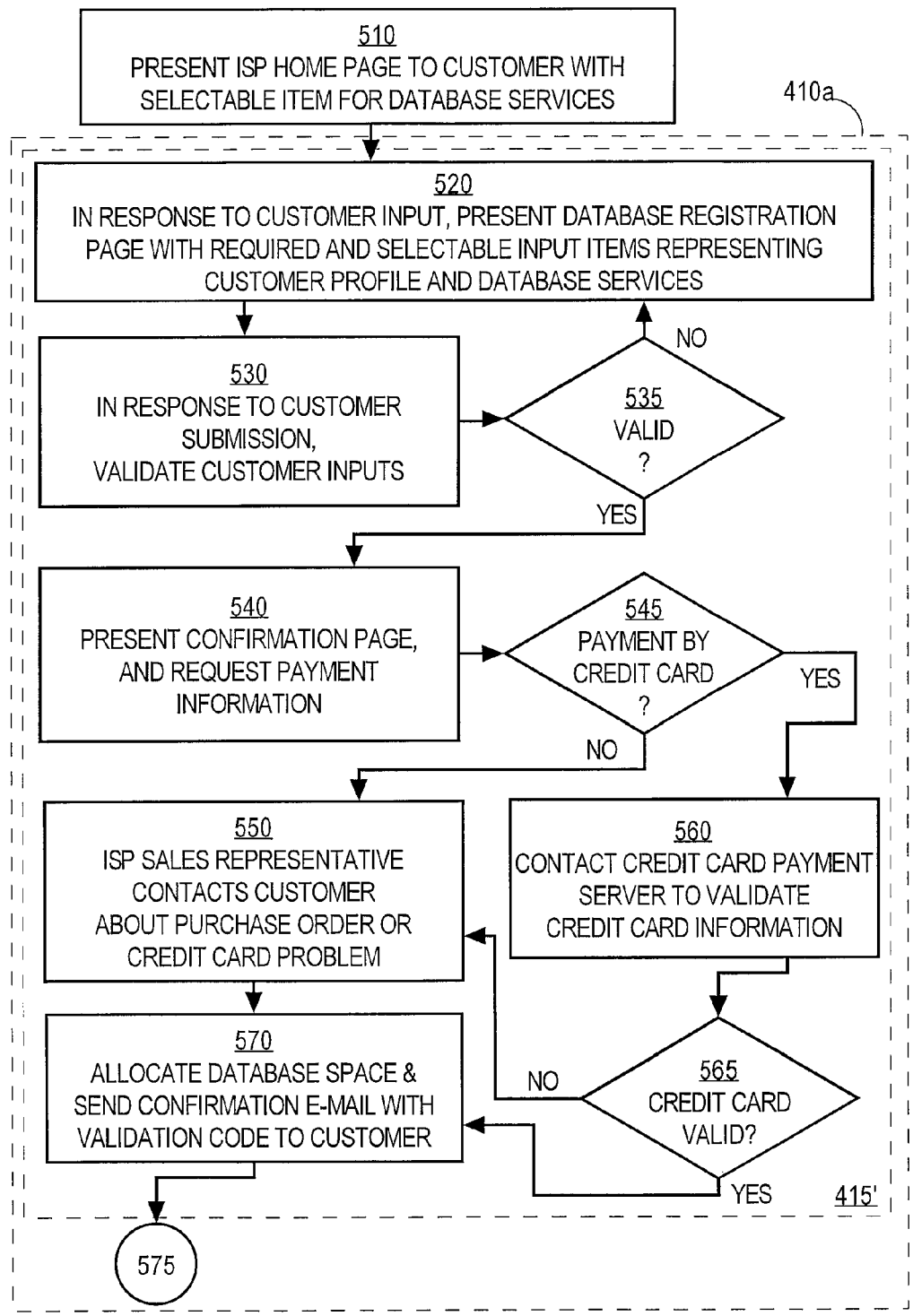
FIG. 5A is a flowchart depicting self-registration by a customer according to one embodiment of the disclosed techniques.

FIG. 5A is a flowchart depicting self-registration by a customer according to one embodiment of the disclosed techniques. In this embodiment, the customer registers with the IDSP system online. The registration is consistent with any registration for other services provided by the service provider, so that the customer does not have to register several times to access various services. In case the services provider does not have any registration module, the IDSP registration process will handle the registration. The customer is prompted to provide personal and billing information and select the services that the customer wishes to subscribe to, as described in more detail below. In case the services provider already has a registration service, the IDSP system employs an application program interface (API) so that the existing system can be used. This API transfers to the IDSP system a list of services that the customer has subscribed to, as well as the username and password that have been assigned to the customer.

At the conclusion of the registration process, the IDSP system automatically creates an account for the customer and allocates the storage space and other consumable resources for which the customer has registered, configures the database devices as necessary, and provides data for a costing model described in more detail in a later section. Once the customer has registered, the customer can obtain access to the registered services through a personal Web page presented to the customer's client process by the IDSP system.

In FIG. 5A, a customer of the service provider connects to a home page for the service provider. In step 510 the home page is presented to the customer with a selectable item, such as an icon, a button, or a menu item, for indicating that the customer wants to obtain database services from the service provider. If the customer selects the selectable item, then control passes to step 520 in which the customer is presented with a self registration page to obtain any information not already obtained from the service provider registration process. This registration page includes input items, such as forms and data entry fields, in which the customer may enter required profile information, required database resources information, and selectable data resources information.

After the customer has input information into the input items and chosen to submit the information to the registration process, a customer's inputs are validated in step 530. This validation may be performed on the IDSP platform itself, or may be performed on the customer's client process using routines downloaded to the customer's client process in a manner known in the art, such as with a Common Gateway Interface (CGI) script or a JAVA applet. The validation includes checks on the customer inputs, such as ensuring that every required field is filled. In step 535 the result of the validation is checked. If validation failed, control returns to step 520. If the customer inputs were found to be valid, control passes to step 540.

In step 540, the confirmation page is presented to the customer with an input item requesting payment information. The presentation provides an input item for payment by credit card and an input item for payment by purchase order. In step 545 it is determined whether payment is by credit card. If so, control passes to step 560 where a credit card payment server is contacted to validate that the credit card information provided in step 540 is correct, and the credit card accounts can accommodate the costs of the subscribed database resources. In step 565, it is determined whether the credit card payment server validated the credit card information. If so, control passes to step 570.

In step 570, the IDSP system configures the database devices to allocate the database resources, such as storage space, for which the customer subscribed. The IDSP system then sends a confirmation e-mail to the customer with a validation code, such as a password, and an address of a Web page for subsequently logging onto the IDSP system. The Web page address can be expressed in any way known in the art, such as with a Universal Resource Locator (URL) name. In step 575, the customer's home page is presented to the customer.

If, in step 545, payment is determined to be by purchase order, or in step 565, the credit card information was found to be invalid, control passes to step 550. In step 550, a human sales representative of the service provider contacts the customer. Procedures to use the purchase order or resolve the credit card problem are negotiated by the service provider sales representative and the customer. When these issues are resolved, then the service provider's sales representative returns control to step 570. The registration process is automatic and requires no human interaction except for step 550.

Thus, if the customer provides valid credit card information, the entire self-registration process is accomplished without intervention by personnel of the service provider. This reduces the cost to the service provider of registering customers for the database services.

Figure 5B:
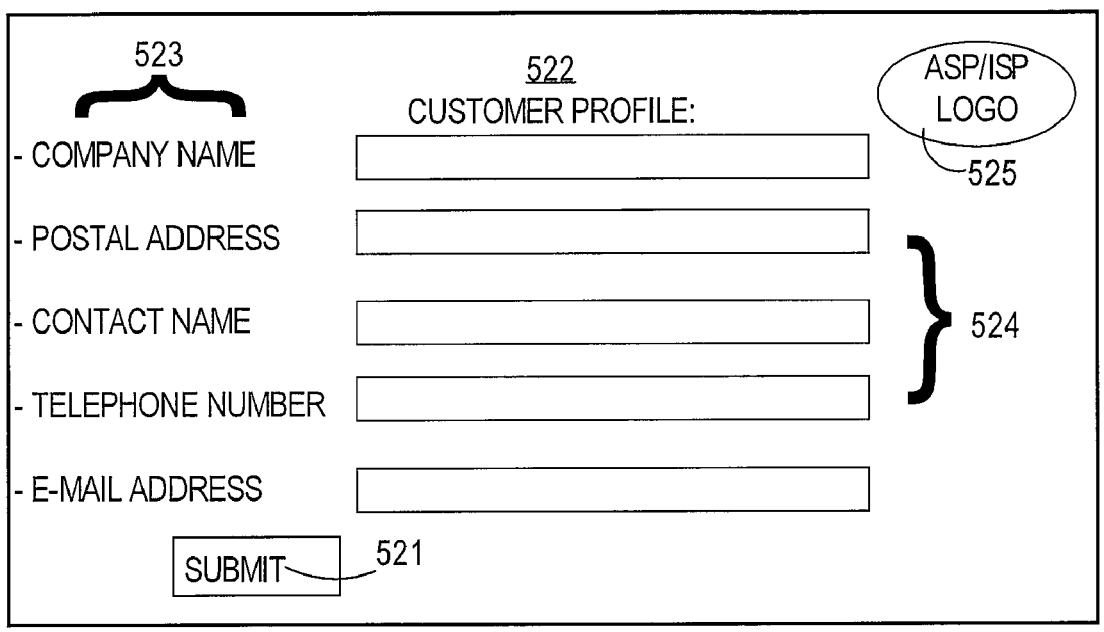
FIG. 5B is a diagram of components on a screen presented to a customer for receiving customer profile input during the self-registration process according to one embodiment of the disclosed techniques.

FIG. 5B is a diagram of components on a screen presented to a customer for receiving customer profile input during the self-registration process according to one embodiment of the disclosed techniques. This customer profile screen 522 includes a list of labels 523 indicating information to be input by the customer using the screen. Adjacent to each label 523 is input area 524 where a customer may enter alphabetical or numeric characters that represent the requested information. This screen can be customized by the service provider, for example, with a logo 525 of the service provider. Customization of presentations used throughout the self-service database provisioning process can be performed as a database service selectable by the database administrator while operating the IDSP provisioning process, described later. When the customer is finished putting the information requested into the customer profile screen 522, the customer activates the submit button 521. This screen 522 is an example of forms that can be presented on a customer's platform by a client process, such as a browser executing a CGI script or JAVA applet.

Figure 5C:
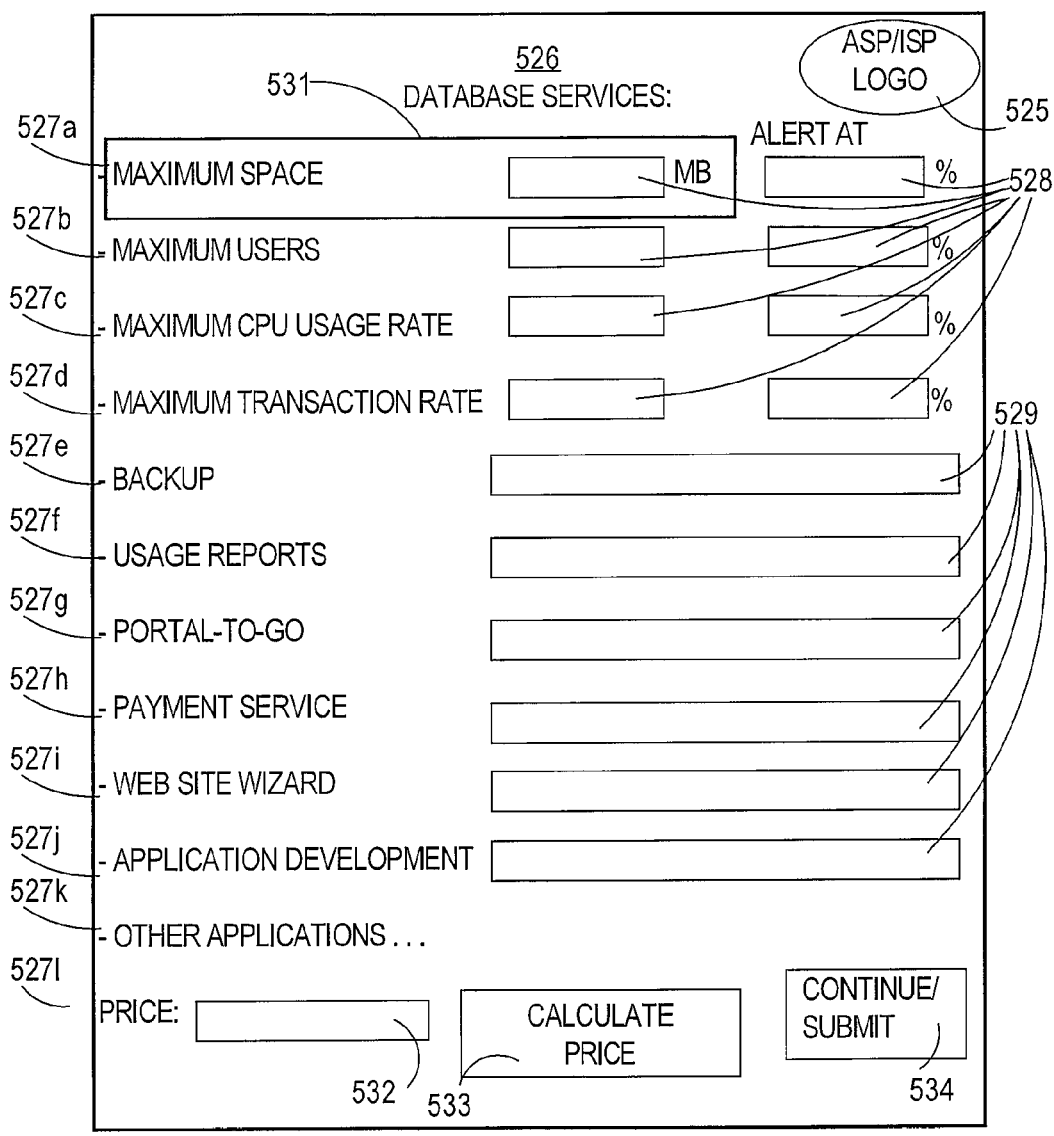
FIG. 5C is a diagram of components on a screen presented to a customer for receiving customer input concerning database service subscriptions during the self-registration process, according to one embodiment of the disclosed techniques.

FIG. 5C is a diagram of components on a screen presented to a customer for receiving customer input concerning database service subscriptions during the self-registration process, according to one embodiment of the disclosed techniques. FIG. 5C shows a database services subscriptions screen 526 on which a customer indicates the database resources for which the customer wishes to subscribe. This screen includes a list of labels 527 indicating information the customer may input. Not all the information requested on this page is required. Required information is indicated separately in any way known in the art, such as by highlighting an area 531 of the screen 526. Some of the information requested on this screen relates to consumable database resources, for example, the information indicated by labels 527$a$ through 527$d$. Other of the information requested on this screen 526 relates to database services to which the customer can subscribe, for example, the information indicated by labels 527$e$ through 527$k$.

For consumable database resources the customer may enter an amount and a percentage in numeric input fields 528. The amount entered in the first column of numeric input fields 528 indicates a maximum value for the particular consumable database resource for which the customer is subscribing. The number entered in a field in the second column, under the words "alert at" must be less than 100. This number indicates a percentage of the maximum amount that is used as a threshold. When usage of the particular consumable database resource exceeds the threshold, then an alert is sent to the customer. If the customer does not enter a value for its threshold percentage, then the IDSP system will use a default threshold percentage, such as 75 percent (%). For example, with a 75% system default threshold percentage, a customer who has subscribed for 200 megabytes (MB) of storage will be alerted when the customer's databases consume more than 150 MB of storage. The alert is presented on the customer's database home page and a separate alert is sent in an electronic mail message to the mail address in the customer's profile. In another embodiment, the customer's pager is used to carry the alert.

For database services, the customer enters input using input items 529. These input items may be pull-down menus or may be buttons that launch dialog boxes to obtain further information from the customer. If all the database services available for subscription from the IDSP system cannot be listed on a single screen 526, then the additional database services can be listed in following screens. When the customer is finished with the screen and wishes to move to the next screen, the customer presses the continue button 534. If the screen 526 is the last screen or the only screen, when the customer is finished, the customer presses a submit button 534 in lieu of the continue button. Both buttons are represented in FIG. 5C by button 534.

The database services indicated by labels 527$e$ through 527$k$, and following screens if necessary, are placed on the database services subscriptions screen 526 by the IDSP system based on the services installed by the database administrator, or other agent of the service provider. Installing a service here means installing the various applications directly on the IDSP platform or a database device connected to the IDSP platform, or installing the interfaces supporting the services.

The price a customer will pay for the database resources to which the customer has subscribed, will vary according to a costing model. The database services subscriptions screen 526 presents the customer with a selectable item, such as the "calculate price" button 533, for determining what the price will be. The computed price is displayed in area 532 of the database services screen 526 marked by the label 527$l$.

5.2 Self-Service Maintenance of Registration

Figure 5D:
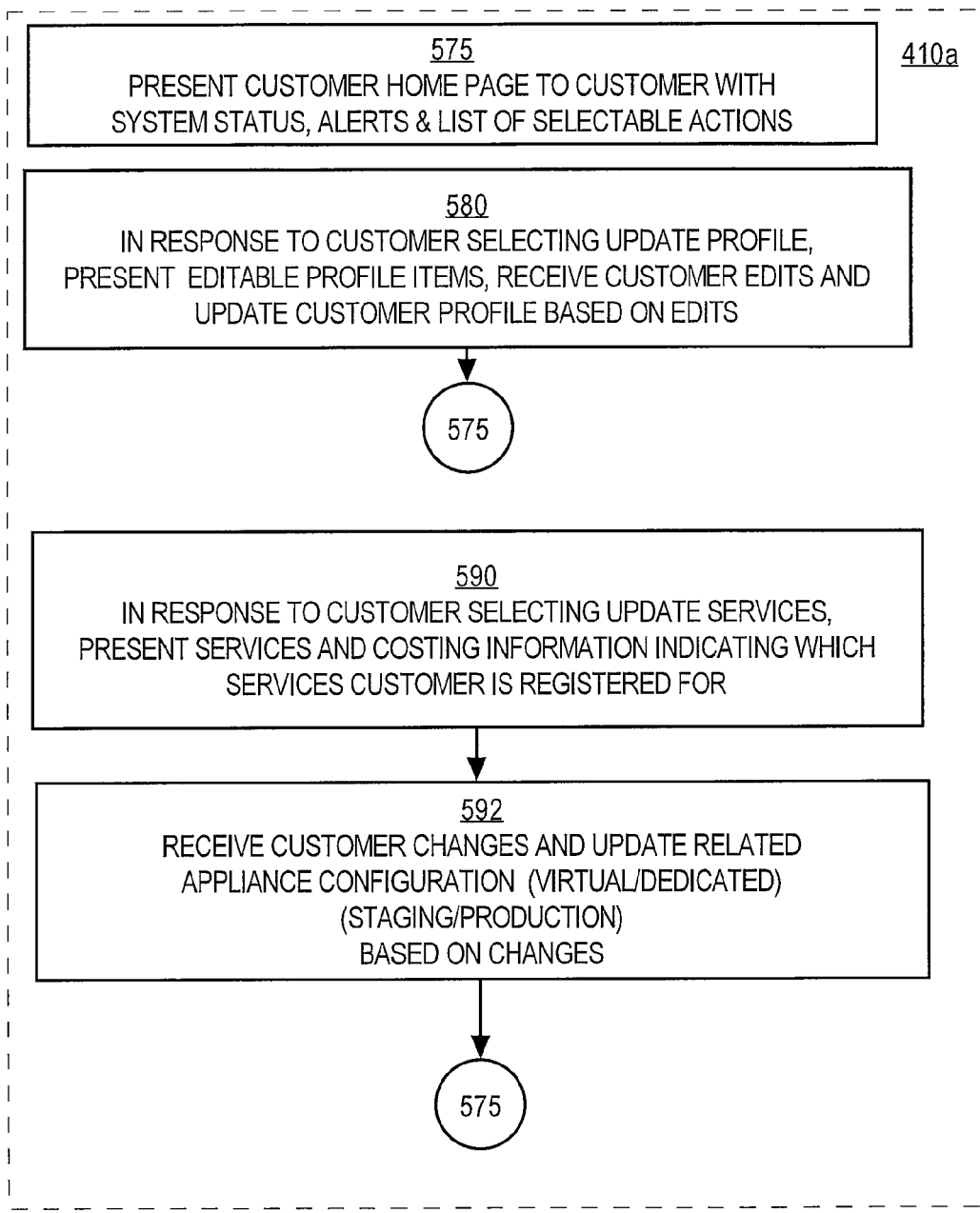
FIG. 5D is a flowchart showing steps in a process for registration self-maintenance according to an embodiment of the disclosed techniques.

FIG. 5D is a flowchart showing steps in a process for registration self-maintenance according to an embodiment of the disclosed techniques. Starting at the customer's home page in step 575, the customer is presented with indications of system status of the database resources to which the customer has subscribed, i.e., the subscribed database resources. The customer is also presented with any alerts corresponding to the subscribed database resources. The customer is also presented with one or more selectable actions, for example, in a list of selectable actions.

Among the selectable actions is an item representing updating the customer's profile information. If this item is selected, control passes to step 580 in which the customer is prompted to provide edits that are used to update the customer's profile information. After the profile is updated, control passes back to step 575 to present the customer's home page.

Also among the selectable actions is an item representing updating the subscribed database resources. If this item is selected, control passes to step 590, which presents to the customer the database resources to which the customer has subscribed, including the maximum amount and threshold percentage for one or more consumable database resources. In step 592, the system receives changes to the subscribed resources from the customer. In response to these changes, the system updates the configuration allocating database resources to the customer. If necessary, the configuration of database devices, as virtual or dedicated and as a staging device or production device, are changed as well. While or after the subscribed resources are changed and the database devices are reconfigured, control returns to step 575 to present the customer's home page to the customer.

6.0 Web Site Building Wizard

According to one embodiment, one of the self-service processes allows a customer who has no programming expertise to build a web site with database components. This process is called a wizard because it prompts for customer inputs in a series of screens that are easy for the customer to respond to.

6.1 Dot Com Appliance

According to one embodiment, the database web site building wizard is not executed entirely within the IDSP platform, but is performed using a database web site building wizard appliance. This appliance is also called a DotCom appliance because the appliance makes it easy for an enterprise to generate a web site, and most enterprise web sites have URL addresses that include ".com."

Figure 6A:
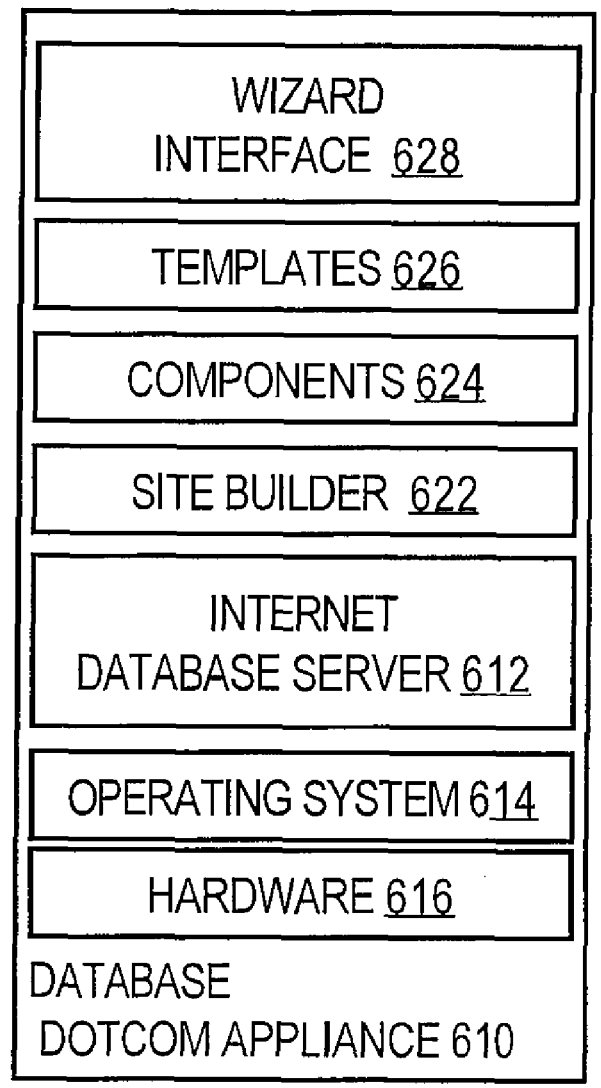
FIG. 6A is a block diagram of a database web site building appliance according to an embodiment of the disclosed techniques.

FIG. 6A is a block diagram of a database web site building wizard appliance according to an embodiment of the disclosed techniques. The DotCom appliance 610 comprises hardware 616 and a special-purpose operating system 614. The appliance also includes a process 628 for generating the wizard interface and presenting it to an agent of the enterprise building the web site. The DotCom appliance need not be installed in an IDSP system 330, but can be plugged into any database appliance network. The DotCom appliance also includes components 624 used in such web sites, including database components. The DotCom appliance also includes templates 626, which are combinations of components 624 that are frequently used in broad categories of web sites. The broad categories of web sites are associated with certain kinds of web site activity, such as those engaged in by corporate headquarters web sites, retailers web sites, and social center web sites. The special-purpose operating system 614 on the DotCom appliance 610 is tailored to the wizard interface process 628. The special-purpose operating system has features and a configuration that are dictated by the database web site wizard and supporting program components.

The DotCom appliance 610 in FIG. 6A also shows processes for an Internet database server 612 and a site building process 622. The wizard interface process 628 converts inputs received from the agent of the enterprise into commands that (1) use the database server to create the database and (2) use the site builder process to build a web site based on the database.

In an alternative embodiment, the Internet database server process 612 and a site building process 622 are not included in the DotCom appliance but reside on other devices. In the alternative embodiment, the DotCom appliance is networked with an Internet database server appliance and a site builder appliance. Then, when the wizard interface process 628 issues commands for the Internet database server or site builder, those commands become requests communicated over the network. Such requests are responded to by an Internet database appliance and site builder appliance, respectively.

In another alternative embodiment, the site builder process and Internet database server process are on a single appliance, which may be called a database site builder appliance.

In the preferred embodiment, the IDSP system includes a DotCom appliance for building a database web site when the customer selects the database web site building wizard among the self-service data provisioning tools. In an alternative embodiment, this wizard is implemented as a process on the IDSP platform itself.

6.2 Overview of Web Site Building Wizard

Figure 6B:
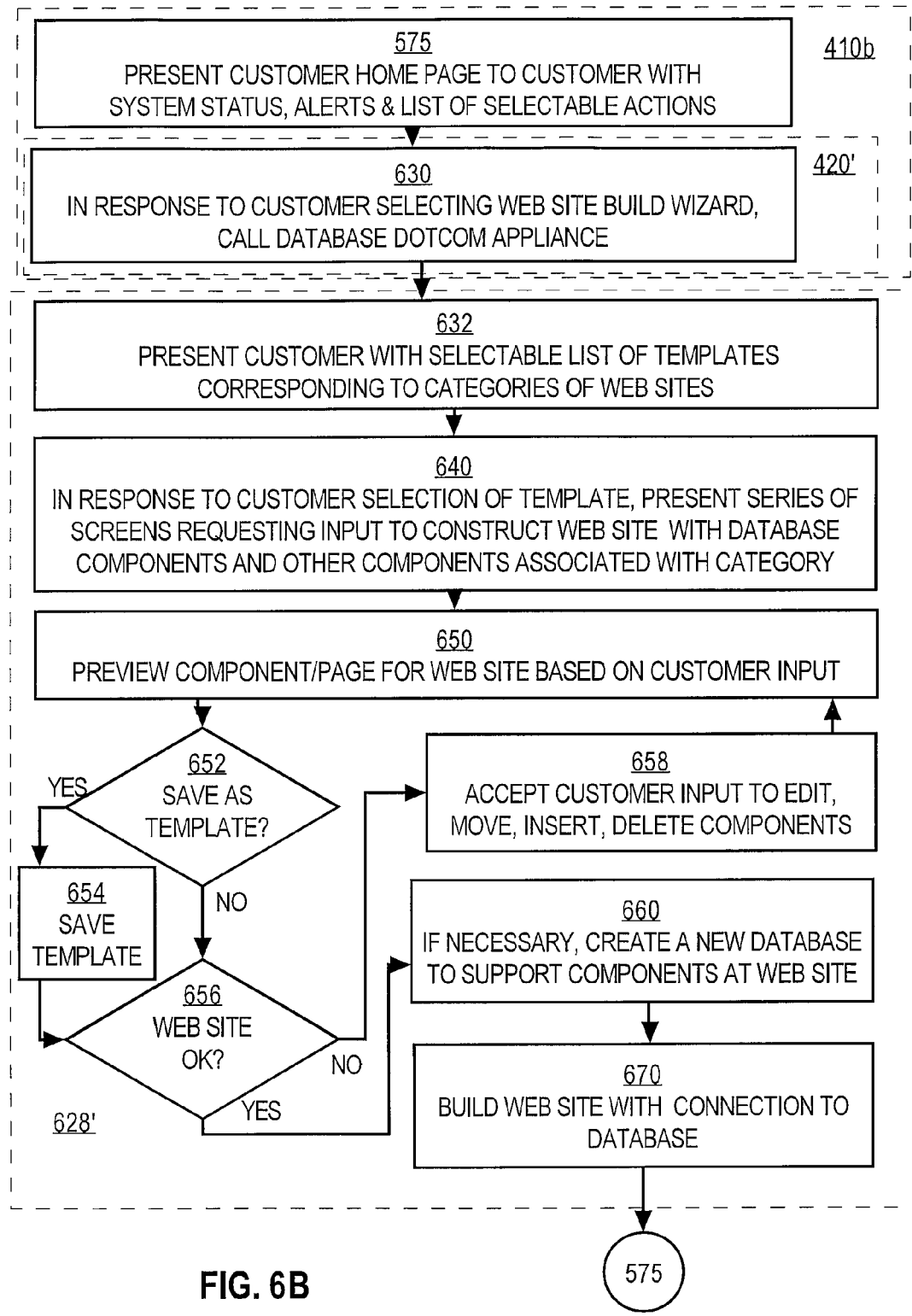
FIG. 6B is a flowchart of a database web site building wizard according to an embodiment of the disclosed techniques.

FIG. 6B is a flowchart including steps performed by a database web site building wizard according to one embodiment. The process begins in step 575 in which the customer's current home page is presented the customer. If the customer is just beginning the process of creating its web site, then the home page presented at this point in the process may have minimal content. Other features on the home page, such as system status, alerts and a list of selectable actions, support other self-service functions as described in other sections. One of the selectable actions is to launch the web site building wizard.

In response to the customer selecting the database web site building wizard, control passes to step 630 which sends a request to the wizard interface process 628 which, as explained previously, may reside on a DotCom appliance. In step 632, the wizard presents, to the customer, selectable items representing selectable templates. Each template corresponds to a category of web sites. For example, one template corresponds to corporate headquarters web sites. Another template corresponds to another category of web site, such as a retailer web site. Templates are described in more detail later.

In step 640, the wizard presents to the customer a series of screens requesting additional inputs. The template and the additional inputs are used by the wizard to determine how to construct a web site with database components and other components associated with the template. The web site components that are assembled into templates are described in more detail later.

At any time of the customer's choosing, the customer is presented, in step 650, with a preview of a selected component or Web page for the web site, showing the effect of any customer inputs into the series of screens.

In step 652, the customer is given the option to save the current arrangement of the web site as a new customer site template. If the customer chooses to save the template, the template is saved in step 654 and control passes to step 656. If the customer chooses not to save the template, then control passes directly to step 656.

In step 656, the customer is given the choice to finalize the web site. If the customer feels the web site is not correct, and does not want to approve the web site in its current room, the customer chooses "No" and control passes to step 658. In step 658, the wizard accepts additional customer inputs to edit, move or modify components from the current arrangement of the web site. At any point of the user's choosing, control passes back to step 650 to preview the web site and its components.

If, in step 656, the customer feels the web site is correct, control passes to step 660. In step 660, a database is created to support the components on the web site. This is done using the Internet database server which may be on a different appliance altogether. In step 670, the web site is built based on contents of the database. This is done with a site builder which may be on another different appliance. Control returns to step 575 in which the customer's home page is presented the customer.

6.3 Customization of the Web Site Building Wizard

Figure 6C:
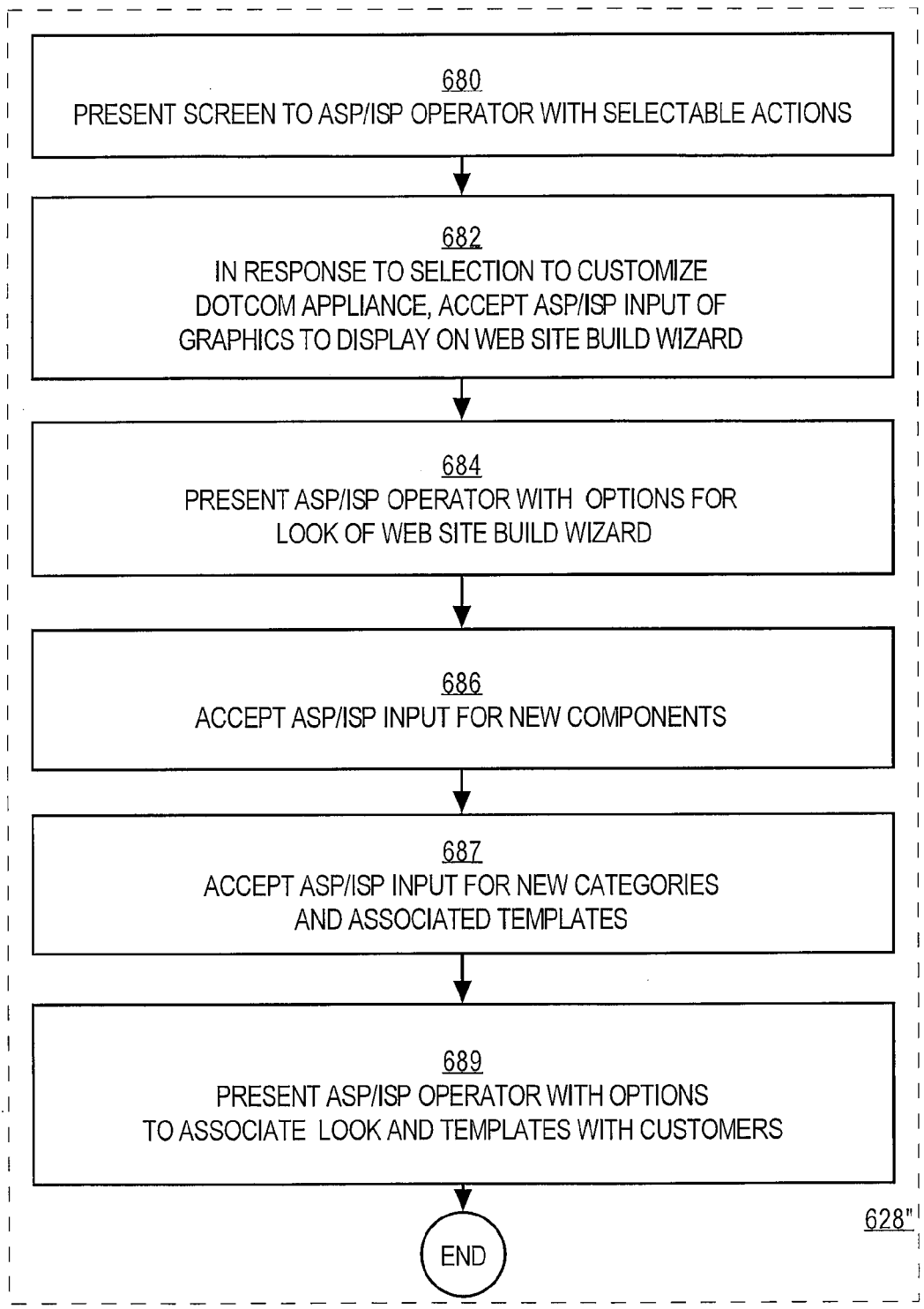
FIG. 6C is a flowchart of a customization process for a provider of the database web site building wizard according to an embodiment of the disclosed techniques.

Before describing web site components and templates in more detail below, a process is described which allows the DotCom appliance owner to customize the presentations made to the user of the wizard, e.g., a web site designer. FIG. 6C is a flowchart of a customization process for a provider of the database web site building wizard according to an embodiment of the disclosed techniques.

In step 680, a screen is presented to the service provider that includes the selectable actions. The screen is presented as part of the IDSP provisioning process in the embodiment in which the DotCom appliance is part of the IDSP system. In an alternative embodiment, the screen is presented to the appliance owner as a separate customization process. In step 682, in response to selecting the option to customize the DotCom appliance, the process accepts the appliance owner's inputs of graphics to display on the screens of the web site building wizard. In step 684, the customization process presents the appliance owner options affecting the look of web site building wizard, such as the color and fonts on the wizard screens. In one embodiment these customized aspects of the wizard are stores in the templates for the wizard.

In step 686, the customization process accepts the appliance owner's inputs describing the web site components to add to the list of selectable components. In step 687, the customization process accepts the appliance owner's inputs describing new categories of web sites and the associated templates with unique combinations of web site components. These new templates are stored and added to the list of templates a web designer may select when operating the wizard.

In step 689, the customization process allows the appliance owner to associate the look of the wizard screens and the available templates with particular customers who may select the wizard. After step 689, the customization process ends, and the database web site building wizard option is ready to be selected and operated by a customer.

6.4 Web Site Components

Web site components handle specific functional needs of an enterprise operating a web site on the Internet. A web site component that uses the support of a database is called a database component. Information that is fixed and unchanging for all visitors to a site can be handled by components that are not database components. Examples of such components are a site logo, a site name, a legal notice, terms of use, and a privacy statement. Information for the web site that may be updated over time, or information that changes among visitors, usually requires a supporting database and is thus considered a database component. Examples of web site database components include a product or service description, a product/service price, a list of products/services, a component for searching for a product/service among the list of products, a hierarchical list of products/services within categories and subcategories, a component for searching products/services falling within a category or subcategory, support contact information, personnel lists, an item to search a personnel list, a map of the web site, links to related web sites, a calendar of appointments/events, a banner advertisement and a shopping cart. The above list is not comprehensive, or intended to be, as one who visits numerous web sites can attest.

In a preferred embodiment, all the components of the web site are stored in a database and a web page for the site is generated from the information stored in the database when a browser requests the page. This arrangement allows even relatively static information such as a corporate logo to be easily modified in one location in the database and subsequently displayed in its modified form on pages generated thereafter.

The web site building wizard appliance stores a large number of such components so that a novice user does not have to reinvent them. The components can be represented in any manner known in the art. In one embodiment, each component is described by an extensible markup language (XML) document. XML uses user-definable tags to mark sections of text and other resources. Resources that are not text may be identified within an XML document by text that designates their address, such as their URL address. The XML tags are used to define one or more database objects, such as tables, queries, procedures, or indexes, that together comprise a web site database component.

The web site building wizard allows the user to customize and expand the functionality of the predefined components. Using XML, each component is described using defined tags and parameter values. The tags for a particular set of XML documents, such as templates for a site, are defined in a document type definition (DTD) document or file. An XML stylesheet is used to generate code for an HTML document from the XML data, and the resulting HTML document is sent to the user's browser for presentation as a web page to the user. The designer user of the wizard can select a component to include in the web site or modify a component by changing the parameter values or both. More detail on how this is accomplished in an example embodiment is described in a later section.

6.5 Web Site Templates

As indicated above, the web site components can be combined in a huge number of permutations. Only some permutations present the web site components in an orderly way easily understood by a visitor to the web site. Many person-months, even person-years, of experience have gone into developing some of the more successful web sites on the Internet. Few small to medium-size enterprises can afford the expense of duplicating that experience. Thus, the database web site building wizard disclosed here prearranges these large number of web site components into one or more templates.

Each template stores a combination of web site components in an arrangement that is especially appropriate for a given category of activity on the Internet. In one embodiment, the template is constructed in the XML language in a site-template XML file and references the XML documents describing individual components. In one embodiment, the XML statements describing the individual components are copied into the site-template XML file. The reference may take the form of an anchor with a link giving the network address where the XML file for the component is to be found.

Using XML to represent components and templates allows the wizard to easily store the templates, to easily allow the customer to move the components around by changing their description and position in the XML file, and to easily store a description of the web site, including any edits made by the customer. The XML statements are understood by some browsers and are translated using stylesheets to the hypertext markup language (HTML) statements understood by all browsers for presentation to the customer.

According to one embodiment, the wizard represents the customer's web site using an XML file (the "customer site XML file"). When the customer initially selects a template, the components defined in the XML associated with the template are added to the customer site XML file. As the user goes from screen to screen in the wizard, the user specifies changes, deletions or additions to the components in the site. In response to the user input entered through these screens, the wizard changes, deletes or adds XML content in the customer site XML file.

When the customer has completed the wizard process, the wizard uses the customer site XML file to automatically generate the objects and code required to implement the customer site. According to one embodiment, statements within the customer site XML file are used with a translator to convert the statements to commands understood by a database server, as in step 660, described above. The database server responds to the commands by building a database to support those components. A web site is then built with the web site builder based on that database, as in step 670, described above. In one embodiment, the commercial product WebDB of the ORACLE™ Corporation is used to both store components and pages in a database and to dynamically generate a page of the web site based on information in the database in response to a visitor request for that page. More detail on how this is accomplished in an example embodiment is described in a later section.

6.5.1 Example Retailer Web Site Template

An example retailer web site template contains the following hierarchy of folders, each folder containing the listed components. A page of the web site includes one or more folders.

1. Site logo and site name.
2. A customizable menu containing a list of services offered.
3. A search window with a text box and a "Go" button.
4. Categories and subcategories of products/services.
5. A product/service description including:
logo
Picture/multimedia
text
Price
reviews from other buyers
button to add product to shopping cart
text box to input visitor review
text box to input e-mail address to direct a copy of the description
6. Shopping cart.
7. Payment server.
8. Text box describing how to order products/service found on the site.
9. A map of the site.
10. A menu for online help.
11. A description of discounts for best buys.
12. A dialog box to input visitor's preferences/interests.
13. Banner advertisement.

6.5.2 Example Corporate Headquarters Web Site Template

An example corporate web site template contains the following hierarchy of folders, each folder containing the listed components. A page of the web site includes one or more folders.
1. Site logo and site name.
2. Site map.
3. Categories of products/services:
products/services:
　list of products/services by category
　detailed information on individual product/service
　news and press releases about products/services
　selectable item to search within category
　buttons to download free files of products
support
details of support portfolios
technical documents for download
support contact information
　selectable item to search within support
4. Customer successes.
top/recent success stories
　selectable item to search within success stories
5. Partners/alliances
list of services for partners
detailed information on individual service for partners
dialog box to allow visitor to register as partner
news and press releases about partner/alliance services
selectable item to search within partner/alliance services
6. Developer's forum
information about the developers forum
Chat service
bulletin board
link to Internet magazine for technology updates
visitor e-mail address input item for technology updates
dialog box when role into the forum
7. About the company.
corporate news/annual reports
investor information
publications
biographies of directors/officers
8. News from the company.
public relations contacts
press releases
9. Events involving the company
details of upcoming events
dialog box to register for event
10. Free downloads
description of free software
selectable item indicating software to download and nearest server
11. Online store
components from retailers web site template
12. Employment opportunities
description of position open
dialog box to apply for open position
13. Feedback
form where visitor inputs comments
14. Description of current marketing push
15. Description of current hot topics
16. Recent announcements.
17. A search window with a text box and a "Go" button.
18. A menu for online help.
19. Legal notice and terms of use.
20. Privacy statements.

6.5.3 Example Social Center Web Site Template

An example social center web site template contains the following hierarchy of folders, each folder containing the listed components. A page of the web site includes one or more folders.
1. Site logo and site name.
2. A dialog box for the visitor to sign up to join the social center.
3. Input menus to customize content for future visits to the site.
　news categories
　　top stories
　　global news
　　local news
　　business news
　　technology news
　　sports news
　　travel news
　　health news
　　entertainment news
　weather
　stock quotes
　movie schedule
　top movies of the week
　television show schedule
　maps and directions
4. Input menus to customize layouts for future visits to the site.
5. E-mail.
6. Calendar.
7. Address Book.
8. Voicemail facility.
9. Messaging/paging facility.
10. Chat facility.
11. Directory services.
12. Search window to search the Web—
input text box and go button/link to search engine.
13. Members grouped by area of interest category.
14. Services provided by area of interest category.
15. Banner advertisement for category chosen.
16. Search window to search the site by area of interest category.
17. News/information specific to area of interest category.
18. Mechanism to edit the content of news stories.
19. Mechanism to customize the location of weather information.

20. Mechanism to customize stock price information.

21. Mechanism to customize the latest scores reported in the sports section.

22. Horoscope and mechanism to customize horoscope sign.

23. Mechanism to build and host personal web site.

24. Section for running classified advertisements.

25. Online shopping categories:

apparel books music and video electronics health and beauty

26. Banner advertisement.

27. Menu for online help.

6.6 Example XML Components and Template

Table 1A shows several statements of a document type definition (DTD) file defining XML elements used to describe web site components according to an embodiment.

TABLE 1A

DTD statements defining XML elements
used to describe web site components

| Statement Number | DTD Statement |
|---|---|
| 1 | <!ELEMENT dca-component (name title layout description service* custom?)> |
| 2 | <!ELEMENT name (#PCDATA)*> |
| 3 | <!ELEMENT title (#PCDATA)*> |
| 4 | <!ELEMENT layout (#PCDATA)*> |
| 5 | <!ELEMENT description (#PCDATA)*> |
| 6 | <!ELEMENT service (type url method authuser authpass)*> |
| 7 | <!ELEMENT type (#PCDATA)> |
| 8 | <!ELEMENT url (#PCDATA)> |
| 9 | <!ELEMENT method (#PCDATA)> |
| 10 | <!ELEMENT authuser (#PCDATA)*> |
| 11 | <!ELEMENT authpass (#PCDATA)*> |
| 12 | <!ELEMENT custom (input+)> |
| 13 | <!ELEMENT input EMPTY> |
| 14 | <!ATTLIST input type ENUMERATED(text\|checkbox\|radio\|reset\|submit) #REQUIRED> |
| 15 | <!ATTLIST input name CDATA #REQUIRED> |
| 16 | <!ATTLIST input value CDATA #REQUIRED> |
| 17 | <!ATTLIST input label CDATA #REQUIRED> |
| 18 | <!ATTLIST input checked ENUMERATED(CHECKED\|UNCHECKED) #IMPLIED> |

The DTD statements included in Table 1A define characteristics of elements used to define web site components in XML. As indicated by the statement in line 1 of Table 1A, each component is described using a "dca-component" element that is required to have elements called "name" "title" "layout" and "description" in which such information is placed, as described in more detail below. Lines 2 through 5 indicate that these elements include any amount of parsed character data as indicated by "#PCDATA". The dca-component element may optionally include as many "service" elements as needed, as indicated by the "*." The dca-component may also include zero or one "custom" elements, as indicated by the "?" symbol.

The DTD statement in line 6 indicates that the service element allowed in a dca-component element requires child elements called "type" "url" "method" "authuser" and "authpass" in which additional information is placed, as described in more detail below. Lines 7 through 11 indicate that these elements include parsed character data and that some character data must be included in the "type", "url" and "method" elements. As described below, these elements in the service element are used to define each service provided for a web page component. For each service, the type of user who may request the service is specified in the "type" element, the URL of the procedure that performs the service is specified in the "url" element, and the HTML form method to pass information from the user to the procedure is specified in the "method" element. These elements must include character data to specify this information. The next two elements, "authuser" and "authpass" optionally include data to specify authorized users and authorized user passwords, respectively.

The DTD statement in line 12 indicates that the custom element allowed in a dca-component element requires at least one child element called "input" in which additional information is placed, as described in more detail below. As described below, the custom element is used to define adjustable properties of a component that can be customized by a web designer. Since not every component can be customized, this element is not required by the dca-component element. If present, it is present only once. The actual properties that can be adjusted, and the way that the adjustment information is input by the web site designer, are described by the input elements included in the custom element. The "+" symbol indicates that at least one input element is required if the custom element is used.

The DTD statement in line 13 indicates that the input element in a custom element is empty, i.e., contains no other elements. The information held in the input element is held in the attributes list. One input element is included for each property of a web component that a web designer can adjust. Lines 14 through 18 list the attributes of each input element. As described below in more detail, these attributes describe the way a user inputs each adjustable property of a component. For each input, the type input is specified in the "type" attribute listed in line 14. Line 14 indicates that the type attribute holds character data as indicated by "CDATA," and that the type attribute is required when using the input element. Line 14 also indicates that allowed values for the type attribute are the enumerated values "text," "checkbox," "radio," "reset," and "submit." These correspond to the types of input fields on an HTML form. The input type attribute is used to determine the input field type on an HTML form employed to allow the web designer to specify the adjustable property of the component.

Line 15 indicates that the "name" attribute of the input element is also required and is specified using character data. As explained in more detail below, this attribute provides the name of the adjustable property whose value is to be determined by the web designer. Line 16 indicates that the "value" attribute of the input element is also required and is specified using character data. As explained in more detail below, this attribute provides the value for the adjustable property whose value is to be determined by the web designer. Because the attribute is required, a default value must be included when the element is used before the input is received from the web designer. Line 17 indicates that the "label" attribute of the input element is also required and is specified using character data. As explained in more detail below, the label holds a description of the adjustable property so the web designer can determine whether to change the default value.

Line 18 indicates that the "checked" attribute of the input element is not required and is specified, when present, using one of the two enumerated strings "CHECKED" and "UNCHECKED." As explained in more detail below, this attribute is used when the type of input is a radio button and one of the buttons is initially checked b before receiving input from the web designer.

Table 1B shows several statements of a document type definition (DTD) file defining XML elements used to describe an arrangement of components on the one or more pages of the web site.

TABLE 1B

DTD statements defining XML elements used to arrange components (items) into pages (folders) for a web site.

| Statement Number | DTD Statement |
|---|---|
| 1 | <!ELEMENT site-template (name base category style? site-map)> |
| 2 | <!ELEMENT style(name font* color* navbar)> |
| 3 | <!ELEMENT site-map(folders)> |
| 4 | <!ELEMENT folders (name title description banner folders* item* )> |
| 5 | <!ELEMENT item (type name category display output-folder arguments? )> |
| 6 | <!ELEMENT arguments(argv+)> |
| 7 | <!ELEMENT argv (#PCDATA)*> |
| 8 | <!ATTLIST argv pos CDATA #REQUIRED> |
| 9 | <!ELEMENT name (#PCDATA)*> |
| 10 | <!ELEMENT base (#PCDATA)*> |
| 11 | <!ELEMENT category (#PCDATA)*> |
| 12 | <!ELEMENT navbar (#PCDATA)*> |
| 13 | <!ELEMENT title (#PCDATA)*> |
| 14 | <!ELEMENT description (#PCDATA)*> |
| 15 | <!ELEMENT banner (#PCDATA)*> |
| 16 | <!ELEMENT type (#PCDATA)*> |
| 17 | <!ELEMENT display (#PCDATA)*> |
| 18 | <!ELEMENT output-folder (#PCDATA)*> |

As indicated by the statement in line 1 of Table 1B, each web site is described using a "site-template" element that is required to have one each of elements called "name" "base" and "category" in which such information is placed, as described in more detail below. Lines 9 through 11 indicate that these elements include any amount of parsed character data. When used by the site-template element, the category element describes the category of web site activities described by the template, such as a Corporate category, a Retailer category and a Social Center category, as described above. The category and name element are also used by other elements for holding other content, as described below. The site-template element also includes a "style" element defined in line 2 of Table 1B and a "site-map" element defined in line 3.

The DTD statement in line 2 indicates that the style element allowed in a site-template element requires one each of child elements called "name" described above and "navbar" in which additional information is placed. Lines 9 and 12 indicate these elements include any amount of parsed character data. Line 2 also indicates the style element allows for optional one or more elements called "font" and "color" that are used to define fonts and colors of text in an HTML document derived from the XML document being defined, as described below. The DTD statements further defining the attributes of the font and color elements are omitted from Table 1B to keep the table small and this description simple. The attributes are evident from the example described below.

The DTD statement in line 3 indicates that the site-map element required in a site-template element requires a child element called "folders." As described below, this element describes the home page.

The DTD statement in line 4 indicates that each folders element includes required elements named "name", "title", "description", and "banner" that may include parsed character data to describe the page, as indicated in lines 9, 13, 14, and 15 of Table 1B, respectively. The use of these elements is described in more detail in the example described below.

The DTD statement in line 4 also indicates that each folders element may include additional folders elements to describe child pages that are launched from the current page. Thus, the folders element may be used to describe a hierarchy of folders corresponding to a hierarchy of pages for the web site. The folders element included in the site-map element, e.g., the home page, is the root of the hierarchy.

The DTD statement in line 4 also indicates that each folders element may include item elements corresponding to components on the web page corresponding to the folders element. The DTD statement in line 5 indicates that each item element requires one each of elements named "type", "name", "category", "display", and "output-folder" to provide such information. These elements may include parsed character data as indicated by lines 16, 9, 11, 17 and 18 of Table 1B, respectively. The use of these elements is described in the example described below. In the example, the "name" element of the item element is used to hold the name of the component used in the component XML document, so that the information provided in the XML document describing the web site can be related to the information in the XML document describing the individual component.

The DTD statement in line 5 also indicates that each item element may have one "arguments" element. An arguments element is included in an item element if the corresponding web site component has adjustable properties. As indicated by the DTD statement in line 6 of Table 1B, an arguments element includes one or more "argv" elements used to hold the values for the arguments that specify the adjustable properties of the component for the current page of the web site being designed. As indicated by the DTD statement in line 7, the argv element holds parsed character data that indicates the value to use for a particular adjustable property. As indicated by the DTD statement in line 8, the argv element has a required attribute called "pos" that holds character data. As explained in the example described below, the pos attribute is used to indicate the position of the argument in the call to the procedure that adjusts the properties of the component.

Table 2 shows several lines of XML code describing a discussion forum component for a web site, according to this embodiment, using the tags defined in the DTD statements listed in Table 1A.

TABLE 2

| Line Number | XML Statements |
|---|---|
| | XML file describing a discussionforum component for a web site. |
| 1 | <dca-component> |
| 2 | <name>discussionforum</name> |
| 3 | <title>Discussionforum</title> |
| 4 | <layout>discforum_cust.xsl</layout> |
| 5 | <description>Read and post messages</description> |
| 6 | <service> |
| 7 | <type>RUN</type> |
| 8 | <url>dca.dca_forum_main.forumQueryPage</url> |
| 9 | <method>GET</method> |
| 10 | <authuser></authuser> |
| 11 | <authpass></authpass> |
| 12 | </service> |
| 13 | <service> |
| 14 | <type>ADMIN</type> |
| 15 | <url>dca.dca_forum_main.forumAdminPage</url> |
| 16 | <method>GET</method> |

TABLE 2-continued

| Line Number | XML Statements |
|---|---|
| 17 | <authuser></authuser> |
| 18 | <authpass></authpass> |
| 19 | </service> |
| 20 | <custom> |
| 21 | <input type="text" |
| 22 | name="p_no_of_items" |
| 23 | value="5" |
| 24 | label="No of items to be displayed(Enter a number greater than 0 or enter ALL to view all items)" |
| 25 | /> |
| 26 | <input type="radio" |
| 27 | name="p_sort_order" |
| 28 | value="createdate" |
| 29 | label="Sort by creation date" |
| 30 | checked="CHECKED" |
| 31 | /> |

XML file defining XML elements used to describe web site

| 32 | <input type="radio" |
|---|---|
| 33 | name="p_sort_order" |
| 34 | value="noofthreads" |
| 35 | label="Sort by number of threads" |
| 36 | /> |
| 37 | <input type="radio" |
| 38 | name="p_sort_order" |
| 39 | value="postdate" |
| 40 | label="Sort by last response date" |
| 41 | /> |
| 42 | <input type="submit" |
| 43 | name="p_submit" |
| 44 | value=" OK " |
| 45 | /> |
| 46 | <input type="reset" |
| 47 | name="p_reset" |
| 48 | value=" Reset " |
| 49 | /> |
| 50 | </custom> |
| 51 | </dca-component> |

Not shown in Table 2 are the conventional XML statements that identify a start and end of particular document as an XML document and specify a file name for an external DTD file associated with the document.

The XML <dca-component> tag in line 1 of Table 2 opens the XML element describing a component; and the </dca-component> tag in line 51 closes this XML element. As described in the DTD of Table 1A, a dca-component element contains a name element, a title element, a layout element, a description element, one or more service elements, and at most one custom element.

In line 2 of Table 2, the name element is included; and the open and close name tags, "<name>" and "</name>," indicate the name for this component is "discussionforum." This name is useful to uniquely identify this kind of component. In line 3 of Table 2, the title element is included; and the open and close tags, "<title>" and "</title>," indicate the title for this component is "Discussionforum." This title is useful for inserting into a web page when information about this component is presented to a web designer in the designer's browser. In line 5 of Table 2, the description element is included; and the open and close tags, "<description>" and "</description>," indicate that this component is used on a web site to "Read and post messages." This description is useful for helping a web designer determine whether to include this component in the web site being designed.

In line 4 of Table 2, the layout element is included; and the open and close tags, "<layout>" and "</layout>," indicate that presentations for the discussionforum component is based on an extensible stylesheet language (XSL) stored in a file having a relative URL address of "discforum_cust.xsl." Since no domain name or directory information is indicated in the URL, the file is located in the same directory as the XML file including the statements of Table 2. Some contents of the stylesheet in this XSL file, and the manner in which those contents are used, are described later with respect to Table 4.

In lines 6 through 12 of Table 2, a service element is included involving the open and close tags, "<service>" and "</service>." As indicated by the DTD shown in Table 1A, a service element includes a service type element, a URL element, a method element, an authorized user element, and a password element. In line 7, the service type element is included; and the open and close tags, "<type>" and "</type>," indicate that this service is of type "RUN" for using at runtime, e.g., after the web site has been built with this component and when the component is called upon by a visitor to the web site.

In line 8, the URL element is included; and the open and close tags, "<url>" and "</url>," indicate that the URL of the procedure that performs the service is "dca.dca_forum_main-.forumQueryPage." In this embodiment, a URL of this form indicates an ORACLE™ PL/SQL procedure "forumQueryPage" in a package named "dca_forum_main" in a package named "dca" in the same directory as the document having the XML code of Table 2. PL/SQL is an extension to structured query language (SQL) that is proprietary to the ORACLE™ Corporation. In the PL/SQL system a package is a collection of procedures that can be called externally; thus the package provides an application program interface (API). In other embodiments the procedure associated with a service can reside on another location on the network. In yet other embodiments, the procedure is not within a PL/SQL package but is any program that can be launched in response to input from a user at a browser. Such programs include a JavaScript script that is downloaded by a browser and executed on the client's machine, and a server side operating system script, and a JAVA servlet of a web server process, and a stand alone server side application.

In line 9, the method element is included; and the open and close tags, "<method>" and "</method>," indicate that the method is "GET." The method element refers to the method for submitting user input on an HTML form to the procedure that provides the service. The two methods currently available on HTML forms are GET and POST. Line 8 indicates that the discussionforum component expects to receive user input using the GET method. According to the GET method, data indicating user input on the HTML form is appended to the URL identifying the procedure and the extended URL is sent to the web server. The web server places this data indicating user input into an environmental variable called "QUERY_STRING" that can be accessed by the procedure.

In line 10, the authorized user element is included; and the open and close tags, "<authuser>" and "</authuser>," indicate that no authorized user is identified for this service of the component. This is expected because the authorized user depends upon the designer who uses the wizard to build the web site. Similarly, in line 11, the authorized user password element is included; and the open and close tags, "<authpass>" and "</authpass>," indicate that no authorized user password is identified for this service.

In lines 13 through 19 of Table 2, a second service element is included involving the open and close tags, "<service>" and "</service>." In line 14, the service type element is included; and the open and close tags, "<type>" and "</type>," indicate that this service is of type "ADMIN" for using by web site administrator, to maintain or re-configure the discussionforum.

In line 15, the URL element is included; and the open and close tags, "<url>" and "</url>," indicate that the URL of the procedure that performs the service is "dca.dca_forum_main-.forumAdminPage." In this embodiment, as described above, this URL indicates a PL/SQL procedure "forumAdminPage" in a package named "dca_forum_main" in a package named "dca" in the same directory as the document having the XML code of Table 2. In other embodiments, the package is not in the same directory or the procedure is not within a PL/SQL package but is any program that can be launched in response to input from a user at a browser. This package provides controls that a web page administrator can use to configure and maintain the discussionforum.

In line 16, the method element is included; and the open and close tags, "<method>" and "</method>," indicate that the method is "GET." In line 17, the authorized user element is included; and the open and close tags, "<authuser>" and "</authuser>," indicate that no authorized user is identified for this service of the component. Similarly, in line 18, the authorized user password element is included; and the open and close tags, "<authpass>" and "</authpass>," indicate that no authorized user password is identified for this service.

In lines 20 through 50 of Table 2, a custom element is included for the discussionforum component. The custom element involves the open and close tags, "<custom>" and "</custom>," and the intervening elements. As indicated by the DTD shown in Table 1A, a custom element includes one or more input elements. The input elements have attributes but can contain no other elements. The input elements describe the way a designer of the web site inputs information on HTML forms to customize the particular component, in this case the discussionforum component. Each property corresponding to an input elements is used by at least one of the services associated with the component.

In lines 21 through 25, a first input element is included for the discussionforum component. Attribute "type" is set equal to a value of "text" indicating the first input element is a text input box. In line 22, attribute "name" is set to a value of "p no of items" and provides a unique name for the input element. In line 23, attribute "value" is set to "5" to provide a default entry in the text box of "5." In line 24, attribute "label" contains text that describes what information the web designer should type into the text box. As indicated by the value of "label," this text box is used to input the "[number] of items to be displayed." Further, the value of the "label" attribute instructs the visitor to "(Enter a number greater than 0 or enter ALL to view all items)." This input element is useful for allowing a web designer to determine how much of a discussion occurring in the discussionforum to view at one time. By virtue of its appearance within the custom element, at least one of the attributes of this input element can be modified by the web site designer, for example to display a different number of items.

In lines 26 through 41, three more input elements are included for the discussionforum component. These three input elements are useful for building three radio buttons belonging to a set named "p_sort_order" on an HTML form. A web site designer may select only one radio button of a set in an HTML form. Attribute "type" is set equal to a value of "radio" and attribute "name" is set to "p_sort-order" for all three elements corresponding to the set (lines 26 and 27, 32 and 33, and 37 and 38, respectively). The input element corresponding to the first radio button has an attribute "label" set to a value of "Sort by creation date" in line 29; the input element corresponding to the second radio button has an attribute "label" set to a value of "Sort by number of threads" in line 35; and, the input element corresponding to the third radio button has an attribute "label" set to a value of "Sort by last response date" in line 40. The attribute called "value" is set to "createdate" in line 28, to "noofthreads" in line 34, and to "postdate" in line 39, for the three elements, respectively, indicating the value to assign to the set if the designer activates the corresponding radio button. In addition, the input element corresponding to the first radio button has an attribute "checked" set to a value of "CHECKED." These input elements hold information that allows an HTML form to be constructed with three radio buttons of which the button corresponding to sorting by creation date is checked initially. By virtue of their appearance within the custom element, at least one of the attributes of each of these input elements can be modified by the web site designer, for example by setting the "checked" attribute of the first radio button input element to "UNCHECKED" and setting the "checked" attribute of a different element to "CHECKED."

In lines 42 through 49, two more input elements are included for the discussionforum component. These two input elements are useful for building a submit button and a reset button on an HTML form. When a visitor to a web site selects a submit button on an HTML form, the information on the form is sent from the browser using the GET or POST method specified when the form is built. When a visitor selects a reset button on the HTML form, the values of the input fields in the form are cleared. By virtue of their appearance within the custom element, these two input elements are presented to the web site designer for indicating when the designer is finished changing the values of the adjustable properties.

Table 3 shows several lines in a template XML document describing a template for a simple, example social center web site including a news component and a discussion group component.

TABLE 3

Statements in a template XML document.

| Line Number | XML Statements |
|---|---|
| 1 | <site-template id="1"> |
| 2 |    <name>Community</name> |
| 3 |    <base>localhost</base> |
| 4 |    <category>community</category> |
| 5 |     <style> |
| 6 |       <name>DEFAULT</name> |
| 7 |       <font type="HEADING" size="3" style="BOLD">Arial</font> |
| 8 |       <font type="SUBHEADING" size="2" style="PLAIN">Arial</font> |
| 9 |       <font type="DESCRIPTION" size="2" style="PLAIN">Arial</font> |

TABLE 3-continued

Statements in a template XML document.

| Line Number | XML Statements |
|---|---|
| 10 | `<font type="LINK" size="2" style="BOLD">Arial</font>` |
| 11 | `<font type="CONTACT" size="2" style="PLAIN">Arial</font>` |
| 12 | `<colortype="BACKGROUND">#FFFFFF</color>` |
| 13 | `<colortype="HEADINGBACKGROUND">#CCCCFF</color>` |
| 14 | `<colortype="HEADINGTEXT">#FFFFFF</color>` |
| 15 | `<colortype="SUBHEADINGBACKGROUND">#CCCCCC</color>` |
| 16 | `<colortype="SUBHEADINGTEXT">#FFFFFF</color>` |
| 17 | `<colortype="LINK">#0000FF</color>` |
| 18 | `<colortype="VISITEDLINK">#FF0000</color>` |
| 19 | `<colortype="CONTACT">#000000</color>` |
| 20 | `<colortype="DESCRIPTION">#000000</color>` |
| 21 | `<navbar>FRAME</navbar>` |
| 22 | `</style>` |
| 23 | `<site-map>` |
| 24 | `<folders>` |
| 25 | `<name>root</name>` |
| 26 | `<title>Site Home Page</title>` |
| 27 | `<description></description>` |
| 28 | `<banner>NONE</banner>` |
| 29 | `<item>` |
| 30 | `<type>CUSTOM</type>` |
| 31 | `<name>news</name>` |
| 32 | `<category>REGULAR</category>` |
| 33 | `<display>INPLACE</display>` |
| 34 | `<output-folder></output-folder>` |
| 35 | `<arguments>` |
| 36 | `<argv pos="1">dca</argv>` |
| 37 | `<argv pos="2">us</argv>` |
| 38 | `<argv pos="3">5</argv>` |
| 39 | `<argv pos="4">public</argv>` |
| 40 | `<argv pos="5">Y</argv>` |
| 41 | `<argv pos="6">Y</argv>` |
| 42 | `</arguments>` |
| 43 | `</item>` |
| 44 | `<item>` |
| 45 | `<type>CUSTOM</type>` |
| 46 | `<name>discussionforum</name>` |
| 47 | `<category>REGULAR</category>` |
| 48 | `<display>INPLACE</display>` |
| 49 | `<output-folder></output-folder>` |
| 50 | `<arguments>` |
| 51 | `<argv pos="1">dca</argv>` |
| 52 | `<argv pos="2">us</argv>` |
| 53 | `<argv pos="3">createdate</argv>` |
| 54 | `<argv pos="4">5</argv>` |
| 55 | `</arguments>` |
| 56 | `</item>` |
| 57 | `<folders>` |
| 58 | `<name>admin</name>` |
| 59 | `<title>Manage Components</title>` |
| 60 | `<description>Administration of Components</description>` |
| 61 | `<banner>NONE</banner>` |
| 62 | `</folders>` |
| 63 | `<folders>` |
| 64 | `<name>news</name>` |
| 65 | `<title>News Page</title>` |
| 66 | `<description></description>` |
| 67 | `<banner>NONE</banner>` |
| 68 | `</folders>` |
| 69 | `<folders>` |
| 70 | `<name>discussionforum</name>` |
| 71 | `<title>Discussionforum Page</title>` |
| 72 | `<description></description>` |
| 73 | `<banner>NONE</banner>` |
| 74 | `<item>` |
| 75 | `<type>CUSTOM</type>` |
| 76 | `<name>discussionforumlong</name>` |
| 77 | `<category>REGULAR</category>` |
| 78 | `<display>INPLACE</display>` |
| 79 | `<output-folder></output-folder>` |
| 80 | `<arguments>` |
| 81 | `<argv pos="1">dca</argv>` |
| 82 | `<argv pos="2">us</argv>` |
| 83 | `<argv pos="3">createdate</argv>` |
| 84 | `<argv pos="4">ALL</argv>` |

TABLE 3-continued

Statements in a template XML document.

| Line Number | XML Statements |
|---|---|
| 85 |                                                 </arguments> |
| 86 |                                         </item> |
| 87 |                               </folders> |
| 88 |                       </folders> |
| 89 |             </site-map> |
| 90 | </site-template> |

In this embodiment, these statements are in a file named "Community.xml". Note that "community" in this context is a category of social activities performed with a web site and is different from the Community Server for one or more database providers described above. The XML <site-template> tag in line 1 of Table 3 opens the XML element describing a template; and the </site-template> tag in line 90 closes this XML element. As described in the DTD of Table 1B, a site-template element contains a name element, a base element, a category element, a style element, a site-map element, and a folders element. The web designer may modify the contents of the community.xml file, as described in a later section, using a series of wizard screens to produce a customer site XML file.

In line 2 of Table 3, the name element is included; and the open and close name tags, "<name>" and "</name>," indicate the name for this site-template is "Community." This name is useful to uniquely identify this kind of template. In line 4 of Table 3, the category element is included; and the open and close tags, "<category>" and "</category>," indicate that this template corresponds to the "community" category of web site activities. When a web site designer modifies the site-template to produce the customer site XML file, the designer may replace either the name or category associated with the modified template, or both. For example, the designer may leave the category "community" after modifying the site-template but place the text "MyOwnKindOfCSocialCenter" into the name element of the site-template element.

In line 3 of Table 3, the base element is included; and the open and close tags, "<base>" and "</base>," indicate the base network node from which relative addresses are defined for resources included on the web site. The text "localhost" indicates that resources for the community web site are addressed relative to the local host address. During design, the local host may be one platform, while during run time the web site and resources might be moved to a different platform, which becomes the new local host. That change is accomplished simply by replacing the address associated with the text "localhost."

In lines 5 through 22 of Table 3, a style element is included for the community template. The style element involves the open and close tags, "<style>" and "</style>," and the intervening elements. As indicated by the DTD shown in Table 1, a style element includes a name element, zero or more font elements, zero or more color elements, and a navbar element. These elements are useful for presenting a template to a web designer with the specified fonts and colors and navigation bar. To assist the web site designer, the community template includes data for font and background color and for font type for a variety of HTML tags such as heading, subheading, description, and link. This particular style element is named "DEFAULT" in line 6. The web site designer may modify the data associated with these elements contained in the style element and give a different name, such as "MyOwnFonts," to the style element having the modified data in the modified template that constitutes the customer site XML file.

In lines 23 through 89 a site-map element is included in the community web site template. The site-map element involves the open and close tags, "<site-map>" on line 23 and "</site-map>" on line 89, respectively, and the intervening elements. As indicated by the DTD shown in Table 1, a site-map element includes a folders element; and a folders element includes a name element, a title element, a description element, a banner element, zero or more item elements and zero or more other folders elements. Thus there may be a hierarchy of folders elements within folders elements. The first folders element in the site map element is the root folder for the web site. Each web page of a web site is conveniently represented by a folders element in the site map. The components on a page are conveniently represented by the item elements. A web page associated with a particular folders element that has a child folders element includes a link to the web page associated with the child folders element.

In lines 24 through 88 of the community web site template in Table 3, a single folders element is included in the site-map element. The folders element involves the open and close tags, "<folders>" on line 24 and "</folders>" on line 88, and the intervening elements. This is the folders element for the web page from which branch all the other web pages on the site, if any. This is the root folders element that represents the home page of the web site being designed. In the original template shown in Table 3, this folders element has a name "root" in a name element on line 25, a title "Site Home Page" in a title element on line 26. The description element on line 27 has no initial value, but can be modified by the web designer to include a description in the customer site XML file. The initial community template also has no banner advertisement graphic, as indicated by the text "NONE" in the banner element on line 28. The banner element may be modified by the web site designer to include in the modified template in the customer site XML file a reference to a graphic the fills a banner advertisement location on the web page.

The home page folders element of the Community template of Table 3 includes two item elements and three folders elements representing two components and three links, respectively, on the home page HTML document that is generated from this template, as described in the next section. As indicated by the DTD shown in Table 1B, an item element includes a type element, a name element, a category element, a display element, an output-folder element, and an arguments element. The item element is useful for identifying and customizing the web site component that is intended for the page corresponding to the folders element within which the item element resides.

In lines 29 through 43 the first item element is included in the folders element corresponding to the home page. The first item element involves the open and close tags, "<item>" on line 29 and "</item>" on line 43, respectively, and the intervening elements. This first item element indicates that a news component is intended for the home page by virtue of the "news" text contained in the name element on line 31. This component is customizable by the web site designer as indicated by the "CUSTOM" content of the type element in line 30. In line 32 of Table 3, the item category element is included; and the open and close tags, "<category>" and "</category>," indicate the category is "REGULAR." This category element is used to group components when they are inserted into the web page by the web site building routine, such as by WebDB. By placing this component in a "REGULAR" category it is treated the same way as other components in the that category. This category may be used to distinguish components that are supported by procedures that execute on a DotCom appliance from components that are supported by procedures that execute on another or remote platform. In line 33 of Table 3, the item display element is included; and the open and close tags, "<display>" and "</display>," indicate the display of the news component is "INPLACE," which means that the web page displays the actual component rather then including simply a link to a resource that displays the component if the link is selected. In line 34 of Table 3, the item output-folder element is included; and the open and close tags, "<output-folder>" and "</output-folder>," enclose no data identifying an output folder. The output-folder element may be modified by the web site designer to include a name of a directory and a file where any output generated by the component, such as a message pulled from a discussion group, may be stored temporarily. This is especially useful when the component is provided by an external resource such as a remote database that places results from a query in a file on the remote system.

In lines 35 through 42 the arguments element is included in the first item element corresponding to the news component. The arguments element involves the open and close tags, "<arguments>" on line 35 and "</arguments>" on line 42, respectively, and the intervening elements. As indicated by the DTD shown in Table 1B, an arguments element includes one or more argument value elements; and, an argument value element includes a required position attribute "pos" and contains only text data, i.e., no other elements. The argument value elements are useful for setting the customizable parameters of a particular component on the web page being designed and for passing arguments to procedures called to provide the functionality behind a web site component. The news component has six customizable parameters or arguments passed to one or more underlying procedures. In lines 36 through 41, values for these six parameters or arguments are provided in six argument value elements. Each line contains one argument value element including the opening and closing tags, "<argv>" and "</argv>", respectively, and the data to pass as an argument. Each open tag specifies the position of the argument that is to pass the provided data to the procedure by assigning a value in the range 1 through 6 to the "pos" attribute.

In lines 44 through 56 the second item element is included in the folders element corresponding to the home page. This second item element indicates that a discussionforum component is intended for the home page by virtue of the "discussionforum" text contained in the name element on line 46, which matches the component name in line 2 of Table 2. This component is also customizable by the web site designer as indicated by the "CUSTOM" content of the type element in line 35. In line 47 the item category element indicates the "REGULAR" category, in line 48 the item display element indicates "INPLACE" display, and in line 49 the item output-folder element does not specify an output-folder. The discussionforum component passes four customizable arguments to supporting procedures and these are provided in the four argument value elements of the arguments element in lines 50 through 55. Of these arguments, the argument value "dca" in position "pos"=1 is the PL/SQL package containing the procedures that provide the services associated with the component (see lines 8 and 15 of Table 2). The argument value "createdate" in position "pos"=3 is the sort order radio button that is initially checked on the input form (see line 30 of Table 2). The argument value "5" in position "pos"=4 is the number of items to display in the discussionforum at one time (see line 23 of Table 2).

The root folders element that corresponds to the home page also includes three child folders elements in this example embodiment. Those child folders elements are an "admin" folders element in lines 57 through 62 representing a page to be titled "Manage Components"; a "news" folders element in lines 63 through 68 representing a page to be titled "News Page"; and a "discussionforum" folders element in lines 69 through 87 representing a page to be titled "Discussionforum Page." In the example Community template, the admin folders element and the news folders element contain no item elements or folders elements and therefore indicate no components or additional pages. Of course the web site designer may add components to these folders when modifying the template to form the customer site XML document. In other embodiments additional items and folders elements, as listed above for the social center template, are included in the folders of the Community template.

The example Community template does include a discussionforum item in the disussionforum folders element in lines 74 through 86 of Table 3. The elements contained in this item element are the same as already described above with respect to lines 44 through 56 of Table 3. The data included in each element is also the same as described above, except here, in line 84, the argument value associated with the number of items to display at once in the discussion group is "ALL" instead of "5."

The discussion of Table 2 and Table 3 show how components for a web site can be described using XML statements, and how components can be arranged in a template that represents a web site also using XML statements. However, in the preferred embodiment, both the web site designer and the ultimate visitor to the Web site are presented with HTML documents containing HTML statements for display to a user by a browser and for receiving user input at the browser. An XML document may be translated to an HTML document using an XML translator. Instructions to the translator for performing the translation are provided in extensible stylesheet language (XSL) statements defined by a standard called the XSL Translator (XSLT). Example XSLT statements are provided in Table 4.

6.7 Example Presentation of XML Component to Web Designer

An XML document may be translated to an HTML document using an XML translator and the XSLT statements listed in Table 4.

TABLE 4

XSLT file for translating a component XML document to HTML.

| Line Number | XSLT Statements |
|---|---|
| 1 | <xsl:stylesheet xmlns:xsl= "url for w3 org XSL/Transform file v 1.0"> |
| 2 |    <xsl:template match="/"> |

TABLE 4-continued

XSLT file for translating a component XML document to HTML.

| Line Number | XSLT Statements |
|---|---|
| 3 | <xsl:apply-templates select="dca-component"/> |
| 4 | </xsl:template> |
| 5 | <xsl:template match="dca-component"> |
| 6 | <html> |
| 7 | <head> |
| 8 | <script Language="Javascript"> |
| 9 | function formSubmit( ){ |
| 10 | document.disccustfrm.p_site_id.value=parent.top_frame.document.xx.p_site_id.value; |
| 11 | document.disccustfrm.p_occurrence.value=parent.mrr_frame.document.mrrform.p_item_whichth_occurance.value; |
| 12 | document.disccustfrm.submit( ); |
| 13 | } |
| 14 | </script> |
| 15 | </head> |
| 16 | <FORM NAME="disccustfrm" METHOD="POST" |
| 17 | ACTION="dca.dca_forum_data.set_args"> |
| 18 | <xsl:apply-templates select="custom"/> |
| 19 | <INPUT TYPE="HIDDEN" NAME="p_site_id" VALUE=""/> |
| 20 | <INPUT TYPE="HIDDEN" NAME="p_occurrence" VALUE=""/> |
| 21 | </FORM> |
| 22 | </html> |
| 23 | </xsl:template> |
| 24 | <xsl:template match="custom"> |
| 25 | <table > |
| 26 | <xsl:apply-templates select="input[@type="text"]|input[@type="radio"]"/> |
| 27 | <tr> |
| 28 | <xsl:apply-templates select="input[@type="submit"]|input[@type="reset"]"/> |
| 29 | </tr> |
| 30 | </table> |
| 31 | </xsl:template> |
| 32 | <xsl:template match="input"> |
| 33 | <xsl:variable name="fieldname"> |
| 34 | <xsl:value-of select="@name"/> |
| 35 | </xsl:variable> |
| 36 | <xsl:variable name="fieldlbl"> |
| 37 | <xsl:value-of select="@label"/> |
| 38 | </xsl:variable> |
| 39 | <xsl:variable name="fieldval"> |
| 40 | <xsl:value-of select="@value"/> |
| 41 | </xsl:variable> |
| 42 | <xsl:variable name="fieldtype"> |
| 43 | <xsl:value-of select="@type"/> |
| 44 | </xsl:variable> |
| 45 | <xsl:variable name="fieldwidth"> |
| 46 | <xsl:value-of select="@size"/> |
| 47 | </xsl:variable> |
| 48 | <xsl:choose> |
| 49 | <xsl:when test="@type="text""> |
| 50 | <tr> |
| 51 | <td><FONT SIZE="2" FACE="Arial"><xsl:value-of select="@label"/></FONT> |
| 52 | </td> |
| 53 | <td> |
| 54 | <INPUT TYPE="{$fieldtype}" VALUE="{$fieldval}" NAME="{$fieldname}" SIZE="15"/> |
| 55 | </td> |
| 56 | </tr> |
| 57 | </xsl:when> |
| 58 | <xsl:when test="@type="radio""> |
| 59 | <tr> |
| 60 | <td> |
| 61 | <xsl:if test="@value="createdate""> |
| 62 | <INPUT TYPE="{$fieldtype}" VALUE="{$fieldval}" |
| 63 | NAME="{$fieldname}" |
| 64 | CHECKED="{@checked}"/> |
| 65 | </xsl:if> |
| 66 | <xsl:if test="@value="postdate""> |
| 67 | <INPUT TYPE="{$fieldtype}" VALUE="{$fieldval}" |
| 68 | NAME="{$fieldname}" /> |
| 69 | </xsl:if> |
| 70 | <xsl:if test="@value="noofthreads""> |
| 71 | <INPUT TYPE="{$fieldtype}" VALUE="{$fieldval}" |
| 72 | NAME="{$fieldname}" /> |

TABLE 4-continued

XSLT file for translating a component XML document to HTML.

| Line Number | XSLT Statements |
|---|---|
| 73 | </xsl:if> |
| 74 | <FONT SIZE="2" FACE="Arial"><xsl:value-of |
| 75 | select="@label"/></FONT></td> |
| 76 | <td></td> |
| 77 | </tr> |
| 78 | </xsl:when> |
| 79 | <xsl:when test="@type='submit'"> |
| 80 | <td width="35%" align="right"> |
| 81 | <INPUT TYPE="BUTTON" VALUE="{$fieldval}" |
| 82 | NAME="{$fieldname}" onclick="formSubmit( );"/> |
| 83 | </td> |
| 84 | </xsl:when> |
| 85 | <xsl:when test="@type='reset'"> |
| 86 | <td width="65%" align="left"> |
| 87 | <INPUT TYPE="RESET" VALUE="{$fieldval}" |
| 88 | NAME="{$fieldname}" |
| 89 | WIDTH="{$fieldwidth}"/> |
| 90 | </td> |
| 91 | </xsl:when> |
| 92 | </xsl:choose> |
| 93 | </xsl:template> |
| 94 | </xsl:stylesheet> |

Table 4 shows several lines of statements for an extensible stylesheet language translator (XSLT) for translating an XML document describing a discussionforum (as listed in Table 2) into an HTML document to be presented to a web site designer for customizing the forum. In this embodiment, these statements are in a file named "discforum_cust.xsl" as indicated by line 4 of Table 2. The resulting HTML document is displayed by a browser of the web site designer to present the customization parameters of the discussionforum. This HTML document includes forms for obtaining input from the web site designer indicating how to change the customization parameters for the discussionforum component.

In line 1, in accordance with the XML standards, the document in the file is identified as an XML stylesheet (XSL) that uses terms defined in the standard XSL translator (XSLT) file indicated by the URL of the "w3" organization at directory "/XSL/Transform/1.0."

Terms defined in that file constitute an XML namespace (xmlns) that is referenced within the current document by the prefix "xsl:". Thus the <template> tag defined in the standard XSLT file, and described below, is referenced within the current document as "<xsl:template>". Note that the XSLT tag "<template>" is not the same as the web site template described above with respect to Table 3. In the following discussion, the two templates are distinguished: the XSLT template tag appears below and in Table 4 as "<xsl:template>"; and the web site template of components appears as "site-template."

The xshemplate element finds content in XML tags and places that content within new tags included as data for the xshemplate element. As applied in Table 4, the new tags in the xshemplate element are all HTML tags.

The first xshemplate element involves lines 2 through line 4 and includes the attribute "match" set to the value "/" which tells the translator what to do at the root element of the XML document. The xshemplate element may include data or any of several other elements. In line 2, an empty xsl:apply-templates element is included. This element has an attribute "select" indicating the selected pattern to which the translator should apply a template when at the root element of the document. Here select is set to "dca-component" indicating that a template should be applied to the dca-component eleemnt.

The second xsl.template element involves lines 5 through 23 and includes an attribute called "match" set to a value "dca-component." This template describes the substitutions to be made when the translator finds the pattern in the match attribute. Thus, when the translator finds the pattern "dca-component" the data between the opening tag on line 5 and the closing tag on line 23 is inserted into the resulting document. As can be seen, the text on lines 6 through 22 comprise several HTML tags that define the opening and closing of the HTML document (<html> and </html> on lines 6 and 22, respectively), a header (<head> and </head> on lines 7 and 15, respectively) and a script (<script Language="Javascript"> and </script> on lines 8 and 14, respectively). Also inserted into this HTML document is an HTML FORM opened on line 16 and closed on line 21.

Within the data of this template is another XSLT element, the "xsl:apply-templates" element on line 18 with the attribute "select" set to a value of "custom". This statement tells the translator to produce the HTML statements that belong between the HTML statements on line 17 and line 19 based on applying templates to XML elements having the "custom" tag.

The third xsl.template element involves lines 5 through 23 and includes the attribute "match" set to the value "custom." This template describes the substitutions to be made when the translator finds the pattern "custom" in an XML tag. The data between the opening tag on line 24 and the closing tag on line 31 is inserted into the resulting document. As can be seen, the text on lines 25 through 30 comprise several HTML tags that define a table and a row in the table.

These lines also include two additional xsl:apply-templates elements, one on line 26 and the other on line 28. The first, on line 26, inserts HTML code in this location based on templates that apply to XML elements that include in the tag the pattern "input" having the attribute "type" set to "text" (represented by the expression input[@type="text"]) or set to "radio" (input[@type="radio"]) Such XML elements are included in Table 2 on lines 21 through 41. The second, on line 28, inserts HTML code in this location based on templates that apply to XML elements that include in the tag the pattern "input" having the attribute type set to "submit" or "reset." Such XML elements are included in Table 2 on lines 42 through 49.

The template that applies to the input XML elements involves lines 32 through 93 of Table 4. In lines 33 through 47 information from the input XML element is placed into xsl:variable elements. Each xsl:variable element has an attribute called "name" and includes a "xsl:value-of" element that has an attribute called "select". The name attribute is set to a text string that gives a name for the xsl:varaible; and the select attribute is set to the value of an attribute of the XML element. For example, when this portion of this template is applied to the XML input element on lines 21 through 24 of Table 2, the xsl:variable named "fieldname" is set to "p_no_of_items"; the xsl:variable named "fieldlbl" is set to "No of items to be displayed (Enter a number greater than 0 or enter ALL to view all items"; the xsl:variable named "fieldval" is set to "5"; the xsl:variable named "fieldtype" is set to "text"; and the xsl:variable named "fieldwidth" is set to "1".

The next blocks of XSLT statements, between the xsl:choose open tag on line 48 and the close tag on line 92, instruct the translator to insert different input fields into different rows and columns of the HTML table of the HTML form. The block of statements from line 49 through 57 are used by the translator when the XML element input "type" attribute is set to "text"; the block from line 58 through 78 are used when it is set to "radio"; the block from line 79 though 84 is used when it is set to "submit"; and the block from line 85 through 91 is used when it is set to "reset." For example, if the input type is "text" a row of the HTML table is added by line 50 that includes two columns (i.e., two table data elements <td>). In the first column the label is inserted with the specified font and size by line 51. In line 54 an input field is inserted in the second column described using the xsl:variables defined in lines 33 through 47.

Figure 6D:
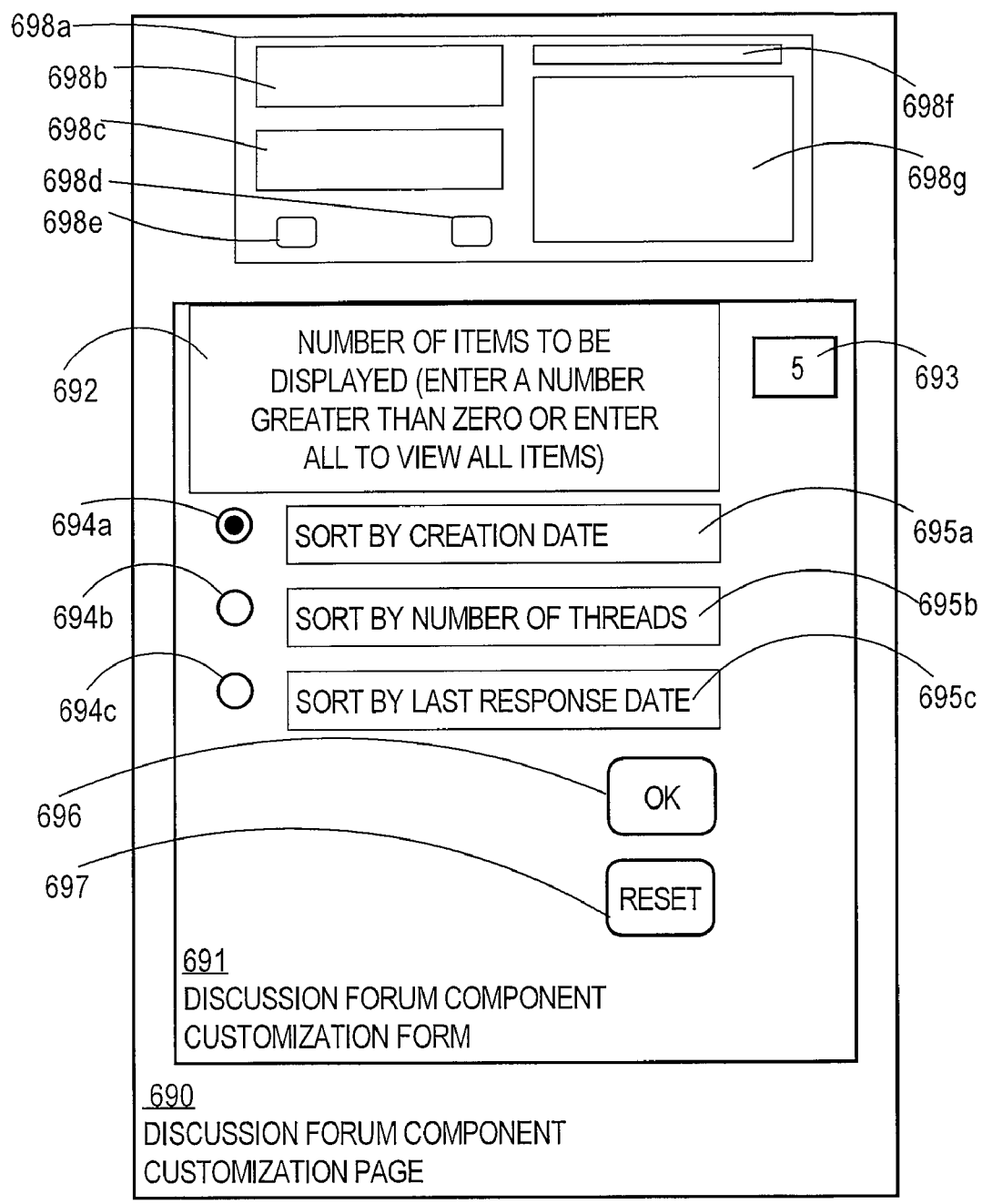
FIG. 6D is a block diagram illustrating an arrangement of input elements on a web page for customizing a web site component by a user of the wizard according to an embodiment.

FIG. 6D is a block diagram illustrating the arrangement of input elements on a web page presented by a web designer's browser based on the HTML produced by the XSLT statements of Table 4. The HTML document produced by the code represents a web page 690 for customizing the discussionforum component. This HTML document is produced using the XSLT statements of Table 4 and is sent to the designer's browser by the web site building wizard process when the wizard receives a request from the designer's browser to customize the discussionforum component.

The items displayed on the web page 690 include the HTML form 691 for receiving the web designer's input for customizing the discussionforum component. The XSLT statements of Table 4 assemble on the form 691*a* table with a row for each input element within the custom element for the XML document representing the discussionforum component, such as the XML document listed in Table 2. That XML document lists six input elements: one text input element, three radio buttons, a submit button, and a reset button. The XSLT statements direct a translator to first put the text and radio buttons into the table on the HTML form 691, then the reset and submit buttons. According to these instructions, the label 692 for the text input element is placed into the first column of the first row of the table in the HTML form 691. The text input box 693 is placed in the second column of the same row. The first radio button 694*a* and its label 695*a* are placed into the first column of the next row and nothing is placed in the second column. The first radio button is checked, as indicated by the dark circle inside the button 694*a*. The second radio button 694*b* and its label 695*b* are placed into the first column of the next row. The third radio button 694*c* and its label 695*c* are placed into the first column of the next row.

After all the other input elements have been placed into a table on the form 691, the submit button 696 and the reset button 697 are added.

With this form 691 displayed by the web designer's browser, the web designer can change the value in text box 693 by selecting the box and keying in new text, for example. The user can also select a different radio button, which automatically deselects button 694*a*. For example, to sort the discussionforum by last response date instead of by the creation date, the user places a cursor over button 694*c* with a pointing device and clicks the pointing device.

When all changes are made the user selects the submit button 696 (labeled with the value "OK"). Upon clicking the submit button, following the HTML code inserted on the form by line 82 of the XSLT statements in Table 4, the designer's browser calls the "formSubmit( )" method. This method is found in the Javascript inserted into this HTML page by the XSLT statements in lines 8 through 14 of Table 4. This script obtains values for the site identification and occurrence of the present form and loads those values into the HTML hidden variables (p_site_id and p_occurrence) then calls the HTML submit method associated with this form. The HTML submit method was specified in the HTML statements inserted into the HTML page by the XSLT statements in lines 16, 17, 19 and 20. The designer's browser passes the designer's input along with the values of the p_site_id and p_occurrence hidden variables to the procedure "dca.dca_forum_data.set_args" using the POST method. In this embodiment, the procedure set_args is a method in an object called "dca_forum_data" residing in the package called "dca." As explained above, in this embodiment, the dca package is a PL/SQL package. The set_args procedure creates an XML element called "item" for the customer site XML file following the DTD for a site-template document. For example, if the designer typed "ALL" into input text box 693 then pressed the OK button 696, the set_args procedure would generate the XML statements constituting the arguments element found in Table 3 in lines 50 through 55.

Upon selecting the reset button, the input fields in form 691 are cleared. The designer's browser again displays the arrangement depicted in FIG. 6D.

The XSLT statements shown in Table 4 do not place a title or any other components on the web page 690. In other embodiments a title or description of the page or other displayed matter or some combination of these are inserted into the HTML document by the XSLT statements. For example, in one embodiment XSLT statements are included that insert a call to a procedure to place the discussionforum component on the web page 690. In this embodiment a discussionforum component 698*a* is included on the web page 690. This discussionforum 698*a* includes a text field 698*f* giving a discussion topic, a selection box 698*g* for selecting one of a list of some messages sorted by creation date, a text box 698*b* giving the full text of the selected message, an input text box 698*c* for typing a message for posting on the discussionforum, a clear button 698*e* to clear the text typed into the input box 698*c*, and a post button 698*d* to send the message to the forum for retrieval by other participants. In some embodiments the displayed component 698*a* is simply rendered for viewing by the designer but is not functional, e.g., nothing happens when the post button 698*d* is pressed. In other embodiments, the displayed component functions as it will when the web site is actually built.

Also, in some other embodiments, HTML statements are inserted to create one or more forms to prompt the web site designer for other information to include in the XML elements of the customer site XML document, such as information to identify authorized users and their passwords. Upon pressing the OK button on these forms, a procedure is called that adds arguments to the customer site XML document for passing this information to the affected component.

6.8 Example Modification of a Template

Figure 6E:
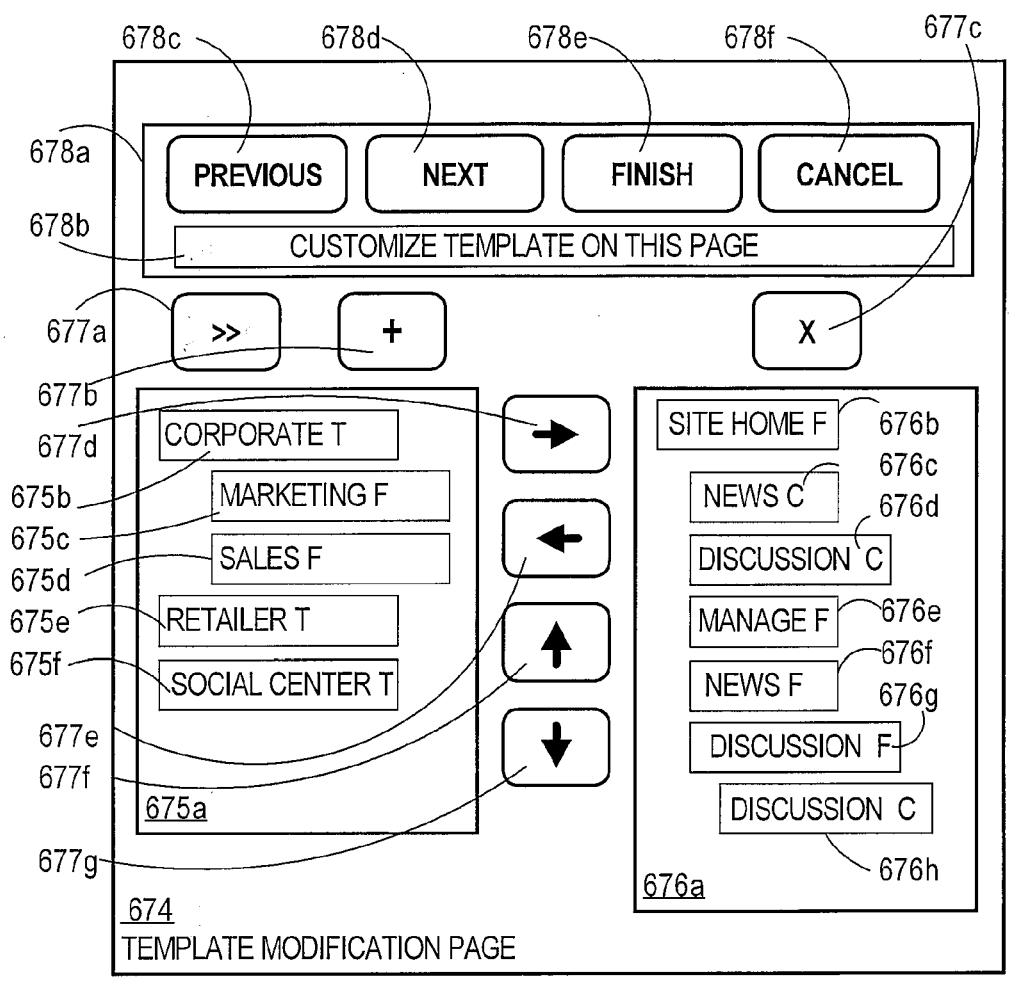
FIG. 6E is a block diagram illustrating an arrangement of folders and components on a web page for designing a web site by a user of the wizard according to an embodiment.

The initial or modified template is displayed on the designer's browser by employing XSLT statements to convert the XML elements used in the template file to HTML statements. FIG. 6E is a block diagram illustrating an example arrangement of folders and components on a web page 674 for designing a web site by a designer using the wizard. In the following discussion, actions associated with user interaction with the web page 674 are understood to be the result of employing XSLT statements to insert HTML statements in the HTML document that enable the described actions. When a user is said to press a button displayed on the web page it is understood that the user employs a pointing device to place a cursor over the displayed button and clicks a button associated with the pointing device. The enabled actions provide the controls for the designer to provide input to the web site building wizard.

The templates available for modification are presented in template list box 675a. For example, the template for a corporate web site is indicated by list item 675b with the phrase "Corporate T" where the "T" signifies a template. Similarly the retailer site template is indicated by list item 675e as "Retailer T" and the social center site template is indicated by list item 675f as "Social Center T." The folders and components on a template can be revealed in list box 675a in this embodiment by pointing to a listed item with a pointing device and clicking a button associated with the pointing device. For example, if the designer pointed to the corporate site template and clicked a button, the main folders in the corporate site are listed below the corporate site template item and are indented. This is shown in list item 675b indicating a marketing folder by the phrase "Marketing F" where the "F" signifies a folder, and in list item 675c indicating a sales folder.

The current contents of the customer web site are presented in the customer site list box 676a. For example, if the designer selects the social center site template 675f in the template list box 675a and then presses the import template button 677a, represented here by the symbol ">>", the folders and the components of that template are placed in the customer site list box 676a. For this example, the contents of the community template described by the XML statements in Table 3 are used as the contents of the social center site template. In other embodiments more of the folders and components listed in section 6.5.3 above for a social center site are included. The root folder of the community site template is the site home page folder, represented as list item 676b by the phrase "Site Home F." This folder contains a news component represented as list item 676c by the phrase "News C" where "C" signifies component. List item 676c is indented and below list item 676b to indicate list item 676c is a hierarchical child of list item 676b. The root folder also includes a discussionforum component represented as list item 676d, a manage components folder represented by list item 676e, a news folder represented by list item 676f and a discussion folder represented by list item 676g. The discussion folder includes another discussion component represented by the indented list item 676h.

The hierarchical arrangement of the folders in the customer web site is modified using the web page controls provided by arrow buttons 677d, 677e, 677f and 677g. The up and down arrow buttons 677f and 677g change the order of the components and folders in the customer site list box by moving a selected list item in the direction of the arrow. The left arrow button 677e raises the level of the list item in the hierarchy toward the root level as signified by decreasing the indentation of the selected list item. The right arrow button 677d pushes the selected list item to a deeper level of the hierarchy, further from the root level, as signified by increasing the indentation of the selected list item. The selected item becomes of direct child of the closest list item above it that is less indented.

For example, the discussion component represented by list item 676d can be made part of the discussion folder represented by list item 676g. The designer selects the discussion component by pointing to list item 676d and clicking on it. Then the designer presses the down arrow button 677g three times to move the selected list item 676d below list item 676g. Then the designer presses the right arrow button 677d to indent the selected list item 676d and make it a child of the discussion folder, list item 676g.

To add a single folder or component to the customer site list box, the designer selects the folder or component on the template list box or the customer site list box and then presses the add button 677b, here indicated by a plus sign. The component is inserted as a new list item in the customer site list box 676a. The designer then positions the new list item in the hierarchy of folders using one or more of the arrow buttons 677d, 677e, 677f, 677g. To delete a single component or folder from the customer site list box 676a, the designer selects the folder or component in the customer site list box and then presses the remove button 677c, here indicated by the symbol "X". The selected list item and its children, if any, are removed from the customer site list box 676a.

If a desired template is not listed in the template list box 675a, then the designer may search for other templates by selecting a portion of the template list box 675a without a list item and then pressing the import templates button 677a. The user is then presented with a dialog box to search other directories, such as the Community Server directory, for additional templates. In one embodiment, the user may select an existing web site by its URL address and have the wizard generate a template based on the existing web site, as described in more detail in the next section.

In this embodiment, the web page 674 also includes a navigation frame 678a. The navigation frame is used to move from one web page to another in the series of web pages that are used by the wizard. The navigation frame includes a description text box 678b describing the current web page. For example, the description text box 678b contains the phrase "Customize template on this page" when the template modification web page 674 is displayed. This navigation frame includes four buttons 678c, 678d, 678e, 678f allowing the designer to return to the previous web page, to advance to the next web page, to finish the design session, and to cancel the design session, respectively.

When the "Next" button 678d is pressed, the designer is presented with a new page or series of pages, which give the designer the option to customize any of the components included among the list items in the customer site list box 676a. FIG. 6D illustrates an example page for customizing a discussionforum component. In an alternative embodiment, the designer is presented with the customization page if the designer double clicks on the list item representing the component. For example, the page depicted in FIG. 6D is provided if the designer double clicks on list item 676d. If the designer clicks on list item 676h, a similar page would be provided, except the text box 693 in FIG. 6 contains the value "ALL" because the component is stored in the template (see Table 3 line 84) with an argument indicating "ALL" is the initial value.

When the "Finish" button 678e is pressed, the contents of the customer site list box are stored in a customer site XML file using the site-template XML elements. Customized parameters for all included components as stored within argument value XML elements.

6.9 Deriving a Template from Existing Web Site

The database wizard comes with templates already installed. As described above in step 687, the appliance owner can customize individual components and edit the templates to generate new templates. According to one embodiment, a template, for example as represented by an XML file, is derived from an existing web site. The web site could have been built by a programmer operating the database web site builder without benefit of a wizard. Using this embodiment, an XML file describing a template is derived from the Web page presented to the visitor's browser. For example, if a web site has been produced by WebDB using a PL/SQL procedure call that creates a dynamic HTML page which invokes a Java applet, then the parameters of the Java applet can be obtained from the PL/SQL procedure. Those parameters can be retrieved by the wizard and made available for customization by the user operating the wizard. Components that refer to resources hosted on a remote machine, for example, are represented by a URL address. In some circumstances, a component from an existing web site does not have an XML document describing its parameters, so that such a component cannot be customized.

In another embodiment, the DotCom appliance obtains updates and directory services from the community server 390. The community server provides a directory of DotCom appliances, a directory of DotCom appliance templates, software upgrades and patches, payment services for credit card payment processing, and hosting applications to support components used by the DotCom appliance.

6.10 Creating the Web Site from the Modified Template

The customer site XML file is used to generate the web site. In the preferred embodiment, the HTML statements that render each component and procedures that provide functionality for the component are stored in a WebDB database and implemented by WebDB upon requests from a visitor's browser for a web page at the web site. In one embodiment, some procedures are executed by a DotCom appliance or other remote device outside WebDB. In this case, the WebDB database stores a reference to the procedure that resides on the DotCom appliance or the remote device.

For example, if the XML statements in Table 3 represent the customer site XML file after modifications, then a web site is built using WebDB based on the information in Table 3 and in Table 2. WebDB stores information for forming web pages in a database and constructs the pages in response to receiving a request from a visitor's browser for the page, identified by its URL.

WebDB expects a web site designer to upload content and procedures using an hypertext transfer protocol (HTTP), that is WebDb expects requests as a URL with parameters attached, and WebDB responds to those requests with HTML pages. WebDB organizes web site content into a series of folders that represent pages and items that represent components. However, WebDB does not provide the full set of components provided by the wizard nor templates of folders associated with a category of activities as provided by the wizard.

In one embodiment, the wizard sends HTTP requests to a WebDB server, intercepts the responses and, without presenting the WebDB HTML documents to the designer, inputs text into the forms and follows the submit methods automatically, based on the information in the XML documents.

In the preferred embodiment, the web site building wizard uses the PL/SQL procedures that the WebDB server uses to populate the database that supports the web pages of a web site. The wizard uses the WebDB PL/SQL routines to open an account on the database server for the web site designer, create database objects such as tables, indexes, views, synonyms, and stored procedures for storing and retrieving the properties of the folders, items and components in the XML documents. The wizard then uses the PL/SQL routines to load the information from the XML documents into those tables, including the name of procedures for providing component functionality and the source of the arguments to pass when invoking the procedure.

For example, the wizard uses the WebDB PL/SQL routines to create a components table having fields that include name, title, run service, and admin service and an arguments table having fields that include a component name field, an argument position field and an argument value field. The wizard then loads values into the components table into a row corresponding to a particular discussionforum component based on information in the XML documents provided to the wizard by the site designer. The row in the components table after loading is shown in Table 5.

TABLE 5

Example values loaded into a component table by the site building wizard.

| component name | component title | component run service | component admin service |
|---|---|---|---|
| discussionforum-12 | Land Use Zoning Discussionforum | dca.dca_forum_main. forumQueryPage | dca.dca_forum_main. forumAdminPage |

The wizard loads values into the corresponding rows of the arguments table, as shown in Table 6.

TABLE 6

Example values loaded into an arguments table by the site building wizard.

| component name | argument position | argument value |
|---|---|---|
| discussionforum-12 | 1 | dca |
| discussionforum-12 | 2 | us |
| discussionforum-12 | 3 | createdate |
| discussionforum-12 | 4 | ALL |

After the folders and items are loaded, a visitor may request a folder by its URL; and WebDB assembles the components into an HTML document, launching any procedures required to generate the component's HTML with the associated argument values (whether stored or based on visitor input). Child folders are included as links. Image files are retrieved based on their URL address rather than being stored in the WebDB database. The procedure launched may be a stored procedure within the database or may be a remote procedure which has its URL stored in the WebDB database. If this reference is to a stored procedure, then the stored procedure would be run with the parameters listed in the arguments table. A stored procedure may be a PL/SQL procedure that creates or uses a database object, such as a procedure to query a database of products in the inventory of a retailer. If this is a reference to a remote resource, then a request to the URL of the remote resource would be made with the associated arguments in Table 6.

For example, if a visitor to the home page selects a link to the discussionforum page, then WebDB will construct the HTML document to send as a response based on the components on the page. To construct the discussionforum component on the discussionforum page, the component is found in Table 5 and the component run service is invoked. This service references a PL/SQL package that resides on the Dot-Com appliance. In this case WebDB sends the arguments in Table 6 associated with this particular component to the Dot-Com appliance. The called procedure performs the functions and generates the result, if any, in an HTML document for display by the visitor's browser.

WebDB determines whether the visitor has the privileges required to perform the requested action. For example, if the visitor requesting the discussionforum component has administrator privileges, then WebDB launches the procedure stored in the admin service field of the components table rather than the procedure in the run service field. If not, then the procedure in the run service field is launched. In this way different visitors may access different capabilities. This process allows the site administrator to perform special functions after the site becomes operational. The extra functions offered by the admin service may include changing the users allowed to access the discussionforum, changing the configuration of the discussionforum, editing messages, entering a message, uploading a stored message and downloading a message to storage. These functions are offered to the administrator in an HTML form not available to less privileged visitors to the web site.

7.0 Automatic Configuration of a Database Application

Figure 7:
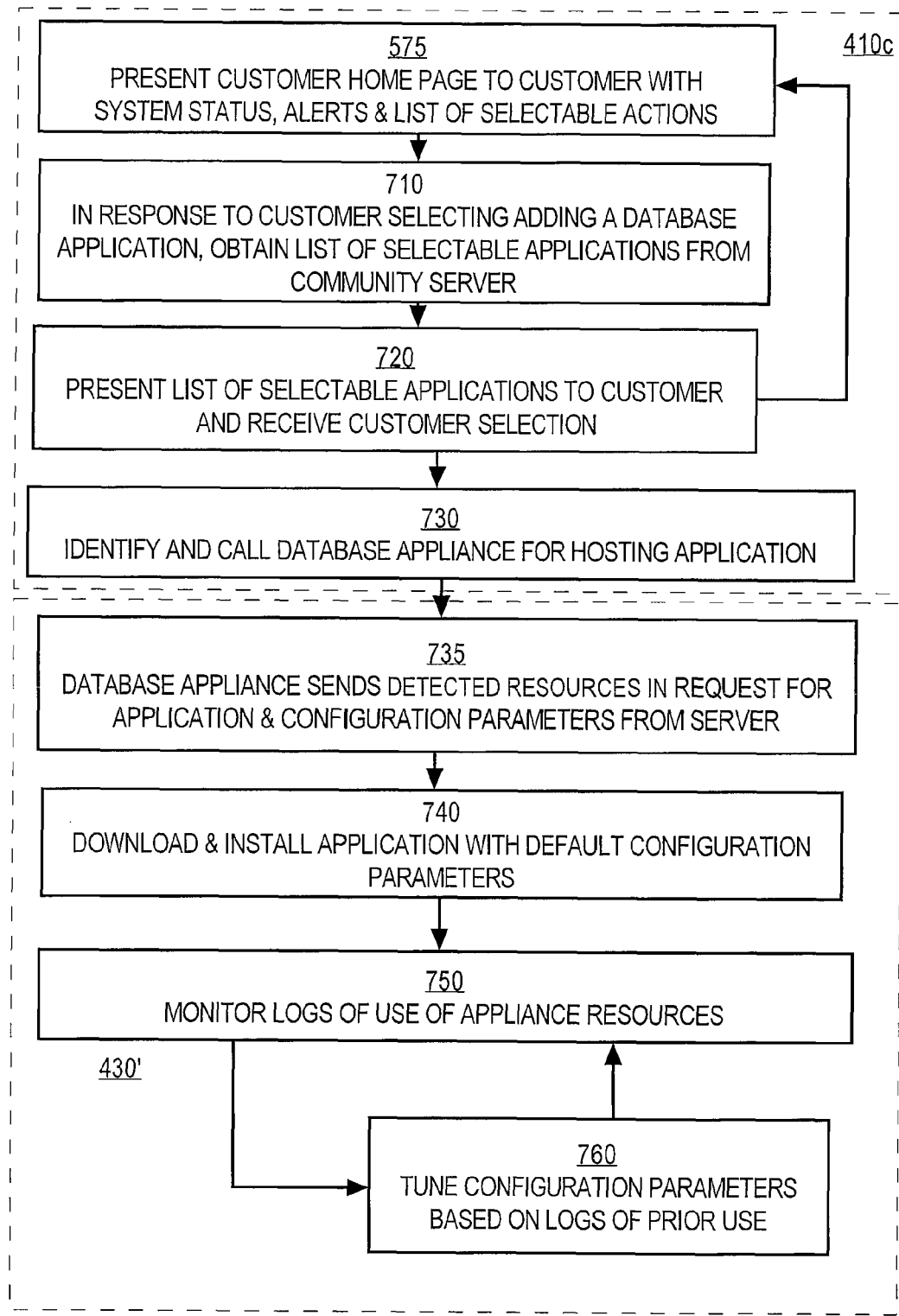
FIG. 7 is a flowchart for automatically installing and configuring a database application according to an embodiment of the disclosed techniques.

FIG. 7 is a flowchart for a process that includes automatically installing and configuring a database application according to an embodiment of the disclosed techniques. This process begins with step 575 in which the subscriber's home page is presented to the user. One of the selectable actions presented on the home page is to license an application, such as a database application, as an additional subscribed service. Other features on the home page, such as system status, alerts and other actions on the list of selectable actions, support other self-service functions as described in other sections.

In response to the customer selecting the action to license a database application, control passes to step 710 to obtain a list of database applications available through an application server. In this embodiment, the community server is the application server. In another embodiment, a separate database appliance is the application server. In still other embodiments, the application server is neither the community server nor an application server appliance.

In step 720, the customer is presented with a list of selectable applications and licensing costs. The list depends on what is available through the application server and which of those the customer might have previously contracted for, for example through the community server, or the service provider, or some other source of the application. In step 720, the customer chooses one of those applications. The customer is then returned to the customer home page presented in step 575.

In step 730, based on the customer selection, the IDSP identifies the dedicated or virtual database appliance for which the customer has subscribed that will host the selected application and issues instructions that cause the hosting appliance to install and configure the chosen application.

Steps 735 through 760 are carried out by the database appliance to automatically install and configure the application from the application server or other source of the application, and constitute an embodiment 430' of step 430 depicted in FIG. 4.

In step 735 the database appliance requests the application from the application server, in this case the community server 390. In the request, the database appliance reports to the community server the resources available on the appliance for supporting the application. These resources include consumable resources such as storage space, number of users licensed, CPU capacity and maximum transaction rate. These resources also include the type appliance requesting the application and the applications already installed on the appliance. Based on this report, a set of custom values are determined for one or more configuration parameters of the database application by the community server and sent to the database appliance. Configuration parameters that may have initial values determined in this way include the size of a shared global area (SGA) for the application, a size for a private cache memory, a size for a tablespace, and a size of a data block. In some embodiments, the information sent includes information, such as a network address, identifying a second server that is distinct from the application server and from which the application is actually downloaded.

In some embodiments, the information sent is in the form of an XML document internally identifying the configuration parameter by a name and value. In one of these embodiments the XML document includes descriptions of other steps involved in the installation process. The XML document is one type of data structure holding data indicating one or more steps for installing the application on the computing device. In one example embodiment, the XML document includes instructions for setting up a directory to store the application and its associated files and registering the installation with a software update service.

In step 740, according to one embodiment, the database appliance downloads the application from the community server and installs the application received using the initial custom values received from the community server. In this way, the database device receives instructions for causing a processor on the computing device to perform one or more functions of the application. The initial custom values are based on the consumable resources on the appliance reported by the appliance to the server. For example, based on the available memory of the appliance and the size of the database being operated by the application, the community server will set a value for the configuration parameter specifying the SGA for the application, and the appliance initially uses this value. In some embodiments the database appliance downloads the application from the second server and installs the application received using the initial custom values received from the application server.

In some embodiments, in response to receiving the data structure, the device automatically performs the step of installing the application on the computer device based on the data in the data structure. For example, in response to receiving the XML document describing the configuration parameters, and the directory to form, and the registration procedure, the XML elements are automatically translated to commands to cause a processor to perform the described steps in the order specified, such as with an XSLT document.

In step 750, logs of actual use of appliance resources are monitored. The value of the configuration parameters are then tuned and adjusted based on the logs of actual use, in step 760. Steps 750 and 760 are repeated periodically.

These techniques allow the advantage of removing the responsibility of setting configuration parameters from a human user and thereby increasing both the simplicity and the reliability of operating the database application.

In another embodiment, step 735 is initiated directly by a database administrator for the IDSP system in order to install a new application to the system, such as a database application for tracking customer usage and generating invoices.

8.0 Self Service Database Content Supply

Figure 8:
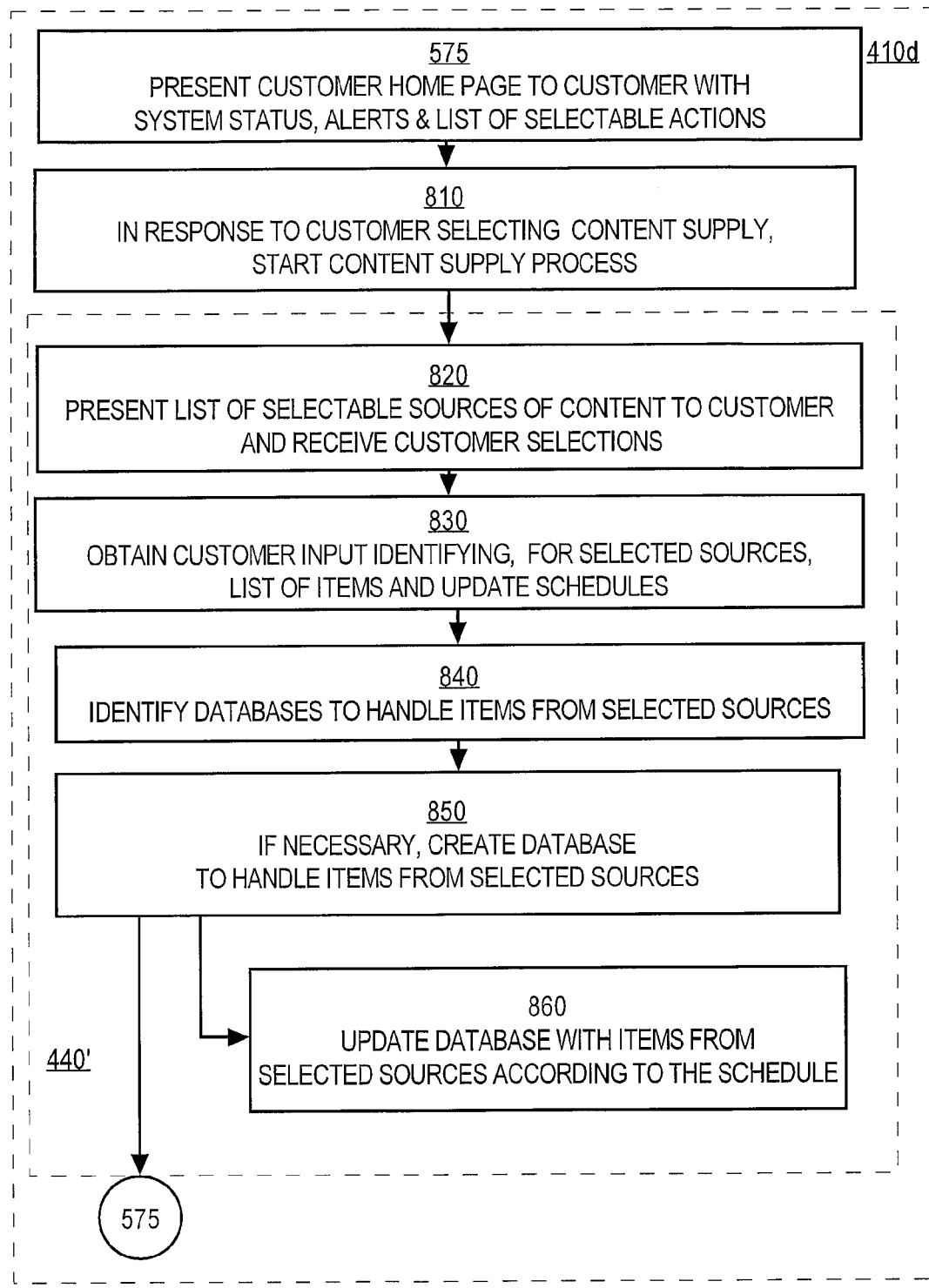
FIG. 8 is a flowchart for automatically supplying content for a database on a database services provider according to an embodiment of the disclosed techniques.

FIG. 8 is a flowchart for automatically supplying content for a database controlled by an IDSP, according to an embodiment of the disclosed techniques. Starting from the customer's home page in step 757, control passes to step 810 in response to the customer selecting automatic content supply. In step 810, the self-service database provisioning process launches the automatic content supply process.

In step 820, the customer is presented a list of selectable sources for content to place into the customer's databases. The customer indicates a source of database content. In step 830, the customer selects the data items available from that source which the customer wants inserted into one or more of the databases. Examples of such sources are news feeds available over the Internet. Optionally, the customer also specifies a schedule for updating the customer's databases with information from the selected sources. In step 840, the process identifies one or more databases to receive the items selected from the selected sources.

In step 850, the process creates a database to receive the selected items from the selected sources if the database is not identified in step 840 or if the identified databases do not already exist on the system. The customer is then presented with the customer's home page in step 575, while, in the background, step 860 is executed. Step 860 updates the identified, or newly created, database with the selected items from the selected sources according to a default schedule or the update schedule input by the customer, if that was done in step 830.

9.0 Self-Service Development of New Applications

Figure 9:
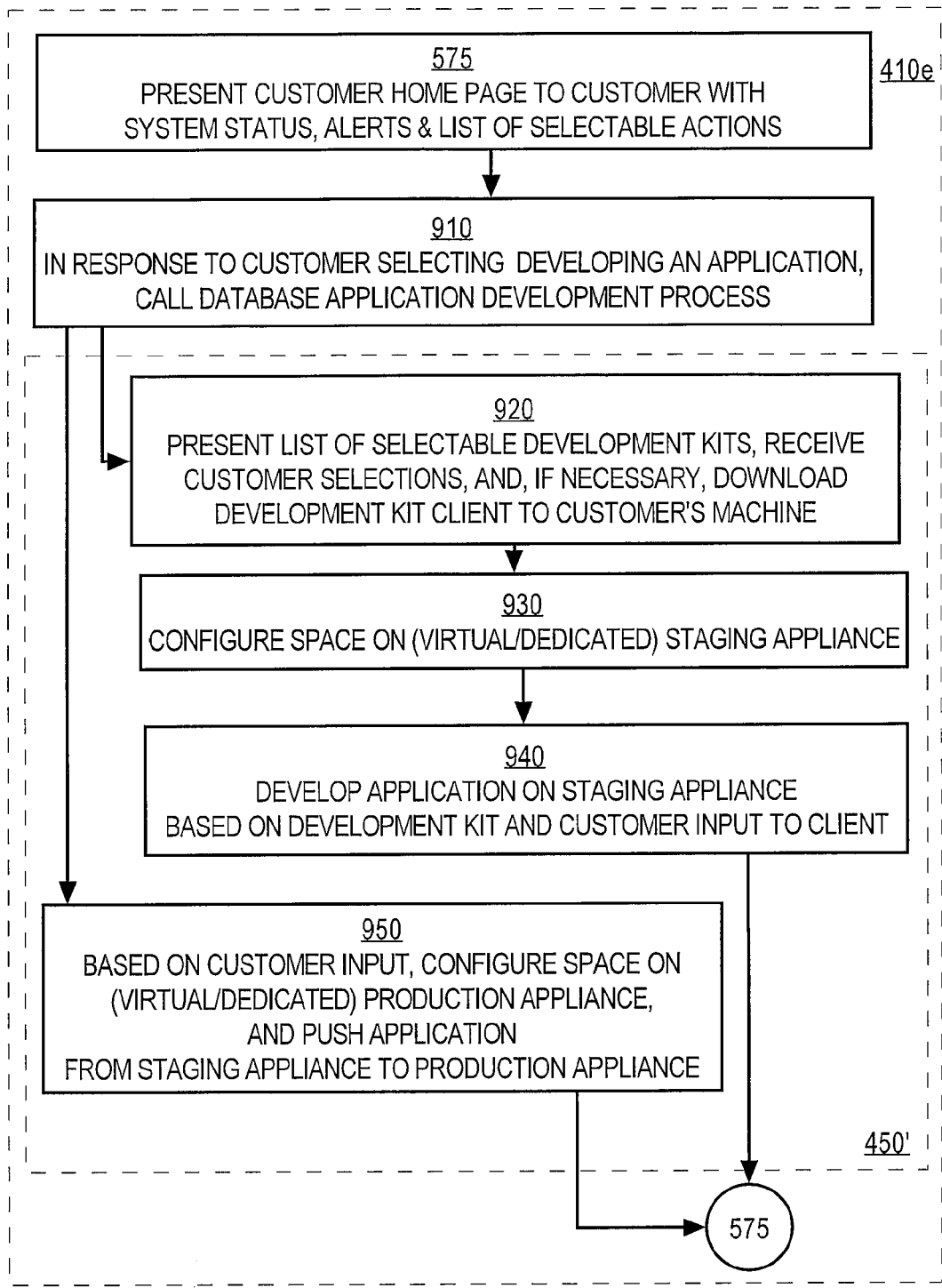
FIG. 9 is a flowchart for developing new database applications on a database services provider according to an embodiment of the disclosed techniques.

An important purpose of the IDSP system is to enable small and medium-sized enterprises to use databases as quickly and inexpensively as possible. However, some customers of the IDSP will be power users fully capable of developing their own database applications. The IDSP must support these power users as well. FIG. 9 is a flowchart for developing new database applications using tools provided by the IDSP according to an embodiment of the disclosed techniques.

In step 575, the customer is presented with the customer's home page including a selectable item representing developing a new database application. In step 910, in response to the customer selecting the item representing the development of a new application, the process launches the new database application development process. In 920, the customer is presented with the list of selectable development kits, which are different systems known in the art for developing database applications. Not all the development kits available can be operated over the Internet by a browser from the customer's platform communicating with a development kit server on the IDSP platform. For example, to use JDeveloper to develop a database application requires that the customer run a client process called the JDeveloper thin client, communicating through a SQL*Net port on the server. If the connection is a VPN, the customer could access the database being developed by a SQL*Net and use standard development tools such as JDeveloper or SQLPlus on the customer's platform. If the customer does not own a client process required by the database development kit, then the self-service database provisioning process assists the customer in obtaining the client process in step 920. This assistance takes the form of downloading the software for the client process for certain development kits. But if the IDSP system is not licensed to distribute the client process, the assistance takes the form of a link to the web site from which the client process software can be purchased and downloaded.

The new application is developed in the staging area of the IDSP system, i.e. on one or more staging database devices. In step 930, the process configures space and other consumable resources on a staging database appliance, either a virtual appliance or a dedicated appliance. In this embodiment, the staging area is a separate appliance inside the firewall with a synchronization service to the production area. The staging area allows the customer to test new applications before going live in the production environment. The staging area is managed the same way as the production area, but may be subject to different pricing rules. The customer is able to define specific storage, CPU requirements, and number of users when developing applications in the staging area.

In step 940, the new application is developed in this staging appliance and staging area based on the development kit and customer input to the client process of the development kit. Customer access to the self-service database provisioning process is then passed back to the customer's home page in step 575.

From the customer's home page, the customer can return to step 910 in the new application development process. The customer can select an option to push the new application or update from the staging area to the production area. The customer selects the application that needs to be transferred and clicks on a submit icon, for example. The system then configures space and other needed resources on a production appliance, in step 950, and transfers all objects related to the application, as listed in the application profile, to the production area. In some embodiments, this transfer involves a human in the loop by sending a request to the database administrator to transfer the application from the staging area to the production area. The customer is then returned to the customer's home page in step 575.

10. Secondary Users, Roles and Privileges

The database services procured from the IDSP by a customer may in turn be conveyed to secondary users defined by the customer. The secondary users may include employees of the enterprise that is the customer, affiliates of the customer, client or customers of the customer, or contractors working for the customer. These different secondary users will be granted different privileges by the customer depending upon their relationship with the customer. For example, the customer may be a retailer who wishes to allow the public to access databases about the customer's products but wants to confine access to a database about the retailer's employees to a few members of its human resources department.

Figure 10:
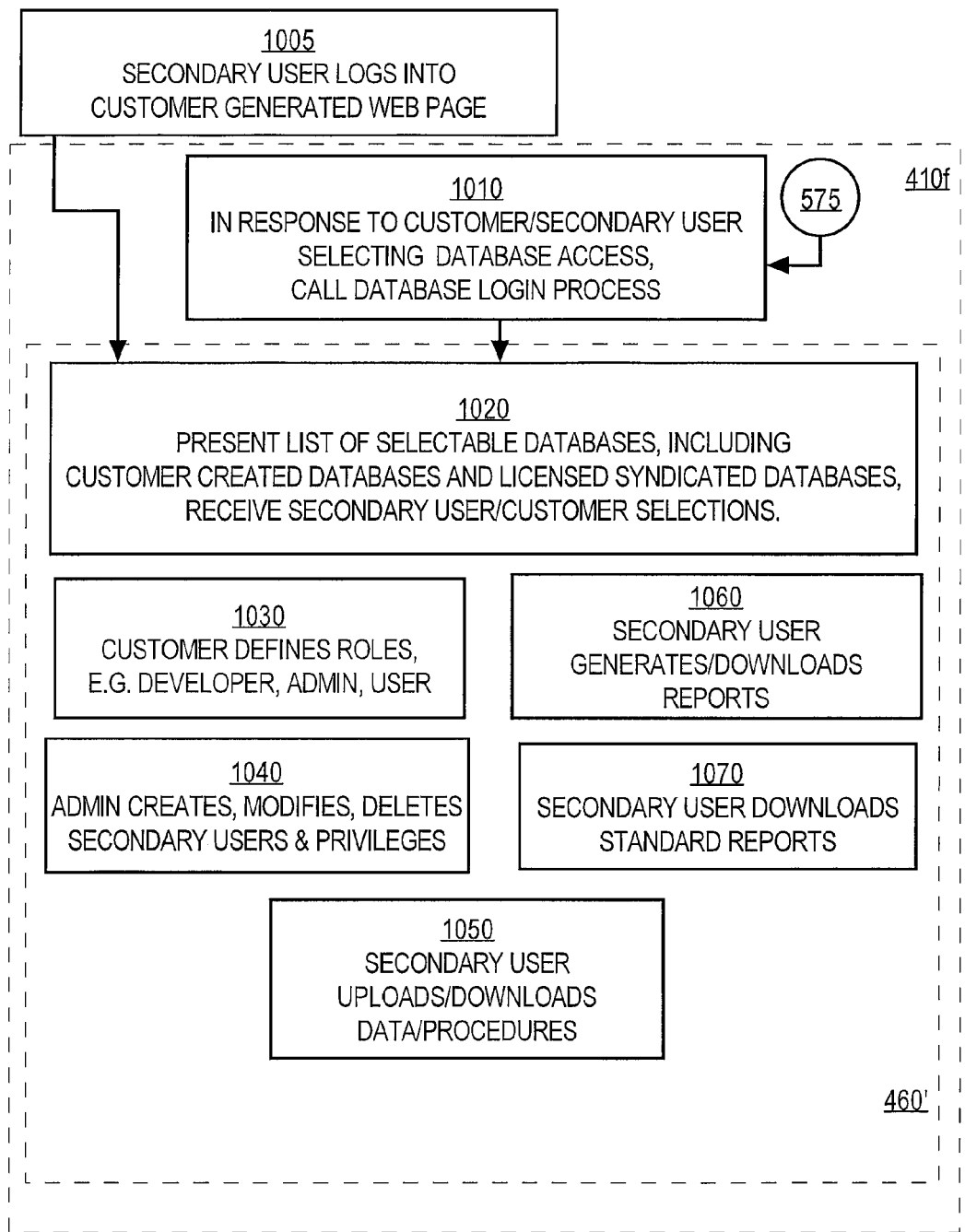
FIG. 10 is a flowchart for accessing a database on a database services provider according to an embodiment of the disclosed techniques.

FIG. 10 is a flowchart for accessing a database on a database services provider according to an embodiment of the disclosed techniques. At first, only the customer has access to the databases created by the customer or subscribed to by the customer. In this sense, the customer is the agent of the enterprise that has subscribed to the services available from the IDSP and has provided the payment information. In step 1010, in response to the customer selecting database access, a database login process is launched. In this embodiment, the database login process is initiated by the self-service database provisioning process which presents to the customer in step 1020 a list of the databases to which that customer has access. The customer will have access to the databases that the customer has created as well as databases to which the customer has subscribed, such as a syndicated database created or licensed by the service provider. The customer then selects one of the selectable databases. In this embodiment, the customer requests for database functions related to the database being accessed are handled by the database appliance on which the selected database resides.

Once the customer has access to the database, the customer can perform ordinary database functions well known in the art. One of these functions, performed in step 1030, is to define roles for the various users that will be granted access. The roles may include a database developer, database administrator, public user, a member of human resources department, etc. The database administrator then assigns privileges to those roles. The customer with current access must be considered the database administrator in the beginning. In step 1040, a user designated the database administrator can create, modify, and delete secondary users and assigns roles to them with the associated privileges. A user is typically identified by a user ID and may be required to provide a password to gain access to the database.

After the secondary users have been defined with their IDs, passwords, roles and privileges, the secondary users can gain access to at least portions of the database. It is possible for a secondary user to be denied access to the customer's home page 575 and still be given access to a database. One way this is accomplished is by the customer using one of the self-service database provisioning tools to generate a web site to which any user, including a public user, can connect. If the customer has placed a database access component on that Web page, then the public user can log into that Web page in step 1005. Upon successful login in step 1005, the secondary or public user is presented with a list of selectable databases in step 1020. In this manner, a secondary or public user can access a database according to the privileges assigned to the role that secondary user holds.

Once granted database access, the customer or secondary user can generate or download reports of database usage, if the user's privileges so permit, in step 1060. In step 1070 a secondary user, or customer, can download standard reports generated automatically by the IDSP system. Depending on privileges, in step 1050, the customer or secondary user can upload data or procedures into the database, or download data or procedures from the database.

11.0 Integrating External Services

Figure 11:
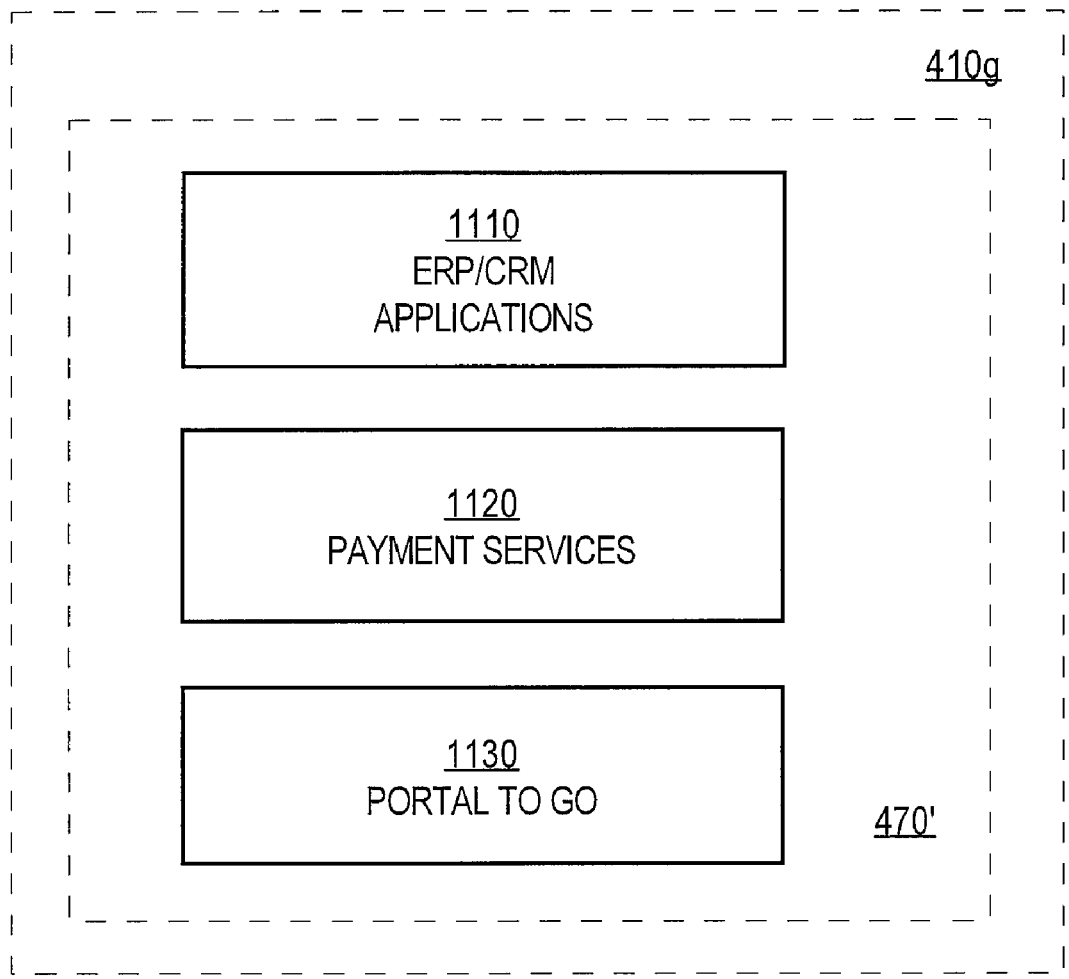
FIG. 11 is a flowchart for integrating external services on a database services provider according to an embodiment of the disclosed techniques.

Some services desired by a customer of an IDSP may not actually execute on the database devices of the IDSP system. Such services, by definition, are external services to the IDSP system. The IDSP system is designed to make the external services available to the customer through the self-service database provisioning process. Interfaces are built into the self-service database provisioning process to pass information to the external services required by those external services and to receive the output generated by those external services. FIG. 11 is a flowchart for integrating external services on a database services provider according to an embodiment of the disclosed techniques.

In step 1110, the customer is given access to enterprise resource planning (ERP) applications or customer relationship management (CRM) applications run outside the IDSP system. In step 1120, payment services, such as those provided by a credit card server, are accessed by passing to them the information they need and storing the information returned in one of the database devices of the IDSP system.

Similarly, in step 1130, the self-service database provisioning process sends information over the Internet to a server that provides mobile Internet access, called herein a "Portal-to-go," and stores information returned from the Portal-to-go in a database of the IDSP system.

12.0 Platform-Owner Database Provisioning

The preceding sections describe the database services available to customers through the self-service database provisioning process. Those services are provided on a bank of database devices, such as database appliances, managed by the IDSP platform. The equipment and software available in the IDSP system are shared by multiple customers according to the resources those customers have subscribed to. It is the job of the service provider, i.e. the IDSP platform owner, to ensure that sufficient database resources are available in the IDSP system to meet the needs of the multiple customers. The tools available for managing the database devices are accessed by the platform owner through the IDSP provisioning process and are described in the following sections.

12.1 Automatic Discovery & Registration of a New Database Appliance

Regardless of whether a database system is part of an IDSP system managed by an IDSP or is part of a private database system managed by an enterprise, the database owner usually reaches a point in which the capacity of the database system must be expanded. In conventional database systems, expanding the capacity of the database system is a chore that required a high degree of expertise and a substantial investment of time.

According to one embodiment, the capacity of a database system is expanded by connecting additional database devices, such as additional database server appliances or off-host storage appliances or both. Further, techniques are provided for much of the initial configuration of the new devices to be performed automatically, thereby significantly decreasing the time and expertise required to increase the capacity of a database system.

Figure 12A:
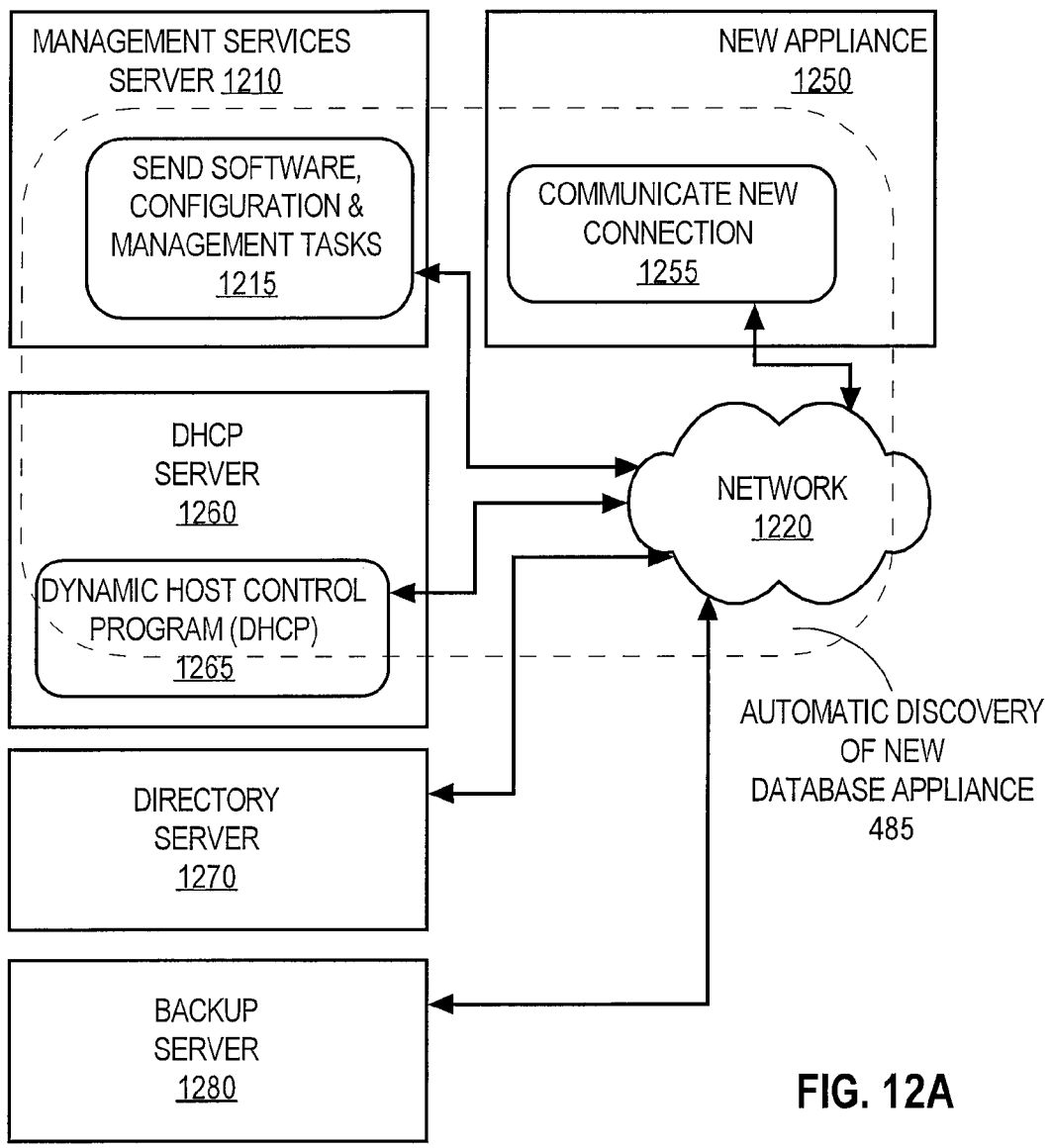
FIG. 12A is a block diagram of a process for automatic discovery and management of a new database appliance connected to a network according to an embodiment of the disclosed techniques.

FIG. 12A is a block diagram of a system that performs automatic discovery and management of a new database appliance connected to a network, such as the IDSP system.

Networks 1220 typically run a dynamic host control program (DHCP) 1265 on a DHCP server 1260 to dynamically configure the network settings of computer systems connected to a network. It is the responsibility of the DHCP to assign network addresses to the devices that comprise a network. When a device is connected to the network 1220, it contacts the DHCP and is assigned a network address, e.g., an IP address. All message traffic directed to that IP address is resolved by checking with the DHCP to determine the location of the physical device having that address.

In the system shown in 12A, a database appliance is managed on a network that includes a DHCP server 1260, a directory server 1270, a backup server 1280 and a management services server 1210. In the embodiment depicted, each of these servers executes in a different device on the network. In other embodiments several or all of these servers reside on a single device on the network.

The directory server 1270 communicates with database appliances using a protocol, such as a lightweight directory access protocol (LDAP), and maintains a repository of database appliance names and addresses on the network.

The backup server 1280, such as a backup catalog server, provides backup for critical information that is stored in the local network 1220. This information about software installed on the appliances and configuration parameters is used to replace or reboot an appliance that has failed or been disconnected from the network. The management services server 1210 ensures that all management activities required to maintain a database are distributed among the database appliances available on the network.

When a new appliance is added to the network, its address should be added to the directory server, information about its configuration should be added to the backup server, and the installed applications and consumable resources of the appliance should be made available to the management services server 1210. With conventional database appliances, a human operator must recognize when a new appliance 1250 has been connected to the network 1220 and must register that new appliance with the management services server 1210. The registration process includes the database appliance in the list of available appliances and makes available to the management services server the installed applications and consumable resources of the appliance. Then the human operator chooses management tasks that the new appliance should perform. The management tasks include jobs such as backing up the files, clearing out logs, monitoring space usage, creating an index, and synchronizing content with another database, among many others known to those in the art. The management tasks also include events that trigger a response from the new appliance. For example, space usage reaching a threshold amount constitutes an event that triggers an alert being sent to a user of the database device. The management tasks also include patches to the software that was originally installed in the new appliance at the factory.

According to a modified operation for adding new appliances, when a new appliance 1250 is added to a network 1220, the management services server 1210 automatically registers the new appliance and assigns management tasks to the appliance. According to one embodiment, installation of a new appliance involves a new communication process 1255 on the new appliance 1250, a revised procedure for the dynamic host control program 1265, and a revised process 1215 for sending software, configuration, and management tasks to the new appliance 1250. The new or modified participants in this operation are enclosed in item 485 in FIG. 12A.

Figure 12B:
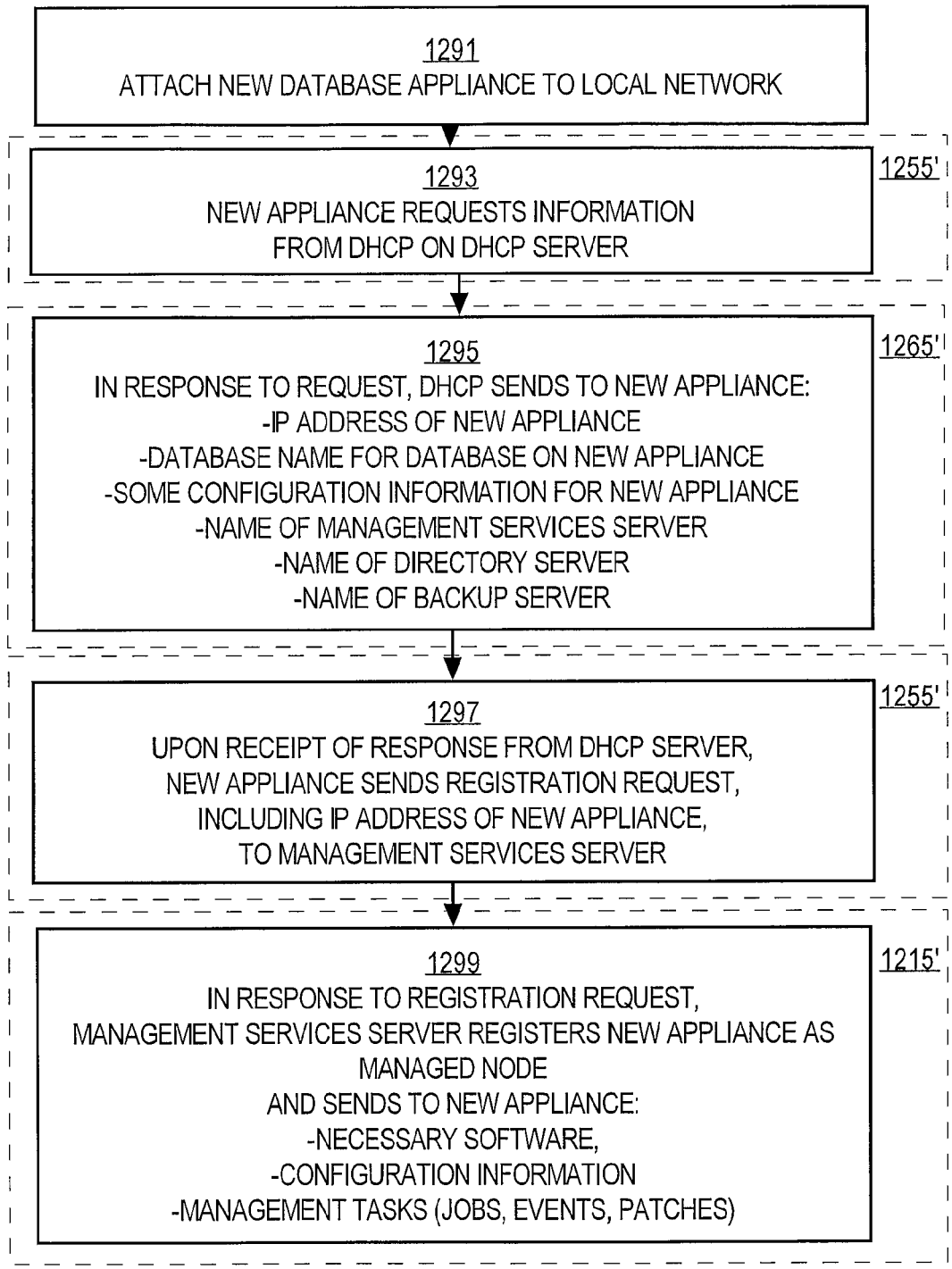
FIG. 12B is a flowchart of a process for automatic discovery and management of a new database appliance connected to a network according to an embodiment of the disclosed techniques.

FIG. 12B is a flowchart of a process for automatic discovery and management of a new database appliance connected to a network according to these modified techniques. In step 1291, the new database appliance is attached to a local network. The new appliance 1250 reads the IP address of the DHCP server from a computer readable medium when the new appliance boots up. In step 1293, as part of process 1255, the new appliance requests information from the DHCP on the DHCP server.

In step 1295, performed by the DHCP 1265, in response to the request from the new appliance, the DHCP sends to the new appliance the IP address assigned to the new appliance and the database name for the database established on the new appliance. These steps constitute automatic discovery of a new database appliance. No human intervention is required for the new appliance to discover its IP address.

Step 1295 includes sending a message that identifies the management services server from the DHCP to the new appliance. The message may include, for example, the network name of the management services server. According to one embodiment, the DHCP also sends some configuration information for the new appliance, the network name of the directory server, and the network name of the backup server. In some embodiments, the network name is a URL address.

The DHCP may also send an indication of a language to be installed on the new appliance in order to process requests over the network for database services on the new appliance. In one embodiment the language is specified using the national language standards for naming character sets on the Internet. For example, the DHCP may send data indicating that the database must support an American English 8-bit character set designated International Standardization Organization standard ISO 8859, or a character set in the Unicode 16 bit character set designated ISO 10464-UCS-2, or a Japanese character set in the Unicode 31 bit character set designated ISO 10464-UCS-4.

Based on the response sent from the DHCP in step 1295, the new appliance sends a registration request to the management services server in step 1297. The registration request sent to the management services server includes data that identifies the new appliance, such as the IP address of the new appliance.

In step 1299, in response to the registration request, the management services server registers the new appliance as a managed node and sends to the new appliance software updates, configuration information, and management tasks. According to this embodiment, the management tasks are database procedures that have been stored in the management services server. Also stored are data indicating a particular combination of management tasks associated with each type of database appliance. When a new appliance is automatically discovered and registered, these data indicating the particular combination of tasks, and, in some embodiments, the corresponding procedures are automatically transmitted to the new appliance over the network.

According to this embodiment, the IDSP system employs automatic discovery and registration of new database appliances.

12.2 Communication with Community Server

Figure 13:
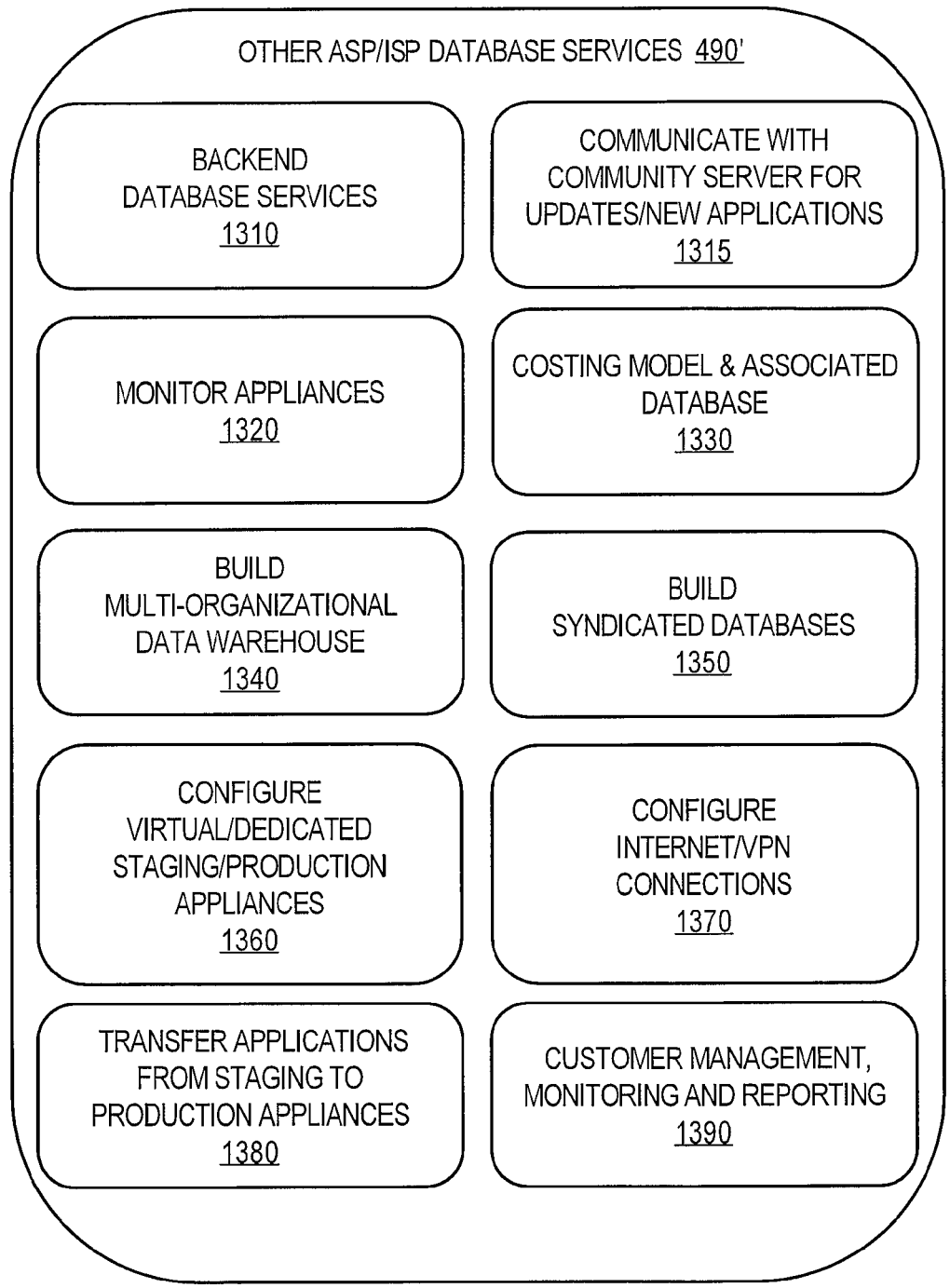
FIG. 13 is a block diagram of database services for a platform owner available to the database services provider according to an embodiment of the disclosed techniques.

FIG. 13 is a block diagram of other database services for a platform owner available to the database services provider according to an embodiment. The backend database services 1310 are standard database administrator functions that are performed routinely by the platform owner and are described in more detail later with respect to FIG. 14.

Process 1315 allows the platform owner to communicate with the community server for updates and new applications. The IDSP platform handles upgrades automatically as they become available from the vendor. These updates and upgrades are for the IDSP platform itself as well as for any appliances or other database devices attached to the IDSP platform. The upgrades are performed through the community server as with the upgrades of any individual database appliance. The service provider will initiate the process by requesting or approving the upgrades.

The duties of managing a network of database appliances include dynamic host control, management services, directory services, and backup services. These duties can be split between the IDSP and the community server in any combination that achieves reasonable performance. In one embodiment, all these duties are performed by the IDSP platform 332. In an alternative embodiment, all these duties are performed by the community server 390. In other embodiments, the community server performs some of these duties. The communications between the IDSP platform and the community server depends on the distribution of these duties.

12.3 Monitoring Appliances

Process 1320 is used to monitor appliances and other database devices through the display on the IDSP console (item 334 in FIG. 3A). In this embodiment the monitoring is done using a Java applet that runs on the console. This is an advantage because the same Java applet can be run from a browser, and that allows the platform owner to monitor the appliances over the Internet, or other network, when the platform owner is separated from the IDSP site. Although a Java applet is used in this embodiment, any script or process known in the art can be used for communicating between a remote terminal and the IDSP platform or database devices. The console will have a form-based interface as well as a Web-based interface, so that all operations can be handled remotely. It is expected that the console will be adapted from an enterprise manager appliance pack available for the database appliances.

In some embodiments, the console provides a simple screen showing all appliances attached to the IDSP platform. The console provides a live report of the storage and CPU usage. Information is shown in a box indicating the appliance name and reference number, and showing a green/yellow/red light for status. Based on the limits established by the service provider or the customer, the system indicator will turn yellow when usage is getting close to the limit subscribed to, as indicated by exceeding the threshold percentage of the maximum usage. The system indicator will turn red once the limit has been reached. The limit is the maximum amount of a consumable resource for which a customer has subscribed. If the database administrator double-clicks on any of the appliance icons, the system shows the detailed status for the particular appliance.

Excess loads that turn the indicator yellow or red may be due to peaks, or a temporary or steady growth in the use of the application. To handle both situations, the service provider can offer additional temporary or permanent resources with separate pricing. The system will track the response that has been selected by the customer for dealing with the excess loads. Using the self-service registration maintenance process, the customer can easily and quickly subscribe for additional database resources to handle the growth in the load.

12.4 Automatic Pricing

Automatic pricing and billing are available through the costing model and associated database, process 1330. Conventional pricing models for service providers are typically quite simple, combining access and certain levels of services packaged together into a flat monthly fee. Process 1330 provides better system and cost tracking that enables the service provider to fine-tune the pricing models. The IDSP provides the necessary level of detail on usage. The pricing models supports syndication. The IDSP platform tracks the costs of licenses in the overall system usage including all appliances connected to the platform. This information and estimate of the operating cost is available to the services provider. This allows the service provider to easily track the costs against the revenues generated. The IDSP platform generates a simple report presenting the costs and revenues per customer and for the overall system.

The IDSP platform catches all necessary information for billing purposes and stores that information in a billing database. The IDSP uses this information and the pricing rules in the pricing model to compute an amount to be billed to the customer. This information is sent to an external billing system for online billing and payment. In an alternative embodiment, the online billing system and the payment system are hosted on the IDSP platform. The platform owner is presented with several built-in pricing models, including billing the customer per database usage, billing per transaction and billing a flat fee. Different prices may be established for different customers or users. Different prices may be established for different services. When billing for database usage, the customer is charged based on the usage of the database including storage space, CPU time, and number of users accessing the system. The price may be fixed of variable depending on usage. When billing per transaction, the customer is charged based on the number of changes to a database including news updates. When billing a flat fee, the customer is charged a given amount for usage within predefined limits by fewer than a maximum number of users. When the predefined limits are exceeded, a different price is may be applied for each increment of usage.

Because the services provider may offer other services in addition to the database services, the system is configurable to send or receive information to another system, such as an external billing system, so that the customer receives only a single bill. The customer can also subscribe to the pricing model and billing engine used by the IDSP platform in order to compute bills for secondary users. This pricing model and billing engine are also used to compute the price presented to the customer when the customer selects the services to subscribe to.

From the customer requirements for storage, CPU and number of users in the staging area, the system also generates the appropriate pricing. Custom pricing is generated for the staging area from rules defined by the service provider. The standard or default pricing rules are based on megabytes (MB) of storage and minutes of CPU and number of users. As more usage data becomes available, the system may use more sophisticated pricing rules. In one embodiment, the costing model supports fixed price per unit of usage; variable price per unit usage as a function of usage; flat price up to a maximum value of usage; different prices for different users; different prices for different services; and different prices for increments of usage above a maximum subscribed usage.

12.5 Other Platform Owner Processes

In process 1340, the platform owner can build a multi-user organizational data warehouse that can be accessed by several customers that cannot be produced by any one of them alone. Similarly, process 1350 allows the platform owner to build a syndicated database to which any user can subscribe for a fee.

Process 1360 allows the platform owner to configure any appliance as a dedicated appliance or a plurality of virtual appliances as described earlier. Process 1360 also allows the platform owner to configure a virtual or dedicated appliance as a staging area appliance or a production area appliance. Process 1380, allows the platform owner to participate in the transfer of new and updated applications from the staging area to the production area. Through this process, the platform owner also adds or drops appliances, and changes the management tasks assigned to each.

Process 1370 allows the platform owner to configure connections to database resources as either open Internet connections or virtual private network connections.

Process 1390 allows the platform owner to manage customers, including adding and deleting customers, monitoring usage by customers, and reporting usage to customers.

12.6 Backend Database Processes

Figure 14:
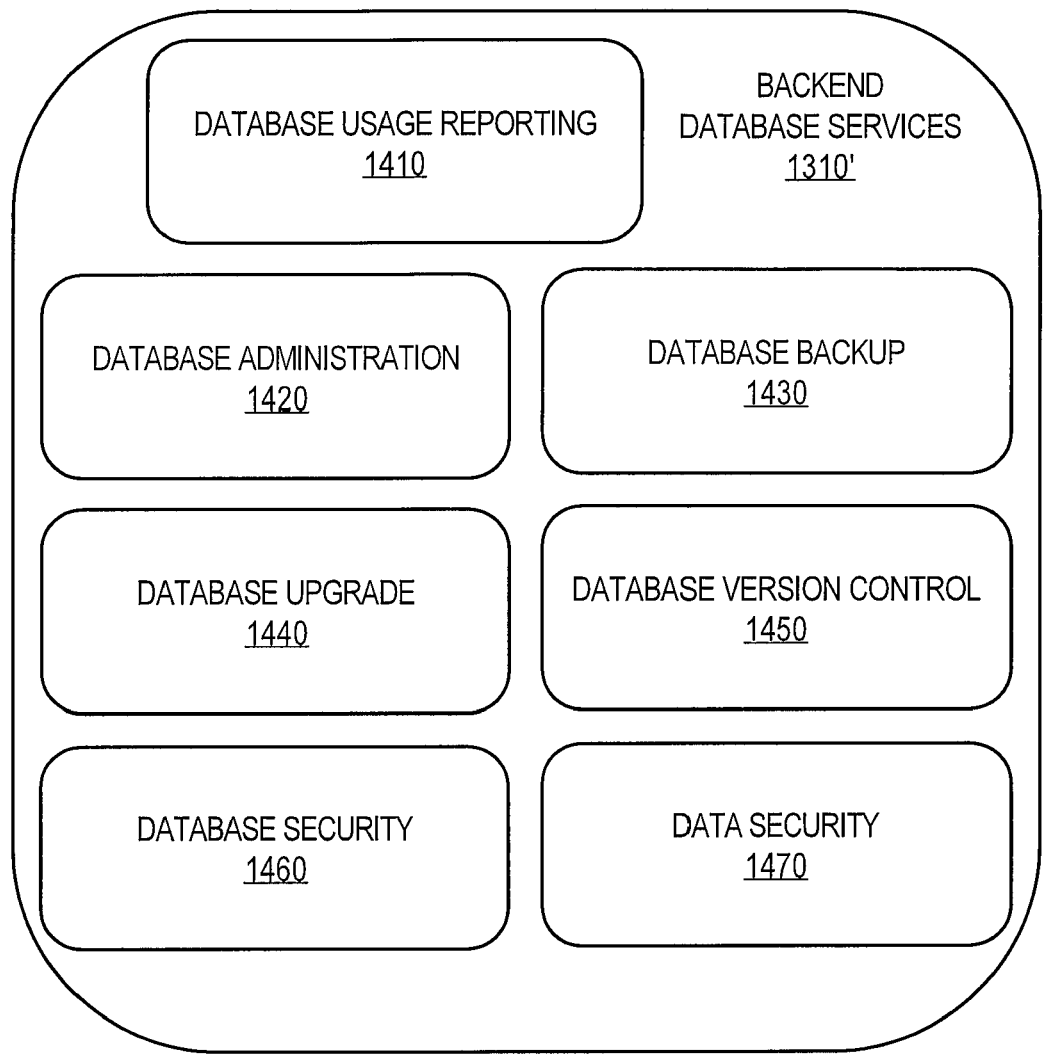
FIG. 14 is a block diagram of the backend database services for a platform owner available to the database services provider according to an embodiment of the disclosed techniques.

FIG. 14 is a block diagram of the backend database services available to the database services provider according to an embodiment of the disclosed techniques. These processes are largely routine or automatic or both.

Process 1410 generates standard reports on the usage of the database. These reports allow the services provider to determine the database resources available for subscription. These reports can be used by the customer to manage operation of customers resources or to determine the marketing success of the customer's web site. The IDSP platform receives logs from Web servers outside the firewall so that data can be integrated into the usage monitoring and reporting. The customer also is able to create special, customized reports of database usage.

Process 1420 allows the platform owner to perform database administration tasks well known to those in the art.

These include load balancing and customer service modifications. Process 1430 allows the platform owner to schedule and devote resources to database backup for all the databases on the IDSP system.

Process 1440 allows the platform owner to perform database upgrades obtained from the community server. The upgrades communicated from the community server will be phased in by testing them first in the staging area. In the staging area, new versions are installed on appliances for customers to test the impact of the upgrades on their custom applications. The IDSP platform offers a form where each customer can indicate when the upgrade has been validated on their existing system. During this process, customers are able to submit issues to the service provider so that the issues can be resolved. These issues are also submitted through a Web form. Once all the customers have tested the new version and updated their code, as required, the staging area will be updated. Then the production area will be updated.

Process 1450 allows the database administrator or platform owner to manage the various versions of software operating on the database devices and IDSP platform.

Processes 1460 and 1470 allow the database administrator to set up security policies and enforce them with respect to the various databases distributed on the IDSP system and with respect to the individual data items in the databases.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
a first party managing one or more database systems comprising one or more database servers and one or more database storage devices;
receiving, from a second party that is different from the first party, information for subscribing to one or more database services supported by the one or more database systems managed by the first party, wherein the database services include services for storing and managing data provided by the second party in one or more tables on the one or more database storage devices;
wherein the information is gathered during a registration process in which the second party identifies one or more database resources to be provided by the first party in support of the one or more database services;
in response to receiving the information for subscribing to the one or more database services, the first party configuring the one or more database systems by at least allocating the one or more database resources for use by the second party;
the first party providing, to one or more database applications operated by the second party, access to the one or more database services to which the second party is subscribed using the allocated one or more database resources, wherein providing the access to the one or more database services comprises a database server of the one or more database systems executing a database query that retrieves at least a portion of the data provided by the second party from a table stored in the one or more database storage devices;
delivering over a network, to a user associated with the second party, one or more messages which cause generation of an interface for building a web application that uses the one or more database services;
receiving user input describing the web application via the interface; and
deploying the web application based on the user input;
wherein the steps of receiving, providing, and delivering are performed by one or more computing devices.

2. The method of claim 1, wherein the one or more database applications are hosted by the first party on behalf of the second party.

3. The method of claim 1, wherein the one or more database applications are hosted by the second party at one or more computing devices connected to the one or more database systems via a network.

4. The method of claim 1, where the step of receiving information for subscribing includes receiving, from the second party, information that specifies one or more of:
a maximum amount of storage space for the one or more database resources;
a maximum amount of users for the one or more database resources;
a maximum transaction rate for the one or more database resources;
a frequency of backup for the one or more database resources;
a frequency and format of usage reports for the one or more database resources;
Internet access parameters for mobile devices to be used by the second party;
a payment service for the one or more database resources; or
information about development of applications for the one or more database resources.

5. The method of claim 1, further comprising:
delivering over a network, to a user associated with the second party, one or more messages which cause generation of an interface for subscribing to the one or more database resources;
wherein the information for subscribing is received via the interface for subscribing to the one or more database resources.

6. The method of claim 1, wherein allocating the one or more database resources is performed automatically by the one or more computing devices belonging to the first party in response to receiving the information for subscribing, without human intervention.

7. The method of claim 1, further comprising:
a database application operated by the first party receiving a command from the one or more database applications operated by the second party to provide the access to the one or more database services;
in response to the command, the database application operated by the first party sending the database query to the database server;
in response to the database query, the database server returning to the database application operated by the first party the portion of the data from the table stored in the one or more database storage devices;
the database application operated by the first party responding to the command from the one or more database applications operated by the second party based on the portion of the data returned by the database server.

8. The method of claim 1, wherein the one or more database resources include a database application operated by the first party.

9. The method of claim 1, wherein the second party identifies one or more database resources by identifying a package comprising the one or more database resources.

10. One or more non-transitory computer-readable storage media storing instructions that, when executed by one or more computing devices, cause performance of:
   a first party managing one or more database systems comprising one or more database servers and one or more database storage devices;
   receiving, from a second party that is different from the first party, information for subscribing to one or more database services supported by the one or more database systems managed by the first party, wherein the database services include services for storing and managing data provided by the second party in one or more tables on the one or more database storage devices;
   wherein the information is gathered during a registration process in which the second party identifies one or more database resources to be provided by the first party in support of the one or more database services;
   in response to receiving the information for subscribing to the one or more database services, the first party configuring the one or more database systems by at least allocating the one or more database resources for use by the second party;
   the first party providing, to one or more database applications operated by the second party, access to the one or more database services to which the second party is subscribed using the allocated one or more database resources, wherein providing the access to the one or more database services comprises a database server of the one or more database systems executing a database query that retrieves at least a portion of the data provided by the second party from a table stored in the one or more database storage devices;
   delivering over a network, to a user associated with the second party, one or more messages which cause generation of an interface for building a web application that uses the one or more database services;
   receiving user input describing the web application via the interface; and
   deploying the web application based on the user input;
   wherein the steps of receiving, providing, and delivering are performed by the one or more computing devices.

11. The method of claim 1, wherein the one or more database applications comprise a database application through which the second party provides services based on data stored on behalf of the second party in the one or more tables.

12. The method of claim 1, wherein providing the access to the one or more database services to which the second party is subscribed using the allocated one or more database resources comprises:
   receiving the database query from the one or more database applications operated by the second party;
   wherein the database query conforms to a database language supported by the one or more database systems; and
   in response to the database query, the one or more database systems providing the one or more database applications the portion of the data from the table stored in the one or more database storage devices.

13. The method of claim 1, wherein allocating the one or more database resources for use by the second party comprises:
   configuring a database device for the second party in a database system managed by the first party;
   allocating a database resource at the database device.

14. The method of claim 13, wherein configuring the database device and allocating the database resource are performed automatically by the one or more computing devices belonging to the first party in response to receiving the information for subscribing to the one or more database services, without human intervention.

15. The method of claim 13, wherein the database device is a dedicated hardware database device.

16. The method of claim 13, wherein the database device is a virtual database device.

17. The one or more non-transitory computer-readable storage media of claim 10, wherein the one or more database applications are hosted by the first party on behalf of the second party.

18. The one or more non-transitory computer-readable storage media of claim 10, wherein the one or more database applications are hosted by the second party at one or more computing devices connected to the one or more database systems via a network.

19. The one or more non-transitory computer-readable storage media of claim 10, where the step of receiving information for subscribing includes receiving, from the second party, information that specifies one or more of:
   a maximum amount of storage space for the one or more database resources;
   a maximum amount of users for the one or more database resources;
   a maximum transaction rate for the one or more database resources;
   a frequency of backup for the one or more database resources;
   a frequency and format of usage reports for the one or more database resources;
   Internet access parameters for mobile devices to be used by the second party;
   a payment service for the one or more database resources; or
   information about development of applications for the one or more database resources.

20. The one or more non-transitory computer-readable storage media of claim 10, wherein the instructions, when executed by the one or more computing devices, further cause performance of:
   delivering over a network, to a user associated with the second party, one or more messages which cause generation of an interface for subscribing to the one or more database resources;
   wherein the information for subscribing is received via the interface for subscribing to the one or more database resources.

21. The one or more non-transitory computer-readable storage media of claim 10, wherein allocating the one or more database resources is performed automatically by the one or more computing devices belonging to the first party in response to receiving the information for subscribing, without human intervention.

22. The one or more non-transitory computer-readable storage media of claim 10, wherein the one or more database applications comprise a database application through which the second party provides services based on data stored on behalf of the second party in the one or more tables.

23. The one or more non-transitory computer-readable storage media of claim 10, wherein providing access to the one or more database services to which the second party is subscribed using the allocated one or more database resources comprises:
   receiving the database query from the one or more database applications operated by the second party;

wherein the database query conforms to a database language supported by the one or more database systems; and in response to the database query, the one or more database systems providing the one or more database applications the portion of the data from the table stored in the one or more database storage devices.

24. The one or more non-transitory computer-readable storage media of claim 10, wherein allocating the one or more database resources for use by the second party comprises:

configuring a database device for the second party in a database system managed by the first party;

allocating a database resource at the database device.

25. The one or more non-transitory computer-readable storage media of claim 24, wherein configuring the database device and allocating the database resource are performed automatically by the one or more computing devices belonging to the first party in response to receiving the information for subscribing to the one or more database services, without human intervention.

26. The one or more non-transitory computer-readable storage media of claim 24, wherein the database device is a dedicated hardware database device.

27. The one or more non-transitory computer-readable storage media of claim 24, wherein the database device is a virtual database device.

28. The one or more non-transitory computer-readable storage media of claim 10, wherein the instructions, when executed by the one or more computing devices, further cause performance of:

a database application operated by the first party receiving a command from the one or more database applications operated by the second party to provide the access to the one or more database services;

in response to the command, the database application operated by the first party sending the database query to the database server;

in response to the database query, the database server returning to the database application operated by the first party the portion of the data from the table stored in the one or more database storage devices;

the database application operated by the first party responding to the command from the one or more database applications operated by the second party based on the portion of the data returned by the database server.

29. The one or more non-transitory computer-readable storage media of claim 10, wherein the one or more database resources include a database application operated by the first party.

30. The one or more non-transitory computer-readable storage media of claim 10, wherein the second party identifies one or more database resources by identifying a package comprising the one or more database resources.

* * * * *

UNITED STATES PATENT AND TRADEMARK OFFICE
CERTIFICATE OF CORRECTION

| | |
|---|---|
| PATENT NO. | : 7,953,764 B2 |
| APPLICATION NO. | : 12/784270 |
| DATED | : May 31, 2011 |
| INVENTOR(S) | : Baffier et al. |

It is certified that error appears in the above-identified patent and that said Letters Patent is hereby corrected as shown below:

In column 18, line 65, delete "Dot Com" and insert -- DotCom --, therefor.

In column 28, line 45, delete "discussion forum" and insert -- discussionforum --, therefor.

In column 32, line 11, delete ""p_sort-order"" and insert -- "p_sort_order" --, therefor.

In column 33, line 6, delete "<colortype=" and insert -- <color type= --, therefor.

In column 33, line 7, delete "<colortype=" and insert -- <color type= --, therefor.

In column 33, line 8, delete "<colortype=" and insert -- <color type= --, therefor.

In column 33, line 9, delete "<colortype=" and insert -- <color type= --, therefor.

In column 33, line 10, delete "<colortype=" and insert -- <color type= --, therefor.

In column 33, line 11, delete "<colortype=" and insert -- <color type= --, therefor.

In column 33, line 12, delete "<colortype=" and insert -- <color type= --, therefor.

In column 33, line 13, delete "<colortype=" and insert -- <color type= --, therefor.

In column 33, line 14, delete "<colortype=" and insert -- <color type= --, therefor.

In column 37, line 10, after "in" delete "the".

In column 38, line 33, delete "disussionforum" and insert -- discussionforum --, therefor.

In column 39, line 14, delete "occurance" and insert -- occurrence --, therefor.

Signed and Sealed this
Twenty-fifth Day of October, 2011

David J. Kappos
*Director of the United States Patent and Trademark Office*

In column 39, Table 4-continued, line 74, delete "NAME="{$fieldname}" />" and insert -- NAME="{$fieldname}"/> --, therefor.

In column 39, Table 4-continued, line 78, delete "NAME="{$fieldname}" />" and insert -- NAME="{$fieldname}"/> --, therefor.

In column 42, line 29, delete "eleemnt." and insert -- element. --, therefor.

In column 43, line 12, delete "varaible;" and insert -- variable; --, therefor.